(12) United States Patent
Hayashi et al.

(10) Patent No.: US 6,741,758 B2
(45) Date of Patent: May 25, 2004

(54) IMAGE PROCESSOR AND IMAGE PROCESSING METHOD

(75) Inventors: Junichi Hayashi, Kanagawa (JP); Keiichi Iwamura, Kanagawa (JP); Yoshihiro Ishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 582 days.

(21) Appl. No.: 09/824,745

(22) Filed: Apr. 4, 2001

(65) Prior Publication Data

US 2001/0055390 A1 Dec. 27, 2001

(30) Foreign Application Priority Data

Apr. 7, 2000 (JP) .................................. 2000-107129
Apr. 28, 2000 (JP) .................................. 2000-131629

(51) Int. Cl.[7] .............................................. G06K 9/32
(52) U.S. Cl. ........................................ 382/294; 382/100
(58) Field of Search .............................. 382/100, 232, 382/248, 250, 276, 277, 279, 287, 294, 302; 358/3.28, 3.3; 380/54, 220; 713/176

(56) References Cited

U.S. PATENT DOCUMENTS

| 5,353,056 A | * | 10/1994 | Westerink et al. .......... 348/263 |
| 5,561,534 A | | 10/1996 | Ishida et al. |
| 5,600,720 A | | 2/1997 | Iwamura et al. |
| 5,636,292 A | | 6/1997 | Rhoads |
| 5,666,419 A | | 9/1997 | Yamamoto et al. |
| 5,694,486 A | | 12/1997 | Shigeeda et al. |
| 5,745,604 A | * | 4/1998 | Rhoads ........................ 382/232 |
| 5,748,777 A | | 5/1998 | Katayama et al. |
| 5,757,961 A | | 5/1998 | Yamakawa et al. |
| 5,828,794 A | | 10/1998 | Katayama et al. |
| 5,889,868 A | * | 3/1999 | Moskowitz et al. ......... 713/176 |
| 5,920,278 A | * | 7/1999 | Tyler et al. ................... 342/33 |
| 5,933,528 A | | 8/1999 | Katayama et al. |
| 5,937,395 A | | 8/1999 | Iwamura |
| 6,088,454 A | | 7/2000 | Nagashima et al. |
| 6,111,994 A | | 8/2000 | Katayama et al. |
| 6,232,978 B1 | | 5/2001 | Ishida et al. |
| 6,356,555 B1 | * | 3/2002 | Rakib et al. ................. 370/441 |
| 6,385,329 B1 | * | 5/2002 | Sharma et al. .............. 382/100 |

FOREIGN PATENT DOCUMENTS

JP 11-355547 12/1999

OTHER PUBLICATIONS

"Digital Halftoning Technique Using a Blue–Noise Mask", Theopano Mitsa and Kevin J. Parker, J. Opt. Soc. Am. A./vol. 9, No. 11, Nov. 1992.

* cited by examiner

Primary Examiner—Jayanti K. Patel
(74) Attorney, Agent, or Firm—Fitzpatrick, Cella, Harper & Scinto

(57) ABSTRACT

A registration signal embedding method of embedding registration signals adaptively in accordance with image signals. The frequency property of image data is determined, and either a first registration signal or a second registration signal is selected in accordance with the frequency property, and is added to image data. The registration embedded in this way has the advantage of increased resistance and easy detection.

24 Claims, 60 Drawing Sheets

0303　　0302　　0301

0901

| +C | +C | +C | +C | 0 | 0 | 0 | 0 |
|----|----|----|----|---|---|---|---|
| +C | +C | +C | +C | 0 | 0 | 0 | 0 |
| +C | +C | +C | +C | 0 | 0 | 0 | 0 |
| +C | +C | +C | +C | 0 | 0 | 0 | 0 |
| 0 | 0 | 0 | 0 | -C | -C | -C | -C |
| 0 | 0 | 0 | 0 | -C | -C | -C | -C |
| 0 | 0 | 0 | 0 | -C | -C | -C | -C |
| 0 | 0 | 0 | 0 | -C | -C | -C | -C |

F I G. 11
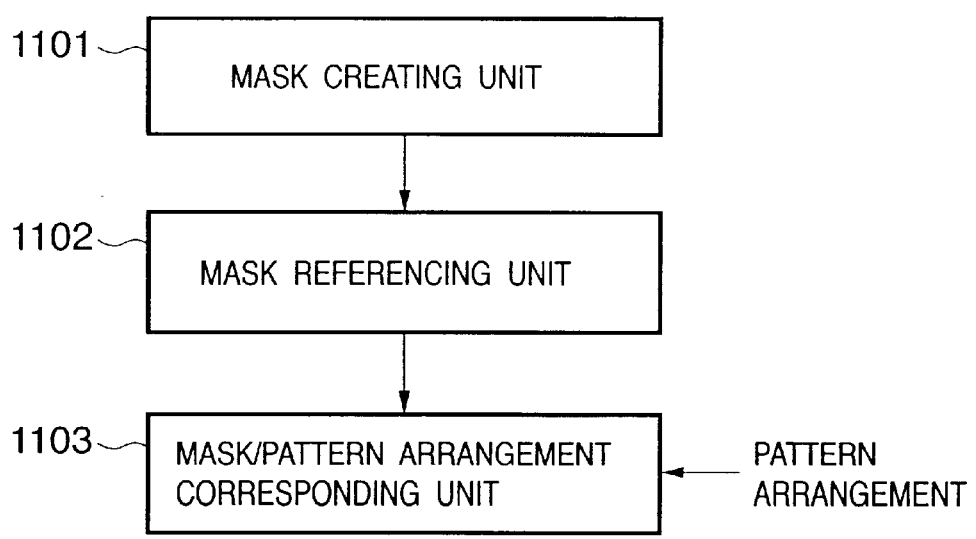

| 0 | 14 | 13 | 3 |
|---|----|----|---|
| 11 | 5 | 6 | 8 |
| 7 | 9 | 10 | 4 |
| 12 | 2 | 1 | 15 |

| 0 | 0 | 0 | 0 | +c | +c | +c | +c |
|---|---|---|---|---|---|---|---|
| 0 | 0 | 0 | 0 | +c | +c | +c | +c |
| 0 | 0 | 0 | 0 | +c | +c | +c | +c |
| 0 | 0 | 0 | 0 | +c | +c | +c | +c |
| -c | -c | -c | -c | 0 | 0 | 0 | 0 |
| -c | -c | -c | -c | 0 | 0 | 0 | 0 |
| -c | -c | -c | -c | 0 | 0 | 0 | 0 |
| -c | -c | -c | -c | 0 | 0 | 0 | 0 |

3301

| -c | -c | 0 | 0 | 0 | 0 | -c | -c |
|---|---|---|---|---|---|---|---|
| -c | -c | 0 | 0 | 0 | 0 | -c | -c |
| 0 | 0 | +c | +c | +c | +c | 0 | 0 |
| 0 | 0 | +c | +c | +c | +c | 0 | 0 |
| 0 | 0 | +c | +c | +c | +c | 0 | 0 |
| 0 | 0 | +c | +c | +c | +c | 0 | 0 |
| -c | -c | 0 | 0 | 0 | 0 | -c | -c |
| -c | -c | 0 | 0 | 0 | 0 | -c | -c |

3302

FIRST EMBEDMENT
POSITION REFERENCE MASK

SECOND EMBEDMENT
POSITION REFERENCE MASK

FIG. 37

| 69 | 211 | 9 | 217 | 16 | 35 | 190 | 101 |
|---|---|---|---|---|---|---|---|
| 87 | 197 | 109 | 180 | 117 | 212 | 71 | 114 |
| 166 | 28 | 55 | 143 | 104 | 146 | 85 | 130 |
| 64 | 206 | 179 | 48 | 240 | 232 | 108 | 154 |
| 67 | 40 | 91 | 224 | 37 | 32 | 223 | 194 |
| 203 | 214 | 106 | 231 | 169 | 4 | 208 | 24 |
| 47 | 195 | 27 | 61 | 2 | 155 | 81 | 213 |
| 251 | 84 | 202 | 184 | 170 | 10 | 46 | 138 |

COEFFICIENT LAYOUT OF BLUE NOISE MASK (PARTIAL)

FIG. 38

| 73 | 244 | 124 | 207 | 70 | 254 | 117 | 196 |
|---|---|---|---|---|---|---|---|
| 38 | 177 | 11 | 132 | 43 | 186 | 4 | 138 |
| 104 | 221 | 93 | 231 | 100 | 211 | 85 | 237 |
| 23 | 151 | 55 | 165 | 26 | 153 | 56 | 172 |
| 67 | 250 | 113 | 193 | 79 | 240 | 123 | 203 |
| 47 | 188 | 1 | 142 | 33 | 183 | 14 | 128 |
| 96 | 215 | 83 | 232 | 111 | 218 | 91 | 227 |
| 28 | 157 | 60 | 171 | 17 | 147 | 51 | 160 |

COEFFICIENT LAYOUT OF CONE MASK (PARTIAL)

MINIMUM CODING UNIT (MCU)

FIG. 41
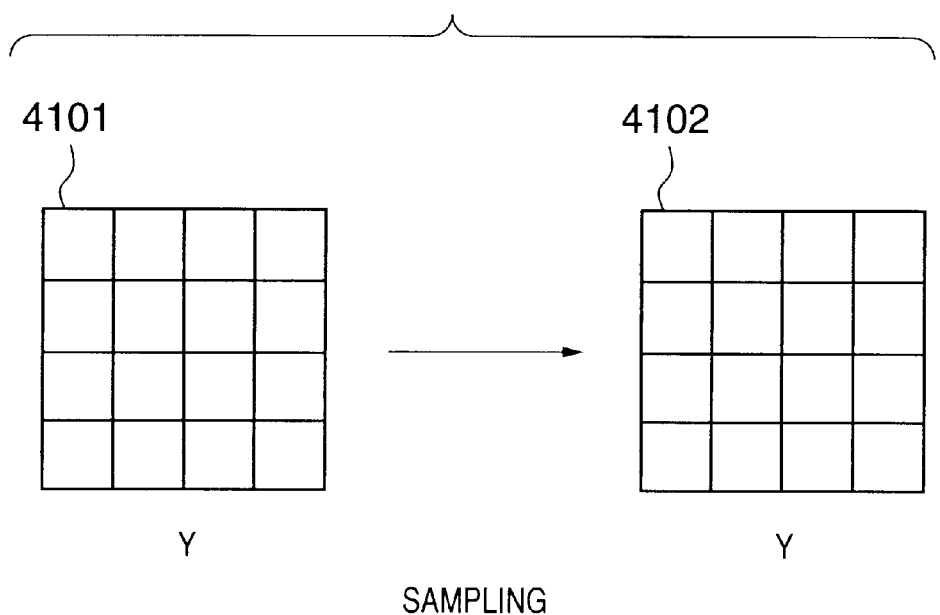
Y → Y
SAMPLING
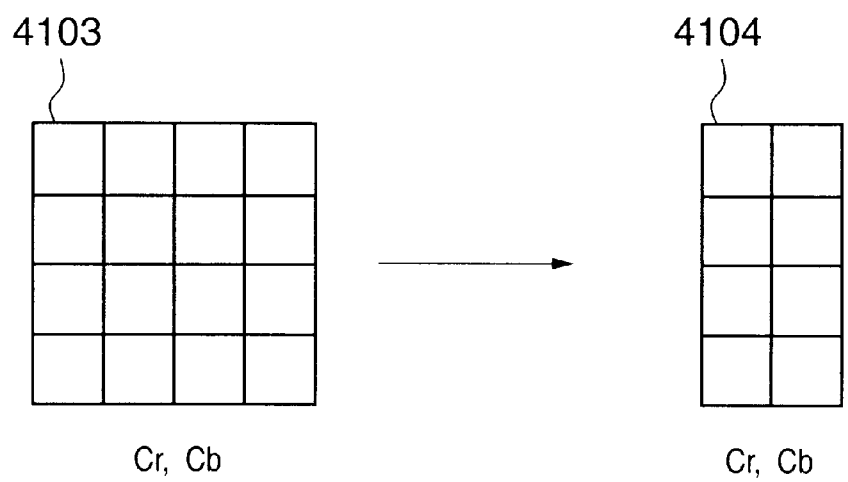
Cr, Cb → Cr, Cb

FIG. 42

|      |      |      |      |     |     |     |     |
|------|------|------|------|-----|-----|-----|-----|
| +c   | +c   | +c   | +c   | 0   | 0   | 0   | 0   |
| +c   | +c   | +c   | +c   | 0   | 0   | 0   | 0   |
| +c   | +c   | +c   | +c   | 0   | 0   | 0   | 0   |
| +c   | +c   | +c   | +c   | 0   | 0   | 0   | 0   |
| 0    | 0    | 0    | 0    | -c  | -c  | -c  | -c  |
| 0    | 0    | 0    | 0    | -c  | -c  | -c  | -c  |
| 0    | 0    | 0    | 0    | -c  | -c  | -c  | -c  |
| 0    | 0    | 0    | 0    | -c  | -c  | -c  | -c  |

4201 — upper-left block (+c)
4202 — lower-right block (-c)

DIFFERENTIAL OF PATTERN
ARRANGEMENT UNITS

| +C | +C | +C | +C | 0  | 0  | 0  | 0  |
|----|----|----|----|----|----|----|----|
| +C | +C | +C | +C | 0  | 0  | 0  | 0  |
| +C | +C | +C | +C | 0  | 0  | 0  | 0  |
| +C | +C | +C | +C | 0  | 0  | 0  | 0  |
| 0  | 0  | 0  | 0  | -C | -C | -C | -C |
| 0  | 0  | 0  | 0  | -C | -C | -C | -C |
| 0  | 0  | 0  | 0  | -C | -C | -C | -C |
| 0  | 0  | 0  | 0  | -C | -C | -C | -C |

| 0  | 0  | 0  | 0  | +C | +C | +C | +C |
|----|----|----|----|----|----|----|----|
| 0  | 0  | 0  | 0  | +C | +C | +C | +C |
| 0  | 0  | 0  | 0  | +C | +C | +C | +C |
| 0  | 0  | 0  | 0  | +C | +C | +C | +C |
| -C | -C | -C | -C | 0  | 0  | 0  | 0  |
| -C | -C | -C | -C | 0  | 0  | 0  | 0  |
| -C | -C | -C | -C | 0  | 0  | 0  | 0  |
| -C | -C | -C | -C | 0  | 0  | 0  | 0  |

| +C | +C | +C | +C | +C | +C | 0  | 0  | 0  | 0  | 0  | 0  |
|----|----|----|----|----|----|----|----|----|----|----|----|
| +C | +C | +C | +C | +C | +C | 0  | 0  | 0  | 0  | 0  | 0  |
| +C | +C | +C | +C | +C | +C | 0  | 0  | 0  | 0  | 0  | 0  |
| +C | +C | +C | +C | +C | +C | 0  | 0  | 0  | 0  | 0  | 0  |
| +C | +C | +C | +C | +C | +C | 0  | 0  | 0  | 0  | 0  | 0  |
| +C | +C | +C | +C | +C | +C | 0  | 0  | 0  | 0  | 0  | 0  |
| 0  | 0  | 0  | 0  | 0  | 0  | -C | -C | -C | -C | -C | -C |
| 0  | 0  | 0  | 0  | 0  | 0  | -C | -C | -C | -C | -C | -C |
| 0  | 0  | 0  | 0  | 0  | 0  | -C | -C | -C | -C | -C | -C |
| 0  | 0  | 0  | 0  | 0  | 0  | -C | -C | -C | -C | -C | -C |
| 0  | 0  | 0  | 0  | 0  | 0  | -C | -C | -C | -C | -C | -C |
| 0  | 0  | 0  | 0  | 0  | 0  | -C | -C | -C | -C | -C | -C |

| 0  | 0  | 0  | 0  | 0  | 0  | -C | -C | -C | -C | -C | -C |
|----|----|----|----|----|----|----|----|----|----|----|----|
| 0  | 0  | 0  | 0  | 0  | 0  | -C | -C | -C | -C | -C | -C |
| 0  | 0  | 0  | 0  | 0  | 0  | -C | -C | -C | -C | -C | -C |
| 0  | 0  | 0  | 0  | 0  | 0  | -C | -C | -C | -C | -C | -C |
| 0  | 0  | 0  | 0  | 0  | 0  | -C | -C | -C | -C | -C | -C |
| 0  | 0  | 0  | 0  | 0  | 0  | -C | -C | -C | -C | -C | -C |
| +C | +C | +C | +C | +C | +C | 0  | 0  | 0  | 0  | 0  | 0  |
| +C | +C | +C | +C | +C | +C | 0  | 0  | 0  | 0  | 0  | 0  |
| +C | +C | +C | +C | +C | +C | 0  | 0  | 0  | 0  | 0  | 0  |
| +C | +C | +C | +C | +C | +C | 0  | 0  | 0  | 0  | 0  | 0  |
| +C | +C | +C | +C | +C | +C | 0  | 0  | 0  | 0  | 0  | 0  |
| +C | +C | +C | +C | +C | +C | 0  | 0  | 0  | 0  | 0  | 0  |

FIG. 51
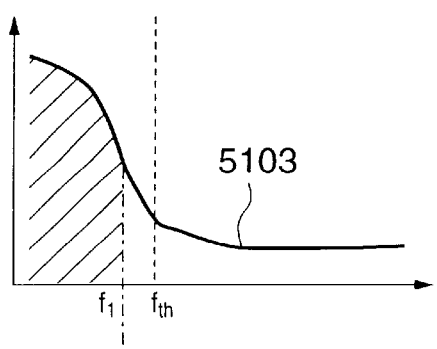
5101
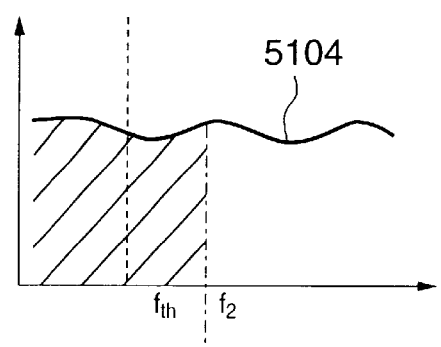
5102
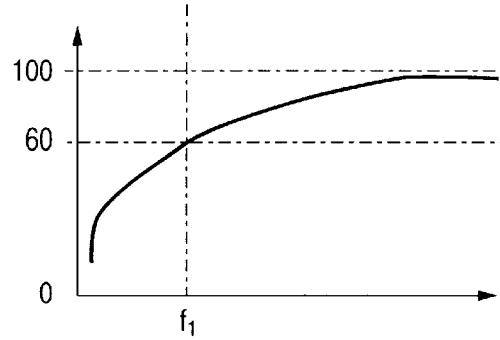
5105
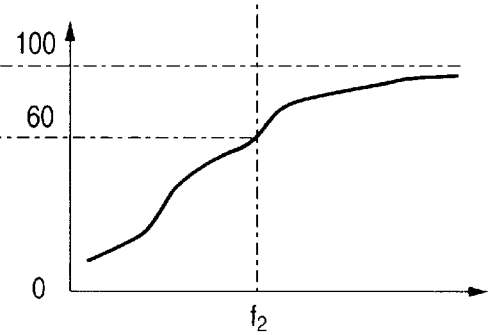
5106

FIG. 57

| 1 | 1 | 1 |
|---|---|---|
| 1 | -8 | 1 |
| 1 | 1 | 1 |

F I G. 59A 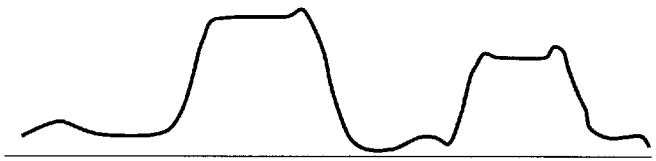
F I G. 59B 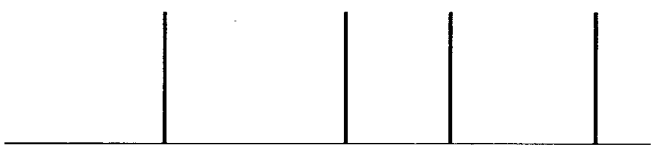
F I G. 59C 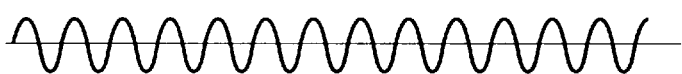
F I G. 59D 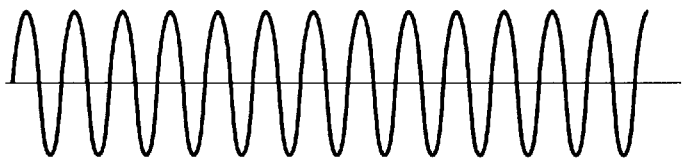
F I G. 59E 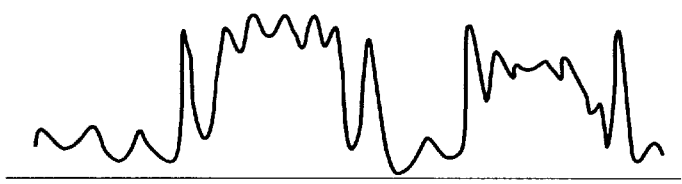

IMAGE PROCESSOR AND IMAGE PROCESSING METHOD

FIELD OF THE INVENTION

The present invention relates to an image processor and an image processing method for embedding a digital watermark in image data.

BACKGROUND OF THE INVENTION

In recent years, due to explosive development and widespread of computers and their networks, a variety of information such as character data, image data and voice data have been digitized. Digital information does not undergo degradation due to secular changes and thus can be stored in perfect state permanently, but it can be easily duplicated and therefore the protection of copyright becomes an important issue. For this reason, security technologies for protecting copyright assume greater importance at a rapid pace.

One of techniques for protecting copyright is a "digital watermark". The digital watermark is a technique of embedding the name of a possessor of copyright and the ID of a purchaser in digital image data, voice data, character data and the like in a form imperceptible by persons, and tracking unauthorized use thereof by illegal copying.

The digital watermark may be subjected to variety of attacks. They include, for example, irreversible compression such as JPEG, geometric transformation such as scaling or rotation, printout/scanning and noise attachment.

Here, a process called registration may be used particularly for providing resistance to geometric transformation. Registration is a process of adding a specific signal (registration signal) to an image in addition to added information at the time of embedding the digital watermark, and promoting the extraction of added information using the above described registration signal before added information is extracted, at the time of extracting added information.

Systems using the registration include a system proposed in U.S. Pat. No. 5,636,292. This is a system in which a geometric pattern embedded in advance is used to calculate automatically the geometric transformation applied to the image. In this system, the geometric transformation has a plurality of solutions because the geometric pattern has a symmetric axis, thus making unique identification impossible.

A system to solve this problem is proposed in Japanese Patent Laid-Open No. 11-355547. This system is a system in which as in the case of U.S. Pat. No. 5,636,292, the geometric pattern is used to perform registration, but the geometric pattern is comprised of two-dimensional waves that do not have symmetric axes, and therefore the geometric transformation does not have a plurality of solutions.

In these conventional systems, the registration signal is embedded equally for all images. On the other hand, the image signal may have different frequency properties, and preferred registration devices are not provided for all image signals having different frequency properties.

Also, conventionally, registration signal is embedded as a size equal to that of the entire image. On the other hand, it is desired that a registration signal having maximum amplitude is used for easy extraction, but this results in increased degradation of the image in which the digital watermark is embedded.

SUMMARY OF THE INVENTION

The present invention has been made to solve the problems of prior arts described above, and its object is to provide an image processor and an image processing method for embedding a registration signal more appropriately.

According to the present invention, the foregoing object is attained by providing an image processing method of embedding registration signals in image data, comprising: a feature component detecting step of detecting a feature component of the image data; a registration signal selecting step of selecting one registration signal from a plurality of registration signals, in accordance with the feature component; and an adding step of adding to the image data the registration signal selected by the registration signal selecting step.

According to another aspect of the present invention, the foregoing object is attained by providing an image processing method of inputting image data with registration signals embedded therein, subjected to geometric transformation, and extracting registration signals from the inputted image data to perform registration processing, comprising: a registration signal extracting step of extracting registration signals from the image data; a frequency property determining step of determining frequency properties of the image data; a geometric transformation identifying step of identifying geometric transformation to which the image data is subjected, using the extracted registration signals and determination results of the determination in the frequency property determining step; and a geometric transforming step of performing inverse transformation of the identified geometric transformation.

In still another aspect of the present invention, the foregoing object is attained by providing an image processor for embedding registration signals in image data, comprising: feature component detecting means for detecting a feature component of the image data; registration signal selecting means for selecting one registration signal from a plurality of registration signals, in accordance with the feature component; and adding means for adding to the image data the registration signal selected by the registration signal selecting means.

In still another aspect of the present invention, the foregoing object is attained by providing an image processor for inputting image data with registration signals embedded therein, subjected to geometric transformation, and extracting registration signals from the inputted image data to perform registration processing, comprising: registration signal extracting means for extracting registration signals from the image data; frequency property determining means for determining frequency properties of the image data; geometric transformation identifying means for identifying geometric transformation to which the image data is subjected, using the extracted registration signals and determination results of the determination by the frequency property determining means; and geometric transforming means for performing inverse transformation of the identified geometric transformation.

In still another aspect of the present invention, the foregoing object is attained by providing a computer program product embodying a program for implementing an image processing method of embedding registration signals in image data, the program comprising: a program code for the feature component detecting step of detecting a feature component of the image data; a program code for a registration signal selecting step of selecting one registration signal from a plurality of registration signals, in accordance with the feature component; and a program code for an adding step of adding to the image data the registration signal selected by the registration signal selecting step.

In still another aspect of the present invention, the foregoing object is attained by providing a computer data signal embodied in a propagating wave and used for implementing an image processing method of embedding registration signals in image-data, comprising: a code signal for use in a feature component detecting step of detecting a feature component of the image data; a code signal for use in a registration signal selecting step of selecting one registration signal from a plurality of registration signals, in accordance with the feature component; and a code signal for use in an adding step of adding to the image data the registration signal selected by the registration signal selecting step.

In still another aspect of the present invention, the foregoing object is attained by providing a computer program product embodying a program for implementing an image processing method of inputting image data with registration signals embedded therein, subjected to geometric transformation, and extracting registration signals from the inputted image data to perform registration processing, the program comprising: a program code for a registration signal extracting step of extracting registration signals from the image data; a program code for a frequency property determining step of determining frequency properties of the image data; a program code for a geometric transformation identifying step of identifying geometric transformation to which the image data is subjected, using the extracted registration signals and determination results of the determination in the frequency property determining step; and a program code for a geometric transforming step of performing inverse transformation of the identified geometric transformation.

In still another aspect of the present invention, the foregoing object is attained by providing a computer data signal embodied in a propagating wave and used for implementing an image processing method of inputting image data with registration signals embedded therein, subjected to geometric transformation, and extracting registration signals from the inputted image data to perform registration processing, comprising: a code signal for use in a registration signal extracting step of extracting registration signals from the image data; a code signal for use in a frequency property determining step of determining frequency properties of the image data; a code signal for use in a geometric transformation identifying step of identifying geometric transformation to which the image data is subjected, using the extracted registration signals and determination results of the determination in the frequency property determining step; and a code signal for use in a geometric transforming step of performing inverse transformation of the identified geometric transformation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a block diagram showing details of the embedment position determining unit in the preferred embodiment of the present invention;

FIGS. 17A and 17B show each pattern arrangement being developed on the mask shown in FIG. 16;

FIG. 19 illustrates computation for embedding added information Inf of the preferred embodiment of the present invention;

FIGS. 33A and 33B show an example of a pattern arrangement orthogonal to the pattern shown in FIG. 9;

FIG. 37 shows one example of each coefficient of the blue noise mask of the preferred embodiment of the present invention;

FIG. 38 shows one example of each coefficient of the cone mask of the preferred embodiment of the present invention;

FIG. 41 shows sampling of brightness and color-difference signals in the JPEG mode;

FIG. 42 shows positive and negative operational areas (patches) of the pattern arrangement;

FIGS. 49A to 49D show pattern arrangements for embedding added information Inf corresponding to each resolution of the image in the preferred embodiment of the present invention;

FIG. 51 illustrates a frequency property with a large amount of low frequency components;

FIG. 57 is a view for illustrating an edge detecting unit in the preferred embodiment of the present invention;

FIGS. 59A to 59E are views for illustrating embedment of the registration of the preferred embodiment of the present invention.

DETAILED DESCRIPTION OF THE PREFERRED EMBODIMENTS

Figure 1:
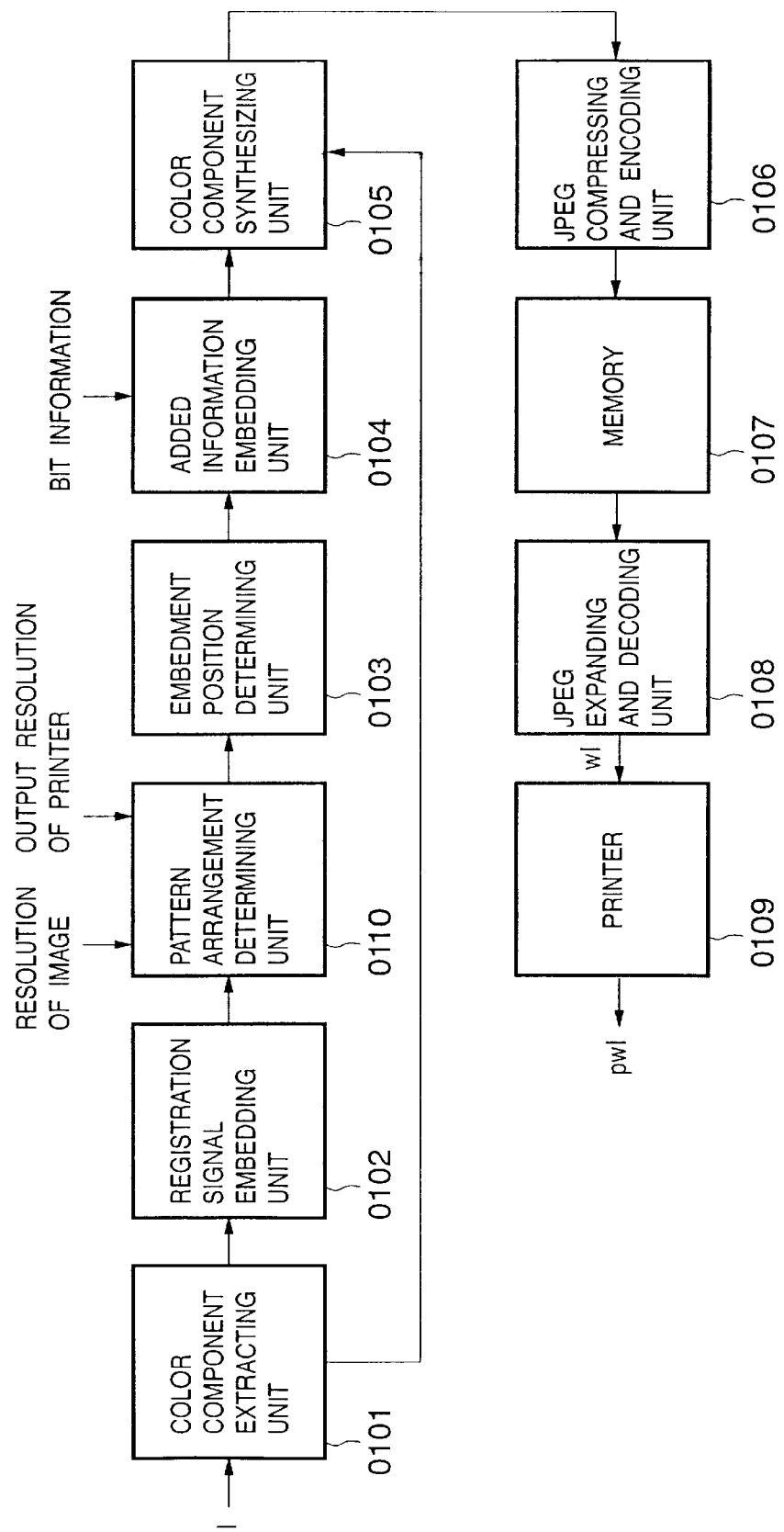
FIG. 1 is a block diagram showing a general configuration of a digital watermark embedding apparatus of the preferred embodiment of the present invention.

Preferred embodiments of this invention will be illustratively described in detail below, referring to the drawings. However, the relative placement of components, values, formulae and the like described in these embodiments are not intended to limit thereto the scope of this invention.

First Embodiment

1. Overview of Digital Watermark Embedding Apparatus

First, the outline of a digital watermark embedding apparatus will be described as a preferred embodiment of the present invention, referring to FIG. 1. FIG. 1 is a block diagram showing a general configuration of the digital watermark embedding apparatus.

As shown in FIG. 1, the digital watermark embedding apparatus includes a color component extracting unit 0101, a registration signal embedding unit 0102, a pattern arrangement determining unit 0110, an embedment position determining unit 0103, an added information embedding unit 0104, a color component synthesizing unit 0105, a JPEG compressing and encoding unit 0106, a memory 0107, a JPEG expanding and decoding unit 0108 and a printer 0109.

Image data I is inputted in this digital watermark embedding apparatus. The image data I that is inputted is multi-valued image data to which a predetermined plurality of bits is assigned to one pixel. Furthermore, in this embodiment, image data I that is inputted, whether it is gray scale image data or color image data, can be adapted.

The gray scale image data is configured such that one type of components constitute one pixel, and the color image data is configured such that three types of components constitute one pixel. In this embodiment, these three types of components are a red color component (R), a green color component (G) and a blue color component (B). However, the present invention is applicable to a combination of other color components.

The image data I inputted in the digital watermark embedding apparatus is first inputted in the color component extracting unit 0101. In the case where the inputted image data I is color image data, only the blue color component is separated from this image data by the color component extracting unit 0101, and is outputted to the registration signal embedding unit 0102 in the subsequent stage.

On the other hand, other color components are outputted to the color component synthesizing unit 0105 in the subsequent stage. That is, at this time, only the color component to which digital watermark information is to be embedded is separated and sent to a digital watermark processing system.

In this embodiment, embedment of digital watermark information is performed for the blue color component. This is due to the fact that of the red color, blue color and green color components, the blue color component is the most insensitive to the visual sense of human beings. Thus, the embedding of digital watermark information in the blue color component is effective in making degradation of image quality due to digital watermark information less perceptible by human eyes, compared to the embedding of digital watermark information of other components.

Also, in the case where the inputted image data I is gray scale image data, the color component extracting unit 0101 transforms the gray scale image data into pseudo color image data on a temporary basis.

The pseudo color cited herein is color image data configured such that three types components constitute one pixel, but in this embodiment, it is image data with the values of three types of components (R, G, B) being equal to one another.

The gray scale image data is transformed into the aforesaid pseudo color image data, and the blue color component (B) in this color image data is extracted and outputted to the registration signal embedding unit 0102.

On the other hand, other color components are outputted to the color component synthesizing unit 0105. In this way, as in the case of the color image data described above, digital watermark information is embedded in only the blue color component, not in all the color components.

Furthermore, in the following description, explanation will be presented such that cases where the image data I is color image data and cases where the image data I is gray scale data are not distinguished where possible. That is, explanation will be presented such that color image data and pseudo color image data are not distinguished.

The registration signal embedding unit 0102 will be described. The registration signal is a signal required for carrying out geometric correction as preprocessing for extraction of digital watermark information.

Image data of the blue color component obtained with the color component extracting unit 0101 is inputted in the registration signal embedding unit 0102. The registration signal embedding unit 0102 embeds the registration signal in image data using a type of digital watermark technique. That is, in the image data in which the registration signal is embedded, the registration signal is not perceptible by the visual sense of human beings. The registration signal embedding unit 0102 outputs the image data in which the registration signal is embedded.

The pattern arrangement determining unit 0110 prints, with the printer 0109, the image data in which digital watermark information is embedded, and determines a pattern arrangement for embedding digital watermark information (added information), based on the resolution of the image expressed by image data to be inputted and the output resolution of the printer, so that digital watermark information (added information) is adequately extracted (detected) even if the gray-level gray scale is changed to the area gray scale. A method of determining the pattern arrangement and the like will be described later.

Furthermore, the resolution of the image is defined as the number of pixels per inch of the image (bit map image) in the case of printing this image in predetermined size. Thus, in the case of printing an image in a predetermined size, as the number of pixels of the image is increased, the resolution of the image is enhanced. As a unit for expressing the resolution of images, pixel/inch is used.

Also, the output resolution of the printer represents the number of dots per inch printed on a print medium by the printer. As the number of dots per inch printed by the printer is increased, the resolution of the printer is enhanced.

The pattern arrangement determining unit 0110 outputs to the embedment position determining unit 0103 the pattern arrangement selected from a plurality thereof, along with the inputted image data. The embedment position determining unit 0103 determines an embedment position of added information Inf in the image data in which the registration signal is embedded. The embedment position determining unit 0103 also outputs to the added data information embedding unit 0104 control data expressing a position at which added information Inf is embedded in the image, along with the inputted data and the pattern arrangement.

The added information embedding unit 0104 inputs added information Inf (a plurality of bit information) in addition to the aforesaid image data, pattern arrangement and control data. This added information Inf is embedded at the aforesaid determined embedment position in the image data of the blue color using a digital watermark technique. The image data in which added information Inf is outputted by the added information embedding unit 0104, and is inputted in the color component synthesizing unit 0105.

The color component synthesizing unit 0105 uses the blue color component processed by the previous stages (up to added information embedding unit 0104) and the red color and green color components inputted directly from the color component extracting unit 0101 to synthesize a form of normal color image data.

The color image data obtained by the color component synthesizing unit 0105 is then outputted to the JPEG compressing and encoding unit 0106. The JPEG compressing and encoding unit 0106 transforms color image data comprised of the inputted red color, blue color and green color components into color image data comprised of the brightness and color different components to perform JPEG compression and coding.

JPEG compressed data compressed by the JPEG compressing and encoding unit 0106 is stored in the memory 0107 on a temporary basis. Then the JPEG compressed data is read from this memory at the timing when it is sent to an external apparatus or it is printed, and is outputted to the JPEG expanding and decoding unit 0108. The JPEG expanding and decoding unit 0108 expand the aforesaid JPEG compressed data and outputs it as color image data.

The color image data wI outputted from the JPEG expanding and decoding unit 0108 is inputted in the printer 0109. The printer 0109 transforms the inputted color image data into color components of CMYK, and subjects it to halftone processing, followed by outputting it as a printed matter pwI on a print medium such as paper.

Furthermore, there is a possibility that this printed matter pwI is passed to a person other than the user of this apparatus and is subjected to attacks such as geometric manipulation including rotation or copying with a copying machine. Assume that the aforesaid printed matter that could possibly be distorted is a printed matter pwI'. This printed matter pwI' will be digitized again using a scanner 0201 shown in FIG. 2.

Figure 31:
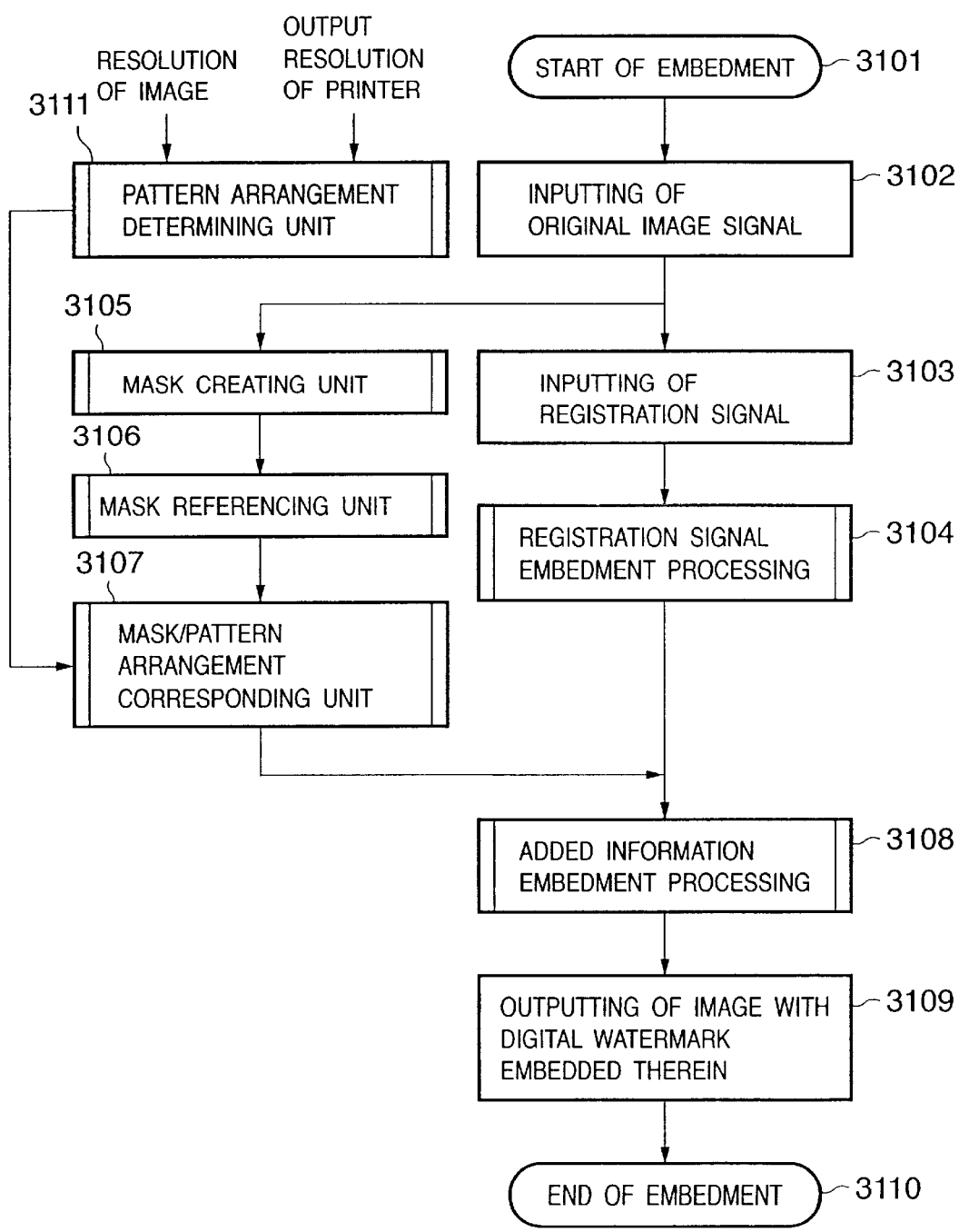
FIG. 31 is a flowchart for illustrating a total control of a digital watermark embedding apparatus of the preferred embodiment of the present invention.

A general control of the digital watermark embedding apparatus of this embodiment comprising each unit described above will be described below, referring to a flowchart shown in FIG. 31.

First, in Step 3102, image data I is inputted in the color component extracting unit 0101. This also includes a process of reading photographs and printed matters with a scanner or the like to generate image data. Furthermore, the color component extracting unit 0101 separates the blue color component from the inputted image data I to use the same as input of the registration signal of the subsequent stage.

Then, the registration signal is generated in Step 3103, and this registration signal is embedded in Step 3104. This registration signal embedment processing in Step 3104 corresponds to the processing that is performed within the registration signal embedding unit 0102 shown in FIG. 1.

In Step 3111, a pattern arrangement is determined by the pattern arrangement determining unit 0110. The pattern arrangement is used for embedding added information, in accordance with the output resolution of the printer 0109 and the resolution of the image.

Furthermore, a mask is created in Step 3105, and the mask created in Step 3105 is inputted in a mask referring unit in Step 3106 to define relationship between embedment bit information and the embedment position. In step 3107, the pattern arrangement determined in Step 3111 is inputted, and the mask is extended to an extended mask referring also to this pattern arrangement.

In Step 3108, added information Inf is embedded in the image data in which the registration signal is embedded in steps 3103 and 3104. In this added information embedment processing, added information Inf is repeatedly embedded in the entire image in units of macro blocks. This processing will be described in detail with FIG. 10 described later. Here, the macro block refers to a minimum embedded unit, and all the information of one integral added information Inf is embedded in an image area corresponding to this macro block.

In step 3109, the data in which added information inf is embedded is subjected to JPEG compression and coding and stored in the memory 0107, and is further subjected to JPEG expansion and decoding, and is then outputted as the printed matter pwI from the printer 0109.

2. Digital Watermark Extracting Apparatus

Figure 2:
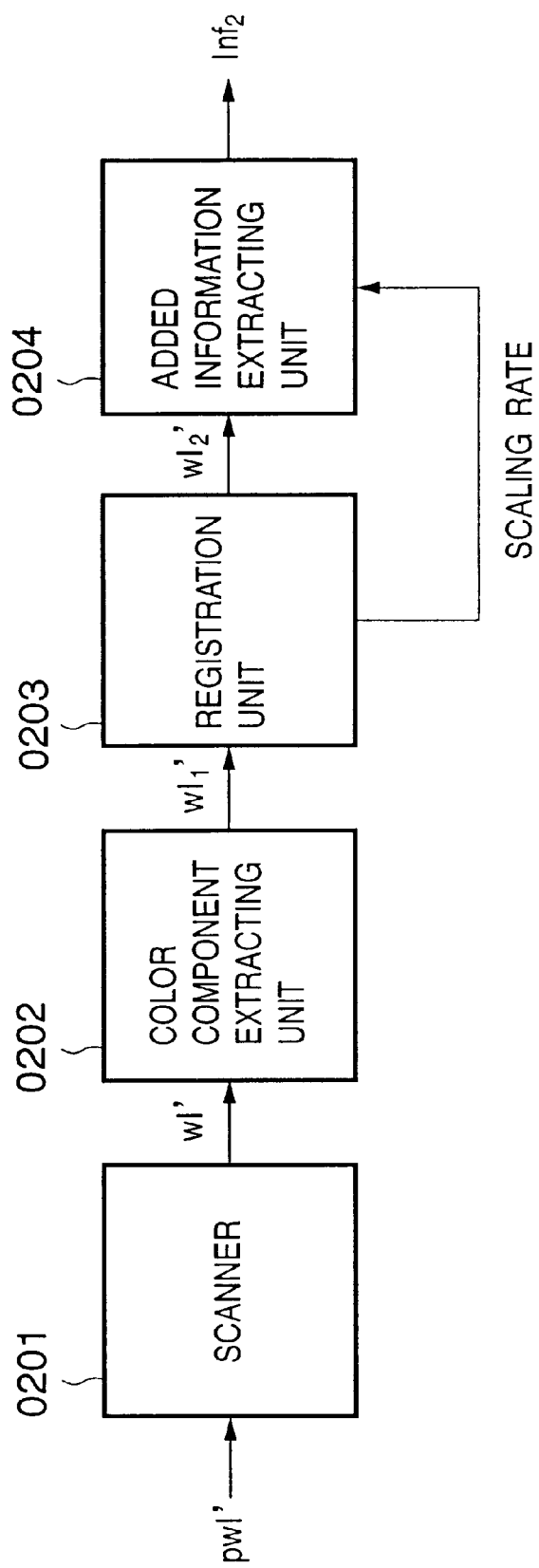
FIG. 2 is a block diagram showing a general configuration of a digital watermark extracting apparatus of the preferred embodiment of the present invention.

Now, the outline of the digital watermark extracting apparatus in this embodiment will be described referring to FIG. 2. FIG. 2 is a block diagram showing a general configuration of the digital watermark extracting apparatus in this embodiment.

As shown in FIG. 2, the digital watermark extracting apparatus of this embodiment is comprised of the scanner 0201, a color component extracting unit 0202, a registration unit 0203 and an added information extracting unit 0204. First, the printed matter pwI' is set on a manuscript stage of the digital watermark extracting apparatus, and the scanner 0201 scans this printed matter pwI', whereby digitized image data wI' is generated. As described above, there is a possibility that the pwI' is different from the printed matter pwI in FIG. 1.

The image data wI' has experienced attacks causing a variety of geometric distortions to the image data wI. Attacks include scaling, rotation, printing & scanning and the like, but in the case of this embodiment, attacks involving at least one-time printing & scanning. Therefore, ideally, the image data wI' and wI are identical with each other in contents, but in fact these two image data are often significantly different in contents from each other.

Thus, the color component extracting unit 0202 inputs image data wI' and extracts the blue color component, followed by outputting the image data of the blue color component to the registration unit 0203 in the subsequent stage. The red color and green color components other than the blue color in the image data wI' are not required, and are thus discarded at this time.

Image data $wI_1'$ of the blue color component obtained by the color component extracting unit 0202 is inputted by the registration unit 0203. Then this image data $wI_1'$ of the blue color is used to generate image data $wI_2'$ with geometric distortions corrected.

While the image data wI' is possibly different in scale from the image data wI as described above, the image data $wI_2'$ is always identical in scale to the image data wI. A reason for this and detailed processing for making the image data $wI_2'$ identical to the image data wI in scale will be described later.

The added information extracting unit 0204 is subjected to predetermined processing adapted for the embedment mode in the added information embedding unit 0103, whereby added information Inf embedded in the image data $wI_2'$ can be extracted and the embedded added information Inf is outputted.

The general control of the digital watermark extracting apparatus of this embodiment comprising each configuration described above will be described referring to the flowchart shown in FIG. 32.

First, in Step 3202, image data wI' is inputted. This image data wI' is obtained by scanning image data that is presumably the printed matter pwI with the scanner. Generally, the image data wI' is significantly different from the image data wI. Also, only the blue color component of this image data wI' is extracted and is used in the next step.

In next Step 3203, the scale of the inputted image data $wI_1'$ of the blue color component is corrected. This scale adjustment processing is a processing that is carried out in the registration unit 0203 in FIG. 2, and detailed description thereof will be presented later.

In next step 3211, a scaling rate outputted from step 3203 is used to determine the pattern arrangement used for embedding added information Inf. Then, in Step 3204, the offset of the inputted image data $wI_1'$ of the blue color component is corrected.

Extraction processing using a first pattern arrangement is performed in Step 3206 and extraction processing using a second pattern arrangement is performed in Step 3205, and thus form the image data $wI_2'$ with scale and offset already corrected is extracted the added information Inf embedded therein, respectively.

In Statistical testing step 3207, correctness of the aforesaid extracted added information Inf is calculated and determined. If it is determined in this Statistical testing step 3207 that the added information Inf is not correct, a return to Step 3202 is made, and an image in which the added information Inf is presumably embedded is inputted again.

On the other hand, if it is determined in the Statistical testing step 3207 that the added information Inf is correct, advancement to Step 3208 is made, and the added information Inf is extracted. Also, in Step 3210, information indicating the aforesaid correctness is displayed as a reliability index D described later.

Pattern arrangement determination processing, offset alignment processing, extraction processing using the first pattern arrangement, extraction processing using the second pattern arrangement, statistical testing processing and comparison processing as described above are processes that are performed within the added information extracting unit 0203 in FIG. 2, and detailed description thereof will be presented later.

3. Detailed Description of Each Part

Each part of this embodiment of which outline has been described will be now described in detail. First, the registration unit 0203 at the extracted side of the digital watermark, and processing called registration that is performed in Step 3203 will be described.

The registration processing is preprocessing allowing added information Inf to be extracted from image data wI' inputted in the digital watermark extracting apparatus at the time of extracting digital watermark information. Generally, the term "registration processing" not only means scale matching processing but also implicates position alignment processing and the like.

In this embodiment, however, the position alignment processing uses position information embedded as part of added information Inf, and is preformed in the added information extracting unit 0204.

In the following, first, how the image data subjected to processing of the print-system changes will be considered. Then, registration processing for such changes will be examined, and registration processing on the print-system will be considered.

This embodiment in which the image data wI is printed by a YMCK ink jet printer and this printed matter is scanned with a scanner is discussed.

At this time, in the case where the output resolution from the printer and the input resolution from the scanner are different from each other, the scale of the original image data wI is different from that of the image data wI' obtained through scanning. Thus, the possibility that digital watermark information can be correctly extracted directly from the obtained image data wI' is low. Therefore, it is necessary to provide a unit capable of correcting a difference between these scales.

In this embodiment, since both the input resolution and output resolution are known, a scale ratio can be calculated from the ratio between these resolutions. For example, if the output resolution is 600 dpi and the input resolution is 300 dpi, the scale ratio of the image before printing to the image after scanning is 1:2. Thus, scaling is applied to the image data wI' using an appropriate scaling algorithm, in accordance with the calculated scale ratio. This enables the image sizes expressed by the image data wI and the image data wI' to be adjusted to the same scale.

However, input and output resolutions are not necessarily known in all cases. In a case where both the resolutions are not known, the above described method cannot be used. In this case, in addition to a unit for correcting difference in scales, a unit for determining the scale ratio is further required.

Figure 3:
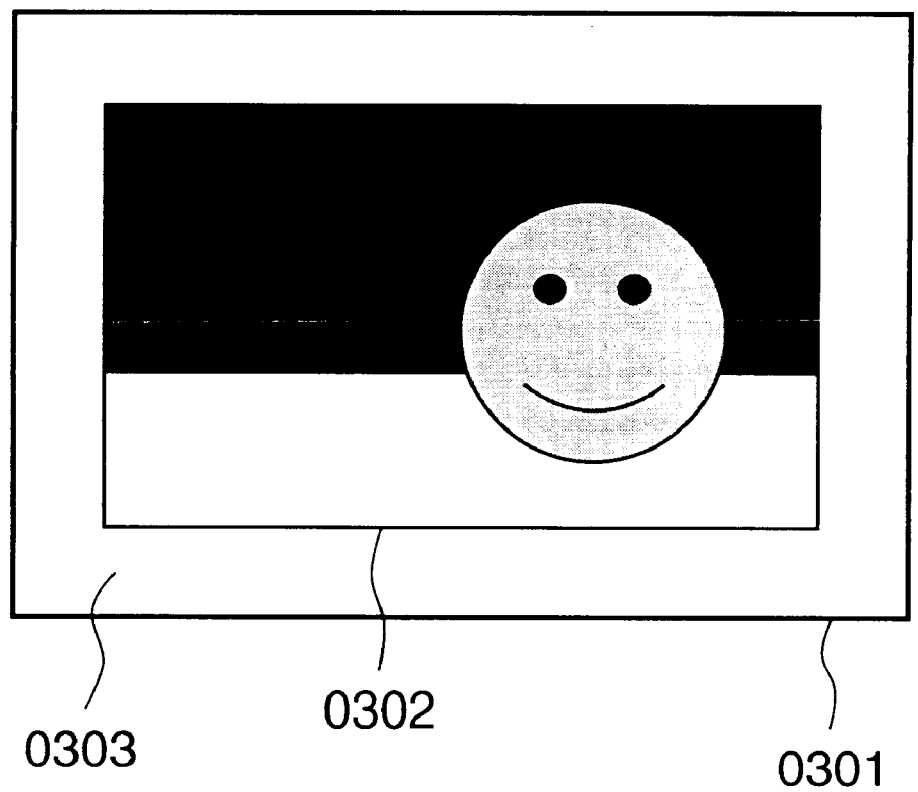
FIG. 3 shows one example of image data generated at the extraction side in print-system processing.

Also, an image with the image data wI subjected to processing of the print-system will be an image as shown in FIG. 3 after it is inputted through scanning of the scanner. In FIG. 3, the whole of 0301 is an image expressed by the image data wI'. This image data 0301 is comprised of an original image 0302 expressed by the image data wI and a white margin 0303. A margin like this, if cut by a user using a mouse and the like, results in incorrectness. Position alignment processing for position misalignment caused by scanning is performed through offset alignment processing in added information extraction processing 0204.

It can be considered that a problem like this is inevitably occurs for the image data wI' obtained through the print-system or the read-system. In the case where the image data wI is subjected to processing of the print-system, these problems should be solved.

Up to this point, cases where image data is obtained through at least onetime processing of the print-system before the digital watermark is extracted have been described, but a state like this can also occur from man-made edition.

3-1. Registration Signal Embedment Processing

The registration signal embedding unit and the registration unit in this embodiment provided for solving the above described problems which arise due to the difference in scale being caused will be described below, assuming that the ratio between input and output resolutions is unknown.

First, the registration signal embedding unit 0102 (Step 3104) will be described in detail.

The registration signal embedding unit 0102 is situated more to the front than the added information embedding unit 0104. This unit 0102 embeds in the original image data, in advance the registration signal referred to the registration of the image data wI' in the registration unit in FIG. 2. This registration signal is embedded in image data (the blue color component of color image data in the case of this embodiment) so that it is less perceptible by human eyes as digital watermark information.

First Typical Example of the Embedding Unit

Figure 4:
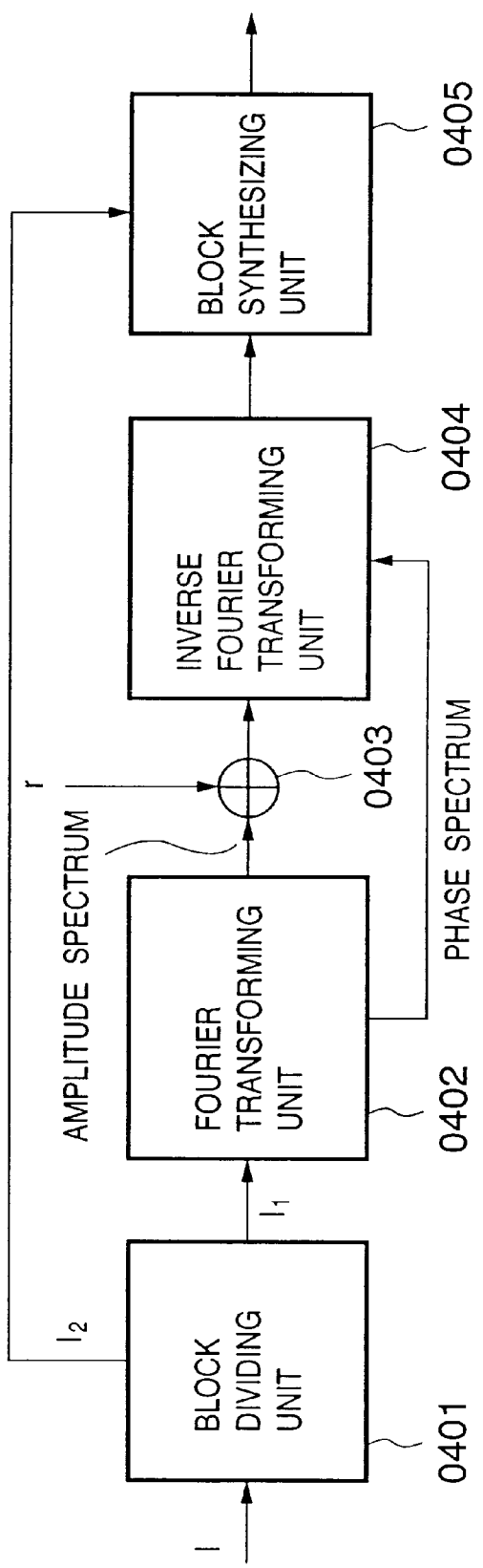
FIG. 4 is a block diagram showing a detailed configuration of registration a signal embedding unit of the preferred embodiment of the present invention.

An internal configuration of the registration signal embedding unit 0102 is shown in FIG. 4. The registration signal embedding unit 0102 includes a block dividing unit 0401, a Fourier transforming unit 0402, an adding unit 0403, an inverse Fourier transforming unit 0404 and a block synthesizing unit 0405. Details of each unit will be described below.

The block dividing unit 0401 divides inputted image data into a plurality of blocks that does not overlap one another. The size of this block is defined as a power of 2 in this embodiment. In fact, sizes other than this are applicable, but in the case where the size of the block is a power of 2, high-speed processing can be performed in the Fourier transforming unit 0402 that is coupled to the rear of the block dividing unit 0401.

Blocks divided by the block dividing unit 0401 are grouped into sets $I_1$ and $I_2$, and of these, $I_1$ is inputted in the Fourier transforming unit 0402 in the subsequent stage, and $I_2$ is inputted in the block synthesizing unit 0405 in the subsequent stage.

In this embodiment, one block situated nearest the center in the image data I is selected as $I_1$ out of the blocks obtained by the block dividing unit 0401, and all the remaining blocks are selected as $I_2$.

This is due to the fact that this embodiment can be achieved by using at least one block, and the less the number of blocks, the more process time can be reduced. However, the present invention should not be limited to this, but as a matter of course, cases where two or more blocks are selected as $I_1$ are also included in the category.

Also, information as to sizes in which image data is divided into blocks, and which blocks are selected for embedment of the registration signal is shared by the digital watermark embedding apparatus and the digital watermark extracting apparatus.

Part of image data $I_1$ obtained through dividing by the block dividing unit 0401 is inputted in the Fourier transforming unit 0402.

The Fourier transforming unit 0402 transforms the inputted image data $I_1$ by a Fourier transformation. While the original data form of the inputted image data $i_1$ is called a spatial domain, the data form after it is subjected to Fourier transformation is called a frequency domain. Fourier transformation is applied all the inputted blocks.

Furthermore, in this embodiment, since the size of the block to be inputted is a power of 2, fast Fourier transformation is used for enhancing the speed of processing.

While Fourier transformation requires a computation amount of n×n times, the fast Fourier transformation is a transformation algorithm that can be executed by a computation amount of (n/2) log$_2$ (n) times. Here, n is a positive integer. Fast Fourier transformation and Fourier transformation are different from each other in only the speed for obtaining results of computation, and the same result is obtained from the both. Therefore, in this embodiment, fast Fourier transformation and Fourier transformation are not distinguished in the present explanation.

Furthermore, image data in the frequency domain obtained by Fourier transformation is represented by amplitude spectra and phase spectra. Of these, only the amplitude spectra are inputted in the adding unit 0403. On the other hand, the phase spectra are inputted in the inverse Fourier transforming unit 0404.

The adding unit 0403 will be described. In the adding unit 0403, a signal r called a registration signal is separately inputted along with the aforesaid amplitude spectra. Examples of registration signals include an impulse signal 0502, 0503, 0504, and 0505 as shown in FIG. 5.

Figure 5:
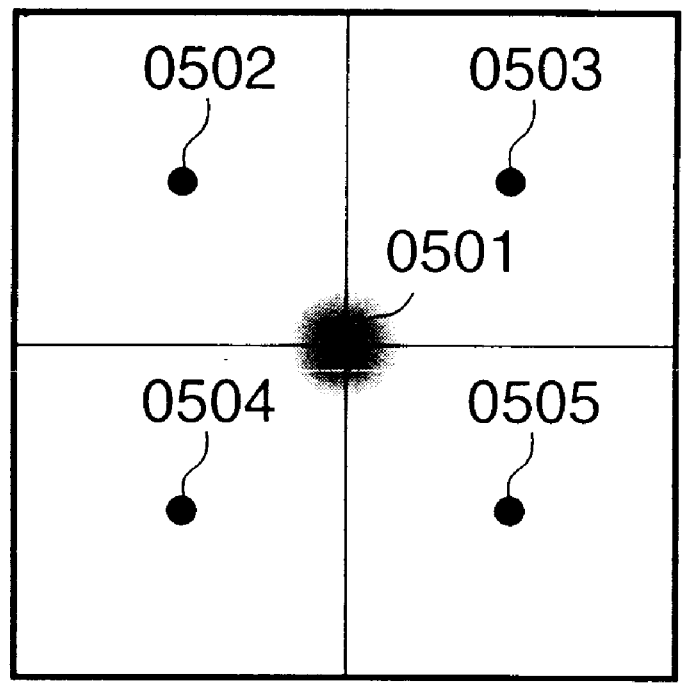
FIG. 5 is a view for illustrating registration signals of the preferred embodiment of the present invention.

In FIG. 5, the amplitude spectra of two dimensional spatial frequency components obtained through Fourier transformation are shown. The central one is a low frequency component and peripheral ones are high frequency components. 0501 is the amplitude spectrum of the signal component possessed by the original image component, and for signals corresponding to natural images such as photos, a large number of large signals are concentrated in the low frequency domain On the other hand, few signals exist in the high frequency domain.

Furthermore, in this embodiment, explanation is presented assuming that natural images are subjected to a series of processing, but the present invention should not be limited thereto, and document images, CG images and the like may be processed in a similar way. However, the form of this embodiment is especially effective in the case of processing natural images having a relatively large quantity of medium concentration.

FIG. 5 shows one example of this embodiment in which impulse signals 0502, 0503, 0504 and 0505 are added to lateral and vertical Nyquist frequency components of signals in the frequency domain for the signal 0501 that the natural image originally possesses. As in the case of this example, the registration signal is preferably an impulsive signal. This is because only the registration signal is easily extracted in the digital watermark extracting apparatus described later.

In the example shown in FIG. 5, impulse signals are added to Nyquist frequency components of input signals, but the present invention should not be limited thereto. That is, those signals where the registration signal is not removed even if an image in which the digital watermark information is embedded is attacked, may be accepted. As described above, an irreversible compression system such as JPEG compression has a low-pass filter like effect. Therefore, there is a possibility that even though the impulse signal is embedded in the high frequency component being a subject of information compression here, the signal is removed through compression/expansion processing.

On the other hand, embedment of the impulse in the low frequency component has a disadvantage in that the signal is more perceptible as noise due to visual characteristics of human beings, compared to embedment in the high frequency domain. Thus, in this embodiment, the impulse signal is embedded in a medium frequency, a first frequency or higher where the signal is hardly perceptible by the visual sense of human beings and a second frequency or lower where the signal is not easily removed through irreversible compression/expansion processing.

Also, this registration signal is added to each block (one block in the case of this embodiment) inputted in the adding unit 0403. The adding unit 0403 outputs to the inverse Fourier transforming unit 0404 a signal with the registration signal added to the amplitude spectrum of image data in the frequency domain.

The inverse Fourier transforming unit 0404 subjects the inputted image data in the frequency domain to inverse Fourier transformation. This Fourier transformation is applied to all the inputted blocks. As in the case of the above described Fourier transforming unit 0402, since the size of the inputted block is a power of 2, fast Fourier transformation is used for enhancing the speed of processing. The signal in the frequency inputted in the inverse Fourier transforming unit 0404 is transformed into a signal in the spatial domain through the inverse Fourier transformation, and is outputted.

The image data in the spatial domain, which is outputted by the inverse Fourier transforming unit 0404 is inputted in a block coupling unit 0405. The block coupling unit 0405 performs processing opposite to dividing performed by the block dividing unit 0405. As a consequence of processing by the block coupling unit 0405, image data (blue color component) is reconstructed and outputted.

Up to this point, details of the first typical example of the registration signal embedding unit 0102 have been described.

Second Typical Example of the Embedding Unit

A system in which the registration signal is embedded in the Fourier transformation area has been described with FIG. 4. But the present invention should not be limited to this example, and on the other hand, a system in which the registration signal is embedded in the spatial domain can also be considered. As a second typical example, an alternative example in which embedment of signals is performed in the spatial domain like this will be described using FIG. 29.

Figure 29:
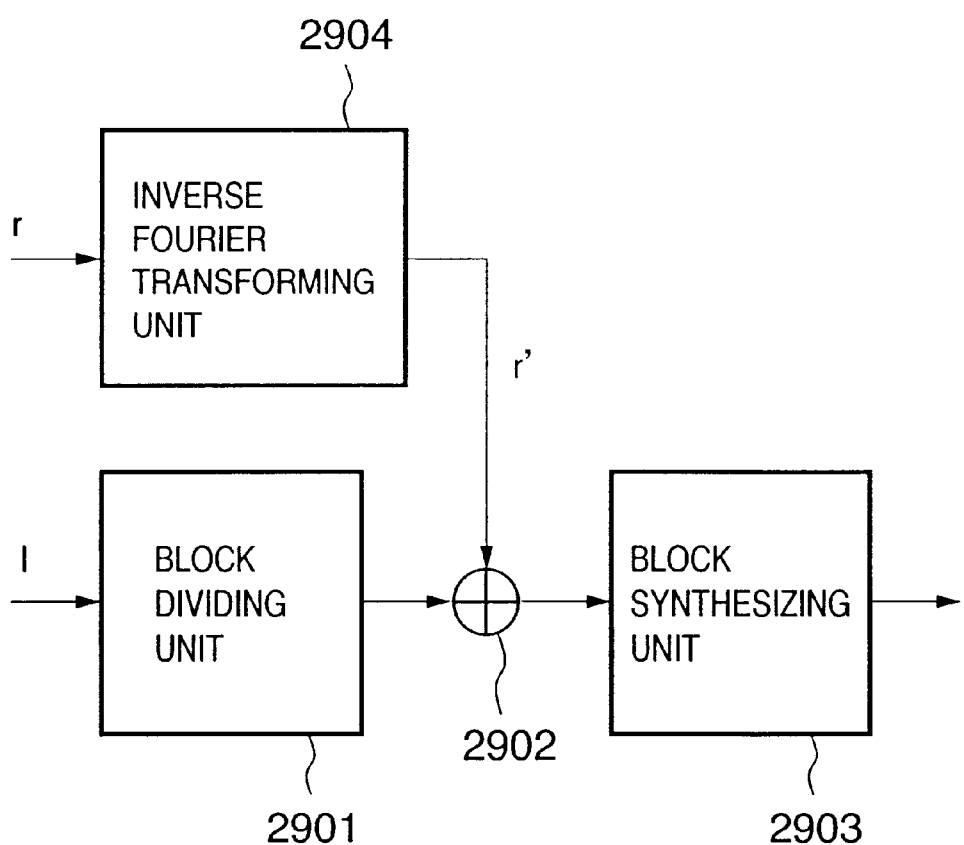
FIG. 29 is a block diagram showing a configuration of another embodiment of a registration signal embedding unit in a spatial domain.

As shown in FIG. 29, a block dividing unit 2901, an adding unit 2902, block synthesizing unit 2903 and an inverse Fourier transforming unit 2904 are used, in order to achieve a system in which the registration signal is embedded in the spatial domain.

The block dividing unit 2901 and the block synthesizing unit 2903 operate as in the case of the block dividing unit 0401 and the block synthesizing unit 0405 in FIG. 4. Image data that is inputted in the registration signal embedding unit 0102 is first inputted in the block dividing unit 2901, and is split. Blocks obtained here are inputted in the adding unit 2902. On the other hand, the registration signal r is inputted in the inverse Fourier transforming unit 2904, and is transformed into a signal r' by through inverse Fourier transformation processing. At this time, the registration signal r' is a signal on the frequency domain as in the case of those shown in FIG. 5.

Blocks from the block dividing unit 2901 and the signal r' from the inverse Fourier transforming unit 2904 are inputted in the adding unit 2902, and are added respectively. The signal outputted from the adding unit 2902 is inputted in the block synthesizing unit 2903, and image data (blue color component) is reconstructed and outputted.

The configuration shown in FIG. 29 is to perform processing as in the case of FIG. 4 in the spatial domain, but is capable of performing more speedy processing because it requires no Fourier transforming unit, compared to the configuration in FIG. 4.

First Preferable Embodiment of Embedding Unit

Now, a registration signal embedding method for making detection of the registration signal easier compared to the configurations shown in FIG. 4 and FIG. 9 will be described as a first embodiment of the embedding unit, using FIG. 50.

Figure 50:
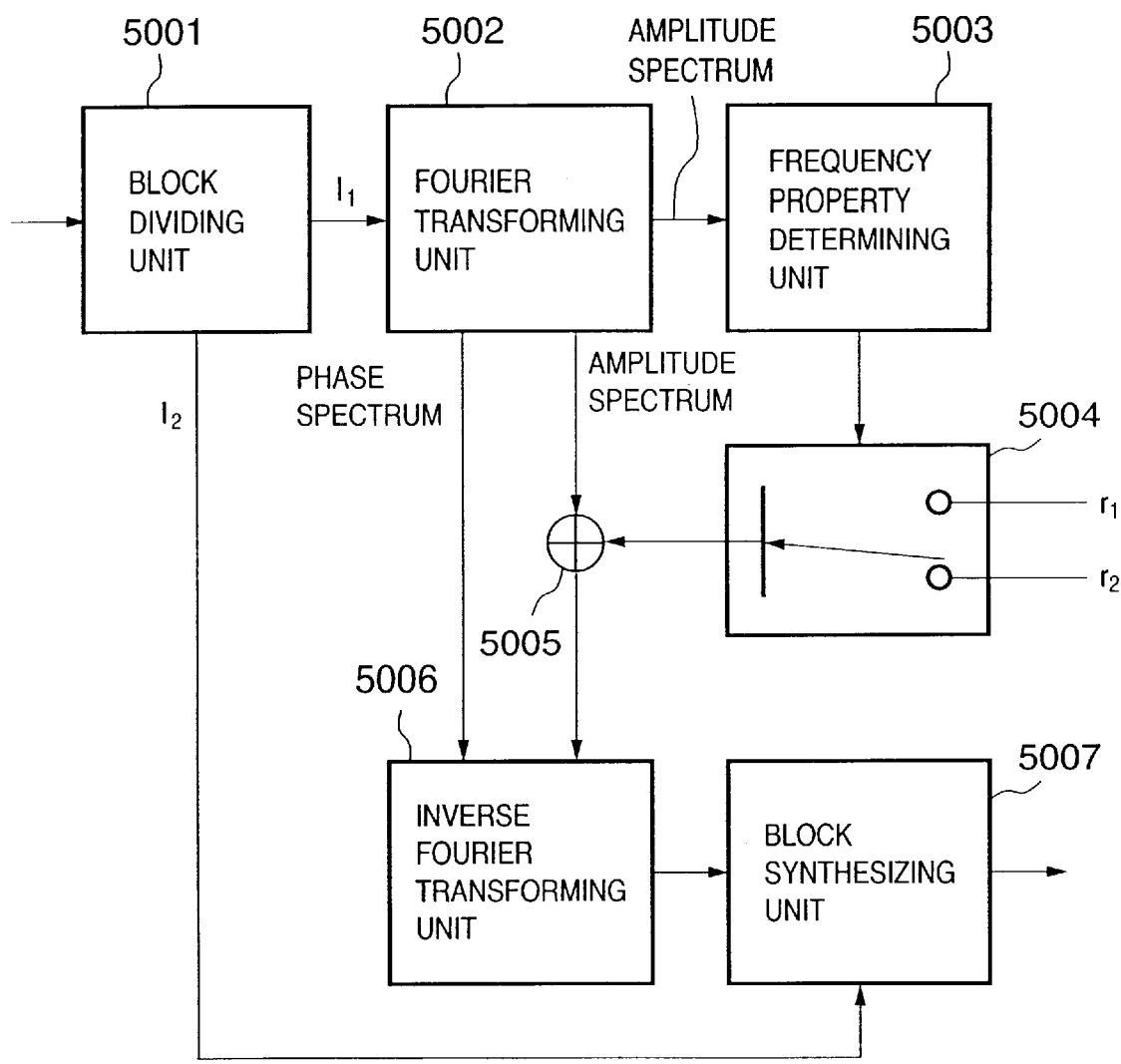
FIG. 50 is a block diagram showing details of another example of the registration signal embedding unit in the preferred embodiment of the present invention.

In FIG. 50, a block dividing unit 5001, a Fourier transforming unit 5002, a frequency property determining unit 5003, a switching unit 5004, an adding unit 5005, an inverse Fourier transforming unit 5006 and a block synthesizing unit 5007 are used. Details of each unit will be explained below.

The block dividing unit 5001 and the block synthesizing unit 5007 operate as in the case of the block dividing unit 0401 and the block synthesizing unit 0405 in FIG. 4. Image data is inputted in the registration signal embedding unit 0102 is first inputted in the block dividing unit 5001 and is split.

A set $I_1$ constituted by at least one block in blocks divided by the block dividing unit 5001 is inputted in the Fourier transforming unit 5002, and a set $I_2$ constituted by blocks other than those of the set $I_1$ is inputted in the block synthesizing unit 5007 as is. The set $I_1$ of blocks inputted in the Fourier transforming unit 5002 is subjected to Fourier transformation, and amplitude spectra thereof are inputted in the frequency property determining unit 5003 and the adding unit 5005.

On the other hand, phase spectra are inputted in the inverse Fourier transforming unit 5006. In the frequency property determining unit 5003, frequency properties are determined for each block of the set $I_1$ of blocks, and the results thereof are inputted in the switching unit 5004. Details of the frequency property determining unit 5003 will be described later.

In the switching unit 5004, in accordance with the result of determination from the frequency property determining unit 5003 in the previous stage, any of a first registration signal $r_1$ and a second registration signal $r_2$ is adaptively selected and inputted in the adding unit 5005. Detailed description of the first registration signal $r_1$ and the second registration signal $r_2$ will be presented later.

The amplitude spectrum of the set $I_1$ of blocks and any one of the first registration signal $r_1$ and the second registration signal $r_2$ are inputted in the adding unit 5005, and are added one after another. The added signal is inputted by the inverse Fourier transforming unit 5006.

The phase spectrum in addition to the amplitude spectrum to which the registration signal is added is inputted in the inverse Fourier transforming unit 5006, and inverse Fourier transformation is performed using the both spectra, and the result thereof is inputted by the block synthesizing unit 5007. In the block synthesizing unit, the set $I_2$ is further inputted, and image data (blue color component) is reconfigured and outputted.

Now, the frequency property determining unit 5003 will be described in detail. In the frequency property determining unit 5003, the frequency property of the amplitude spectrum is determined and the result thereof is outputted to the switching unit 5004. A specific example will be now described referring to FIG. 51.

In FIG. 51, 5101 shows an example of a spectrum of image signals having a large number of signals in relatively low frequency components. 5103 represents an amplitude spectrum. Generally, natural images and the like often have frequency properties as shown by 5101.

On the other hand, 5102 shows an example of an amplitude spectrum of image signals having high amplitude even in relatively high frequency components compared to 5101. 5104 represents an amplitude spectrum. Generally, line images that are used for CG and negotiable instruments, and so on often have frequency properties as shown by 5102.

In the frequency property determining unit 5003, a first image signal having smaller number of high frequency components as shown by 5101 and a second image signal having larger numbers of high frequency components as shown 5102 are separated from each other, and the result of the separation is outputted.

Methods for separating the above described first image and the above described second image from each other include a variety of methods, but one example thereof is a method in which a cumulative histogram from the low frequency component of the amplitude spectrum is used.

For example, in an amplitude spectrum of the first image signal as shown by 5101, the cumulative histogram from the lowest frequency component to the highest frequency component is one as shown by 5105. Similarly, in an amplitude spectrum of the second image signal as shown by 5102, the cumulative histogram is one as shown by 5106. At this time, a first frequency having a predetermined value in the cumulative histogram is calculated one after another.

In FIG. 51, an example where the above predetermined value is 60% is shown. In this case, the above described first frequency equals $f_1$ in 5105, and the above described first frequency equals $f_2$ in 5106. Furthermore, the above described calculated first frequency is compared with a predetermined second frequency $f_{th}$ that is determined in advance.

When the first frequency is smaller than the second frequency, it is determined that the inputted image signal is "an image signal having a relatively small number of high frequency components". On the other hand, when the first frequency is higher than the second frequency, it is determined that the inputted image signal is "an image signal having a relatively large number of high frequency components".

In the example shown in FIG. 51, 5101 is determined as "an image signal having a relatively small number of high frequency components", and 5102 is determined as "an image signal having a relatively large number of high frequency components".

The switching unit 5004 will be described in detail. In the switching unit 5004, in accordance with the frequency property of the image signal inputted from the frequency property determining unit 5003 in the previous stage, any one of the first registration signal $r_1$ and the second registration signal $r_2$ is adaptively selected and outputted.

In this embodiment, the first registration signal $r_1$ is selected in the case where the "image signal having a relatively small number of high frequency components" is entered from the frequency property determining unit 5003, while the second registration $r_2$ is selected in the case where the "image signal having a relatively large number of high frequency components" is entered from the frequency property determining unit 5003.

The first registration signal $r_1$ and the second registration signal $r_2$ will be now described in detail. Generally, it is more desirable that the registration signal has spectrum in the low frequency component. This is for the purpose of enabling the digital watermark to be extracted even in the case where image data in which the registration signal is subjected to various kinds of attacks.

The above described attacks include irreversible compression such as JPEG and printout/scanning, but in general, the high frequency component of the image signal is often removed. Therefore, it is desirable that the registration signal is embedded in the low frequency domain, because there is a possibility that the registration signal embedded in the high frequency domain is removed by the above described attacks.

On the other hand, if the registration signal is indiscriminately embedded in the low frequency domain, separation from the original image data may be impossible, thus making it difficult to extract only the registration signal by registration processing described later. Particularly, in the case where the original image signal is an image signal having a relatively large number of high frequency components, it is desirable that the registration signal is embedded in the high frequency domain. Therefore, in this embodiment, the frequency component in which the registration signal is embedded is determined adaptively in accordance with the frequency property of the original image data.

Figure 52A:
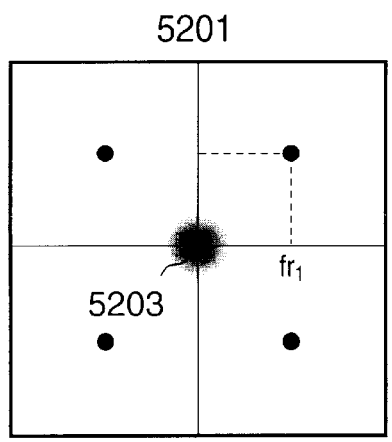
FIGS. 52A and 52B illustrate first and second registrations of the preferred embodiment of the present invention.
Figure 52B:
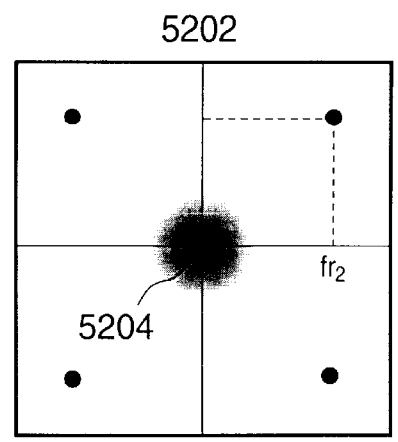

Specific description will be presented using examples shown in FIGS. 52A and 52B. One example of the first registration signal $r_1$ is shown in FIG. 52A and one example of the second registration signal $r_2$ is shown in FIG. 52B. FIG. 52A shows a signal having an impulsive spectrum only at a frequency $f_{r1}$, and FIG. 52B shows a signal having an impulsive spectrum only at a frequency $f_{r2}$. Here, $f_{r1} < f_{r2}$ holds. In other words, the first registration signal and the second registration signal both have impulsive spectra, and the first registration signal $r_1$ is a signal that has an impulse in a lower frequency component, compared to the second registration signal $r_2$.

Figure 53:
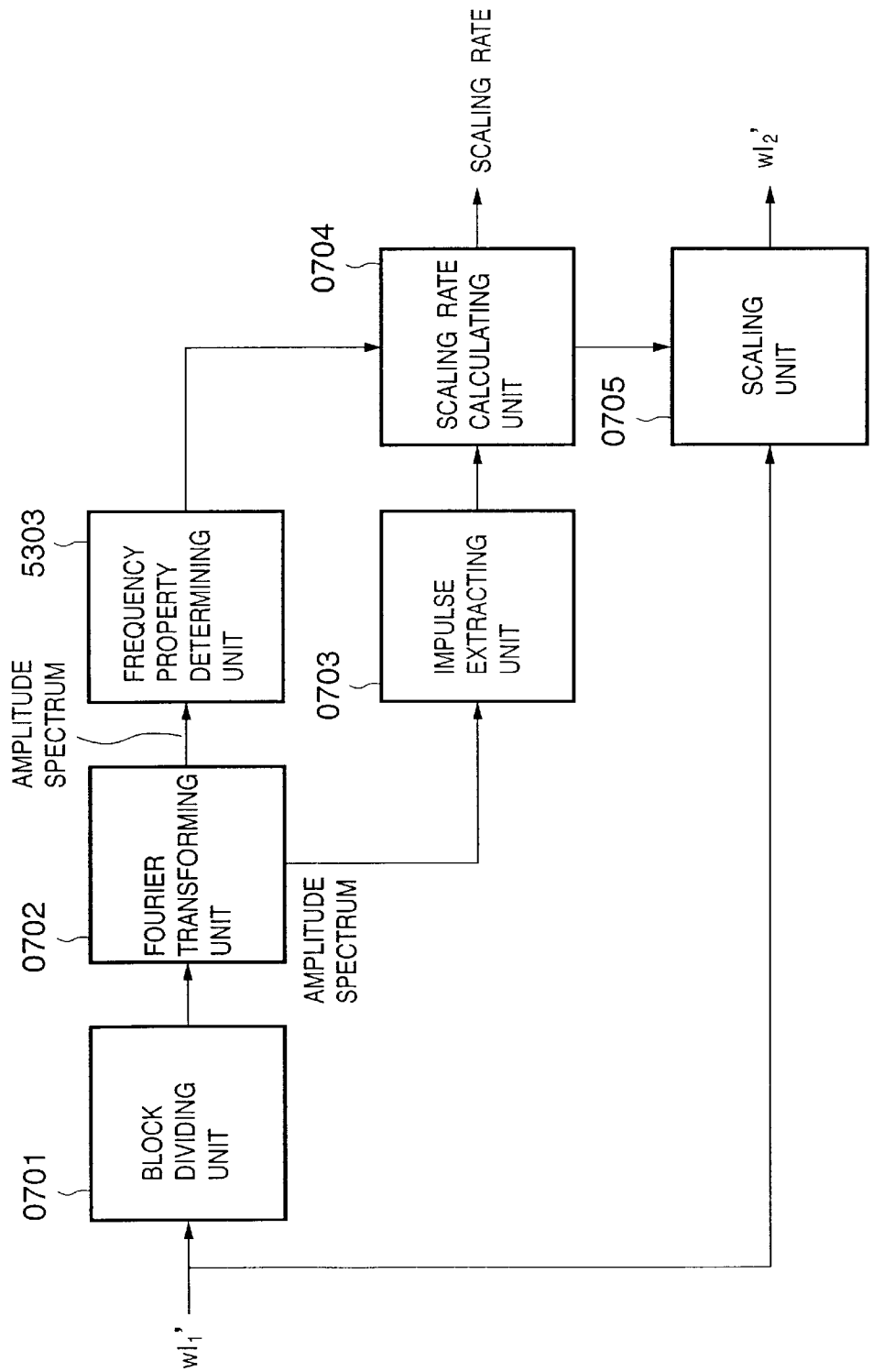
FIG. 53 is a block diagram showing details of the registration unit-of the preferred embodiment of the present invention.

The registration signal having an impulse in the low frequency component $f_{r1}$ is used for the image signal having "a relatively small number of high frequency components" as shown in 5203, and the registration signal having an impulse in the high frequency component $f_{r2}$ is used for the image signal having "a relatively large number of high frequency components" as shown in 5204, thereby making it possible to extract the impulse more easily in registration processing using a configuration as shown in FIG. 53. The configuration shown in FIG. 53 will be described in detail in the paragraph of [3-6. Registration processing].

Second Embodiment of the Embedding Unit

Figure 54:
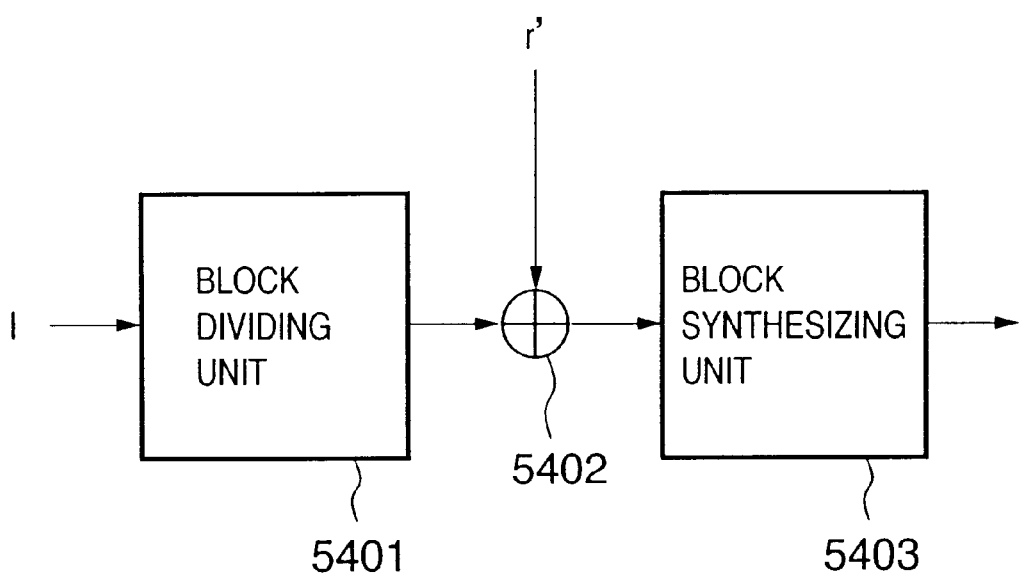
FIG. 54 shows an example of a configuration of the registration signal embedding unit of the preferred embodiment of the present invention.

In FIG. 29, the signal r' is a signal independent of input image data I. Therefore, calculation of the signal r', namely processing of the Fourier transforming unit 2904 does not need to be performed each time the image data I is inputted, and it is possible to generate r' in advance, as a second embodiment of the embedding unit. In this case, as shown in FIG. 54, the inverse Fourier unit 2904 may also be removed from the configuration shown in FIG. 29, and the registration signal can be embedded at still higher speed. FIG. 54 shows details of the second embodiment of the registration signal embedding unit.

The registration signal embedding unit in this embodiment, as shown in FIG. 54 is constituted by a block dividing unit 5401, an adding unit 5402 and a block synthesizing unit 5403.

The block dividing unit 5401 and the block synthesizing unit 5403 operate as in the case of the block dividing unit 0401 and the block synthesizing unit 0405 in FIG. 4. Image data to be inputted in the registration signal embedding unit 0102 is first inputted in the block dividing unit 5401 and is split.

Blocks obtained here are inputted in the adding unit 5402. The block from the block dividing unit 5401 and the signal r' are inputted and are added respectively. Details on the signal r' will be described later. The signal outputted from the adding unit 5402 is inputted in the block synthesizing unit 5403, and image data (blue color component) is reconfigured and outputted.

The above processing is all performed in the spatial domain. This means that Fourier transforming processing and inverse Fourier transforming processing are not needed. Thus, speedier processing can be performed compared to the case of FIG. 4 or FIG. 29 where both of Fourier transformation and inverse Fourier transformation are required, or one thereof is required.

The signal r' is a registration signal, and a signal in the spatial domain. This signal r' is a signal as expressed by the amplitude spectrum in the frequency domain, and a signal as shown as impulse signals 0502 to 0505 in FIG. 5. Actually, however, it is obtained by subjecting a signal as shown in FIG. 5 to inverse Fourier transformation. In the case where r' has an impulsive amplitude spectrum in the frequency domain as shown in FIG. 5, it is a signal having specific periodicity in the spatial domain.

Figure 55:
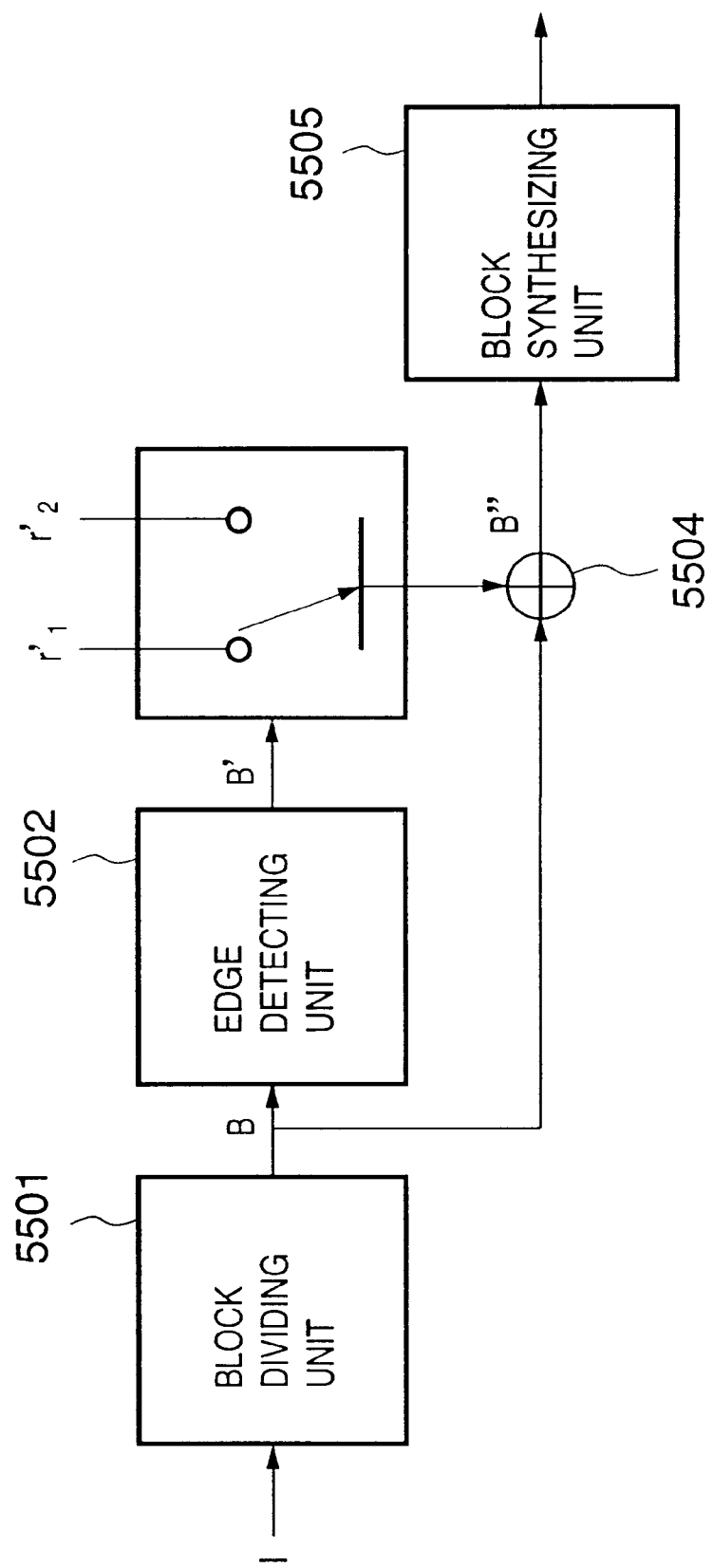
FIG. 55 shows another example of a configuration of the registration signal embedding unit of the preferred embodiment of the present invention.

Using FIG. 55, a method is described where the registration signal is still more easily detected and degradation of images is reduced, compared to the method shown in FIG. 54. FIG. 55 shows another configuration of the registration signal embedding unit of this embodiment.

As shown in FIG. 55, it is comprised of a block dividing unit 5501, an edge detecting unit 5502, a switching unit 5503, an adding unit 5504 and a block synthesizing unit 5505.

The block dividing unit 5501 and the block synthesizing unit 5505 operate as in the case of the block dividing unit 0401 and the block synthesizing unit 0405 in FIG. 4. Image data to be inputted in the registration signal embedding unit 0102 is first inputted in the block dividing unit 5501 to be split.

Blocks obtained here are inputted in the edge detecting unit 5502 and the adding unit 5504. In the edge detecting unit 5502, only an edge component is detected and outputted out of the image signal in the inputted blocks.

The detected edge component is inputted by the switching unit 5503. The edge component is inputted by the switching unit 5503, and any one of a first registration signal $r'_1$ and a second registration signal $r'_2$ is adaptively selected by the above described edge component and is outputted.

Details on the first registration signal $r'_1$ and the second registration signal $r'_2$ will be described later. The registration signal obtained from the block dividing unit 5501 and the registration signal obtained from the switching unit 5503 are inputted by the adding unit 5504 and are added one after another.

The signal inputted from the adding unit 5504 is inputted by the block synthesizing unit 5505, and image data (blue color component) is reconfigured and outputted.

Detailed processes in edge detection processing 5502 will be now described. In edge detection processing 5502, only an edge component is detected from the inputted image signal. The edge component is a portion in which the gray level of the image rapidly changes. Previously well-known image processing techniques may be used in this method.

Figure 56:
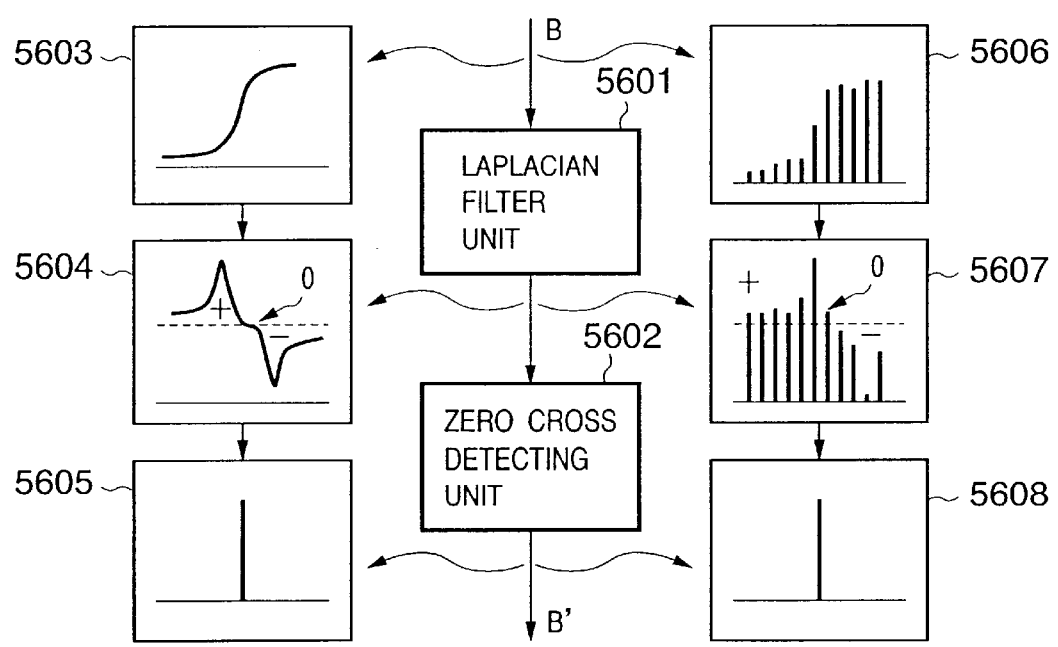
FIG. 56 is a view for illustrating an example of uses of a Lapracian filter of the preferred embodiment of the present invention.

Of these techniques, a method in which a Laplacian filter is used will be described using FIG. 56. FIG. 56 is a view for illustrating an example in which the Laplacian filter of this embodiment is used.

As shown in FIG. 56, in this embodiment, it is constituted by a Laplacian filtering unit 5601 and a zero cross detecting unit 5602.

In the Laplacian filtering unit 5601, the image is subjected to filtering by the Laplacian filter. A secondary differential value at a target point of the image signal can be calculated with the Laplacian filter. Here, for an example of the Laplacian filter, a filter as shown in FIG. 57 can be used.

Figure 57:
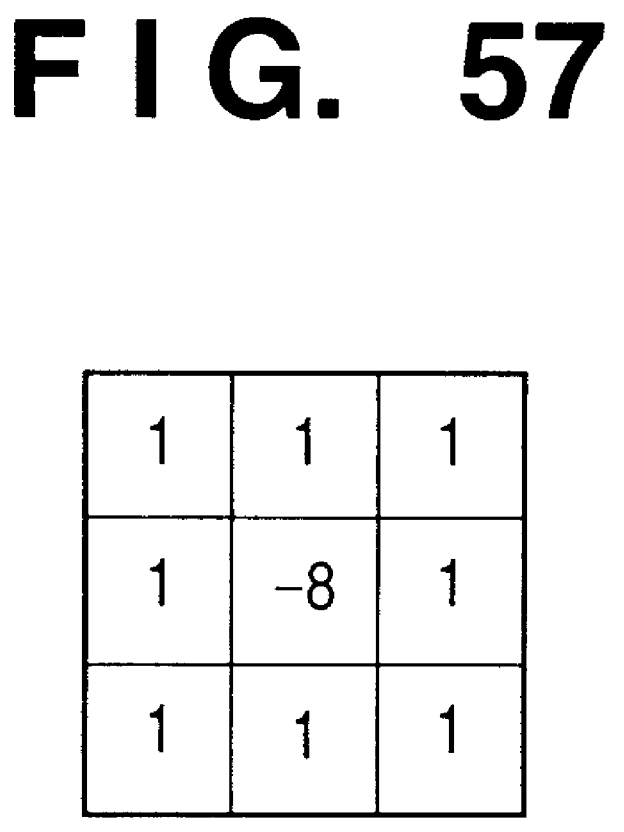

For calculating a secondary differential value at the targeted point of the image signal, the center (portion represented by a coefficient "−8") is matched with the target point of the image to perform convolution computation, in the Laplacian filter as shown in FIG. 57. The result of the convolution computation is the secondary differential value at the targeted point of the image signal.

The whole image signal is subjected to the above processing, whereby the secondary differential of the image data can be calculated. For example, in FIG. 56, when the image signal 5603 is inputted, 5604 is calculated as a secondary differential of this signal.

Detailed processes in the zero cross detecting unit 5602 will be now described. In the zero cross detecting unit 5602, a point at which the value of the secondary differential calculated in the previous stage equals 0 is calculated. This point is outputted as the edge component B' of the image signal B. For example, in FIG. 56, a zero cross as shown by 5605 is calculated from a secondary differential value such as 5604.

Here, in fact, the inputted image signal is not a sequential signal like 5603, but a discrete signal as shown by 5606. Thus, secondary differential for this discrete signal, which also leads to a discrete signal, is determined as shown by 5607.

Then, there is a high possibility that a point at which the value equals 0 is not detected. Hence, in this embodiment, a point at which the value of secondary differential is changed from a positive value to a negative one, or from a negative value to a positive one is detected as a zero cross.

Specifically, products of the value at the target point and values of the neighboring points are calculated, and a point at which the product is a negative value is determined as a zero cross. Thus, a zero cross is determined as shown by 5608, from secondary differential of a discrete signal such as 5607. Furthermore, as shown by 5608, for output in the edge component detecting unit, the section equal to the edge component is outputted as ON, and the section not equal to the edge component is outputted as OFF.

Through the aforesaid processing, the edge component B' of the image signal B is detected.

Detailed processes in the switching unit 5503 will be now described. In the switching unit 5503, the edge component B' of the image signal B is inputted, and in accordance with this edge component B', the registration signal $r'_1$ or $r'_2$ is adaptively selected, and any one thereof is outputted. The registration signals $r'_1$ and $r'_2$ will now be described in detail.

Figure 58:
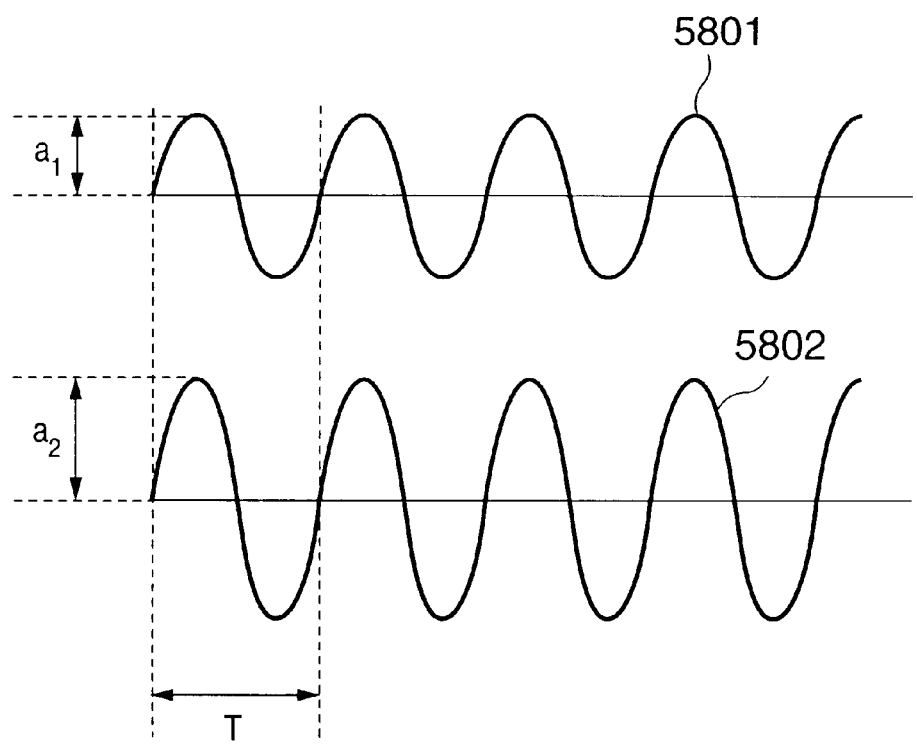
FIG. 58 illustrates the first and second registration signals in the preferred embodiment of the present invention.

Examples of the registration signal $r'_1$ and the registration signal $r'_2$ are shown in FIG. 58. In FIG. 58, 5801 is the registration signal $r'_1$ in the spatial domain, and 5802 is the registration signal $r'_2$ in the spatial domain. Each signal is expressed by one-dimensional representation for the purpose of illustration.

The registrations $r'_1$ and $r'_2$ both have a specific period T. This means that the registration signals $r'_1$ and $r'_2$ have single amplitude spectra identical to each other in the spatial domain.

That is, when the registration signal $r'_1$ has in the frequency domain an amplitude spectrum as shown in FIG. 5, the registration signal $r'_2$ also has an amplitude spectrum in the same frequency.

On the other hand, the registration signals $r'_1$ and $r'_2$ are different in amplitude from each other. The registration signal $r'_1$ has an amplitude $a_2$ while the registration signal $r'_2$ has an amplitude $a_2$. Here, $a_1<a_2$ holds. That is, the registration signals $r'_1$ and $r'_2$ are signals that have the same frequencies but different amplitudes.

In the switching unit 5503, the registration signals $r'_1$ and $r'_2$ as described above are adaptively switched in accordance with the edge component B'. Specifically, the registration signal $r'_2$ is selected when the edge component B' is ON, and the registration signal $r'_1$ is selected when the edge component B' is OFF.

The adding unit 5504 will be now described. Any one of the registration signals $r'_1$ and $r'_2$ selected by the switching unit 5503 in the previous stage, and the block divided by the block dividing unit 5501 are inputted by the adding unit 5504, and are added to one another and outputted. The outputted signal is inputted by the block synthesizing unit 5505, and image data (blue color component) is reconfigured and outputted.

Up to this point, the registration unit in this embodiment has been described using FIG. 55. Now, how the image signal is processed with the configuration of FIG. 55 will be described using FIG. 59.

FIG. 59A, FIG. 59B, FIG. 59C, FIG. 59D and FIG. 59E show an inputted image signal B, the edge component B' of the image signal B, a first registration signal $r'_1$, a second registration signal $r'_2$ and a synthesized image signal B", respectively.

The image signal shown in FIG. 59A is inputted by the edge detecting unit 5502, and the edge component shown in FIG. 59B is outputted. And, in the switching unit 5503, the registration signal of FIG. 59C or FIG. 59D is adaptively selected and outputted according to the signal of FIG. 59B. In the adding unit 5504, the registration signal of FIG. 59C or FIG. 59D is added to the registration signal of FIG. 59A. The signal resulting from the addition is shown in FIG. 59E, and is outputted the adding unit 5504.

The first registration signal and the second registration signal will be now described in detail. Generally, larger amplitude of the registration signal is more desirable. This is because the larger the amplitude, the more easily the registration signal is detected.

On the other hand, if the registration signal of large amplitude is added indiscriminately, the registration signal tends to gain visibility. Thus, the registration signal embedding unit in this embodiment is configured such that a registration signal of larger amplitude is added in the edge portion of the image signal.

It is generally known that the visual sense of human beings easily detects a change in an area of even density, but hardly detects a change in an area such as an edge where density is sharply changed. Thus, it can be said that the registration signal embedding unit in this embodiment embeds the registration signal in such a manner that it is not easily detected by the visual sense of human beings. That is, the registration signal embedment processing in this embodiment is processing making it easier to detect the registration signal and preventing the registration signal from being easily detect by the visual sense of human beings.

In this embodiment, two types of registration signals (the first registration signal and the second registration signal) are used, but the present invention should not be limited thereto, and three or more types of registration signals may be used.

In this case, embedment of the registration signal can be performed further adaptively, in accordance with the properties of the image signal, that is, it is possible that extract of the registration signal is performed more easily, compared to cases where two types of digital watermarks are used.

Patchwork Method

In this embodiment, a principle called a patchwork method is used for embedment of added information Inf. Thus, first, the principle of the patchwork method for use in this embodiment will be described.

In the patchwork method, images are biased statistically, thereby achieving embedment of added information Inf.

Figure 30:
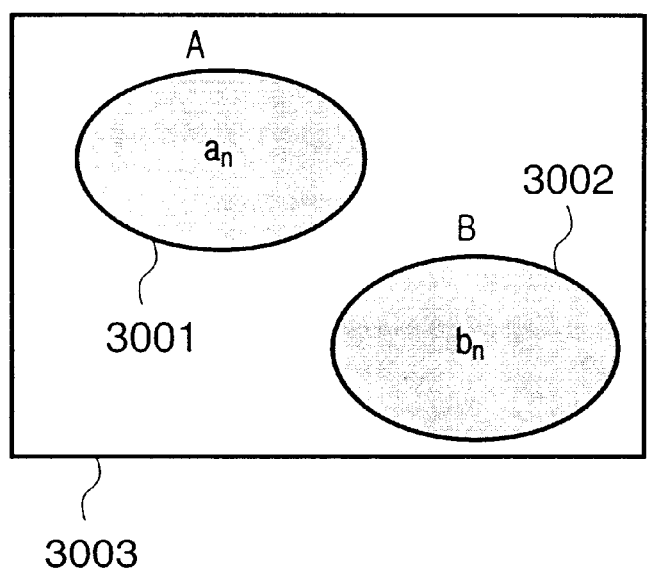
FIG. 30 illustrates two sets in a patchwork method of the preferred embodiment of the present invention.

This will be described using FIG. 30. In FIG. 30, 3001 and 3002 refer to subsets, respectively, and 3003 refers to the whole image. Two subsets, A3001 and B3002 are selected from the whole image 3003.

Selection of these two subsets allows embedment of added information Inf to be achieved through the patchwork method in this embodiment, if they do not overlap one another. However, the size and selection of these subsets have a significant influence on the resistance of added information Inf embedded through this patchwork method, namely strength such that the added information is not lost when image data wI is attacked. This will be described later.

Now, assume that the subsets A and B are sets constituted by N elements expressed by A={$a_1, a_2, \ldots, a_N$} and B={$b_1, b_2, \ldots, b_N$}, respectively. Each element, $a_i$, $b_i$ of the subset A and the subset B is an image value or a set of image values. In this embodiment, they correspond to part of the blue color component in color image data.

At this time, the following index d is defined.

$$d=(1/N)\Sigma(a_i-b_i)$$

This shows an expected value of a difference between image values of two sets.

Selecting appropriate subsets A and B and defining an index d for a general natural image results in d≈0. Hereinafter, d is called a confidence distance.

On the other hand, as an operation of embedding each bit constituting added information Inf, an operation of $$a'_i=a_i+c$$

$$b'_i=b_i-c$$

is performed. This is an operation of adding c to all the elements of the subset A and subtracting c from all the elements of the subset B.

At this time, in a manner similar to the previous case, subsets A and B are selected from an image in which added information Inf is embedded, and an index d is calculated. Then the result is $$d-(1/N)\Sigma(a'_i-b'_i)$$
$$=(1/N)\Sigma\{(a'_i+c)-(b'_i-c)\}$$
$$=(1/N)\Sigma(a'_i-b'_i)+2c$$
$$=2c,$$

which is not 0.

That is, when a certain image is given, the confidence distance d is calculated for the image, whereby it can be determined that added information Inf is not embedded if d≈0, while it can be determined that added information Inf is embedded if d is a value different from 0 by a certain amount. Basic concept has been described up to this point.

In this embodiment, information of a plurality of bits is embedded, applying the principle of this patchwork method. In this method, a method of selecting subsets A and B is defined by the pattern arrangement.

In the aforesaid method, elements of the pattern arrangement are added to and subtracted from predetermined elements of the original image, thereby achieving embedment of added information Inf.

Figure 9:
FIG. 9 shows a pattern arrangement that is used when added information is embedded and is extracted by the preferred embodiment of the present invention.

An example of a simple pattern arrangement is shown in FIG. 9. FIG. 9 shows a pattern arrangement showing the amount of changes in pixel values from the original image in the case of referring to 8×8 pixels for embedding one bit. As in FIG. 9, the pattern arrangement is comprised of arrangement elements having positive values, arrangement elements having negative values and arrangement elements having values of 0.

In the pattern of FIG. 9, positions shown by arrangement elements of +c represent positions for increasing by c the pixel value at the corresponding position, and are positions corresponding to the aforesaid subset A. On the other hand, positions shown by arrangement elements of −c represent positions for decreasing by c the pixel value at the corresponding position, and are positions corresponding to the aforesaid subset B. Also, positions shown by 0 represent positions other than those of the subsets A and B.

In this embodiment, the number of arrangement elements having positive values and the number of arrangement elements having negative values is the same in order that the general concentration of the image is not changed. That is, the sum of all arrangement elements results in 0 in one pattern arrangement. Furthermore, this condition is essential at the time of operation of extracting added information Inf as described later.

Operation of embedding each bit constituting added information is performed using a pattern arrangement as described above.

In this embodiment, the pattern of FIG. 9 is placed several times in areas different from one another in the original image to increase/decrease the pixel value, thereby embedding bid information, namely added information Inf. In other words, not only a combination of a subset A and a set B, but also a plurality of combinations like a subset A' and a set B40, a subset A" and a set B" . . . is assumed in areas of one image that are different form one another, thereby embedding added information constituted by a plurality of bits.

Furthermore, in this embodiment, added information Inf is repeatedly embedded in the case where the original image is large. This is due to the fact that quantity large enough for statistical nature to appear is required because the patchwork method uses statistical nature.

Also, in this embodiment, in order that areas for which the pixel value is changed using the pattern arrangement do not overlap one another when a plurality of bits are embedded, relative positions at which the pattern arrangement is used are predetermined among mutual bits. That is, relationship between the position of the pattern arrangement for embedding first bit information constituting added information Inf and the position of the pattern arrangement for embedding second bit information is appropriately defined.

For example, if added information Inf is constituted by 16 bits, the positional relationship among respective 8×8 pixel pattern arrangements of first to sixteenth bits is provided in a relative manner so that degradation of image quality is reduced on an area having a size larger than 32×32 pixels.

Furthermore, in the case of large image data, the aforesaid added information Inf (each bit information constituting this) is embedded in repetition as many times as possible. Its purpose is to enable each bit of added information Inf to be extracted correctly. Particularly in this embodiment, since statistical measurement taking advantage of the same added information Inf being embedded in repetition is performed, the aforesaid repetition is important.

Selection of the embedment position as described above is carried out by the position determining unit 0103 in FIG. 1.

Next, how to determine the above-described subsets A and B will be described.

3-2. Pattern Arrangement Determining Unit

Now, how to determine the subset A and the subset B in this embodiment will be described.

In the patchwork method, how to determine the subset A and the subset B strongly affects attack resistance of added information Inf and the quality of the image in which the added information Inf is embedded.

In this embodiment, image data wI in which added information Inf is embedded and which is subjected to JPEG compression and expansion is print-outputted by the printer in FIG. 1 and is inputted by the scanner 0201 in FIG. 2 before becoming image data wI. Various attacks including print and scanning are applied to the image data wI during processes for obtaining the wI.

What should be done in order that added information Inf embedded through the patchwork method in this embodiment has resistance to attacks will be discussed below.

In the patchwork method, the shape of the pattern arrangement and the scale of values of elements represent parameters for determining a tradeoff between the embedment strength of added information Inf and the image quality of the image data wI. Therefore, as for whether added information Inf can be extracted after applying the aforesaid attacks, optimization can be achieved by manipulating these parameters. For this, more detailed description will be presented.

In this embodiment, the fundamental positional relationship between an element $a_i$ of the subset A and an element $b_i$ of the subset B in the patchwork is fixed by a matrix for which one example is shown in FIG. 9. Furthermore, the elements $a_i$ and $b_i$ are not limited to one pixel value, but may be a set of a plurality of pixel values, respectively.

A plurality of the pattern arrangements are assigned in the image such that they do not overlap one another, and each assigned pixel in this image is changed in accordance with the value of the element of the pattern arrangement.

If the subset of pixels for which the image is changed to positive values (+c) of the pattern arrangement is A, and the subset of pixels for which the image is changed to negative values (−c) of the pattern arrangement is B, then it can be understood that the patchwork method is applied.

Furthermore, in the following description, a group of pixels having positive values (+c) of the pattern arrangement (corresponding to the position of the element $a_i$ of the subset) is called a positive patch, and a group of pixels having negative values (−c) (corresponding to the position of the element $b_i$ of the subset) is called a negative patch.

Hereinafter, there may be cases where the positive and negative patches are indiscriminately used, but the patch in that case refers to the positive patch and negative patch or any one of them.

If the size of each patch of the pattern arrangement for which one example is shown in FIG. 9 is increased, the resistance to added information Inf is enhanced, and the image after the added information Inf is embedded therein is significantly degraded in terms of image quality compared to the original image, because the value of the confidence distance d in the patchwork method becomes larger.

On the other hand, if the scale of the value of each element of the pattern arrangement is decreased, the resistance to added information Inf is reduced, and the image after the added information Inf is embedded therein is not so much degraded in terms of image quality, compared to the original image.

In this way, optimization of the scale of the pattern arrangement shown in FIG. 9 and the scale of the value of elements (±c) of patches constituting this pattern is very important for the resistance of image data wI and the image quality.

First, the size of the patch will be considered. The resistance to added information Inf embedded through the patchwork method is enhanced if the size of the patch is increased, while the resistance to added information Inf embedded through the patchwork method is reduced if the size of the patch is decreased. This is due to the fact that irreversible compression and the print-system have a low pass filter-like effect throughout processing.

The signal biased for embedding added information Inf is embedded as a signal of the low frequency component if the size of the patch is increased, while the signal biased for embedding added information Inf is embedded as a signal of the high frequency component if the size of the patch is decreased.

There is a possibility that the added information Inf embedded as a signal of the high frequency component is subjected to processing of the print-system, thereby being subjected to low pass filter-like processing and erased. On the other hand, it is likely that the added information Inf embedded as a signal of the low frequency component is not erased and can be extracted even though it is subjected to processing of the print-system.

From the above, in order that added information Inf has resistance to attacks, a larger size of the patch is more desirable. However, increasing the size of the patch means adding a signal of the low frequency component to the original image, which leads to increased degradation of image quality in image data wI. This is because visual properties of human beings have properties of VTF as shown by 1301 of FIG. 13. As is apparent from 1301 of FIG. 13, the visual property of human beings is relatively sensitive to noises of the low frequency component, but is relatively insensitive to noises of the high frequency component. Therefore, it is desired that the size of the patch be optimized for determining the strength of added information Inf embedded through the patchwork method and the image quality in image data wI.

Now, values of the patch (±c) will be considered.

Assume that the value of each element (±c) constituting the patch is called "depth". The resistance of added information Inf embedded through the patchwork method is increased if the depth of the patch is increased, while the resistance of added information Inf embedded through the patchwork method is reduced if the depth of the patch is decreased.

The depth of the patch is closely associated with the confidence distance d that is used when added information Inf is extracted. The confidence distance d is an operational value for extracting added information Inf, and this will be described in detail in the section of extraction processing, but in general, the confidence distance d is increased, making it easier to extract added information Inf if the depth of the patch is increased. On the other hand, if the depth of the patch is decreased, the confidence distance d is reduced, making it more difficult to extract added information Inf.

From the above, the depth of the patch is also an important parameter for determining the strength of added information Inf and the quality of the image in which the added information Inf is embedded, and it is desirably optimized for use. The optimized size and depth of the patch is always used, thereby making it possible to achieve embedment of added information Inf such that resistance to irreversible compression and attacks such as print is retained, and degradation of image quality is reduced.

Now, the depth and size of a specific patch for use in this embodiment will be described. To simplify the following discussion, processing in the print-system is also simplified. Conversion of gray scales by halftone processing will be considered as an example of processing in the print-system.

The halftone processing is to change a method of expressing gray scales as described above. The visual sense of human beings perceives the gray scale similarly before and after the halftone processing. However, an inputting unit such as a scanner does not have ambiguous perception like that of human beings, and does not necessarily perceive the gray scale similarly before and after the halftone processing.

That is, the scanner does not recognize by itself whether the gray scale expressed by the area gray scale really has gray scale information expressed by the gray-level gray scale.

Then, what halftone processing enables the area gray scale to express the gray scale expressed by the gray-level gray scale will be discussed. First, relationship in terms of gray scale expression between the gray-level gray scale and the area gray scale by halftone processing will be considered.

Figure 43:
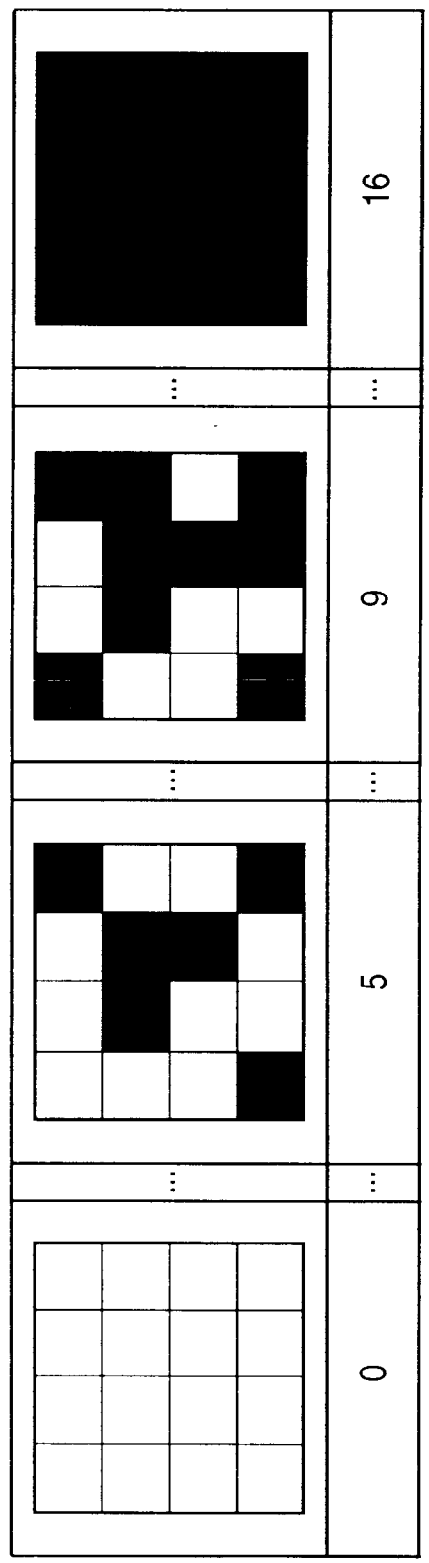
FIG. 43 shows correspondences between the gray scale expressed by the area gray scale and the gray scale expressed by the gray-level gray scale of the preferred embodiment of the present invention.

An example of relationship between a dither matrix of 4×4 and the gray scale that can be expressed by the matrix is shown in FIG. 43. FIG. 43 shows the gray scale in which the matrix is expressed by the area gray scale, and the gray scale expressed by the matrix is indicated by the number below.

There exist 16 pixels in the 4×4 matrix. 4×4+1=17 gray scales can be expressed by on/off of these 16 pixels. Generally, m×n dots subjected to halftone processing can express (m×n+1) gray scales.

Figure 44:
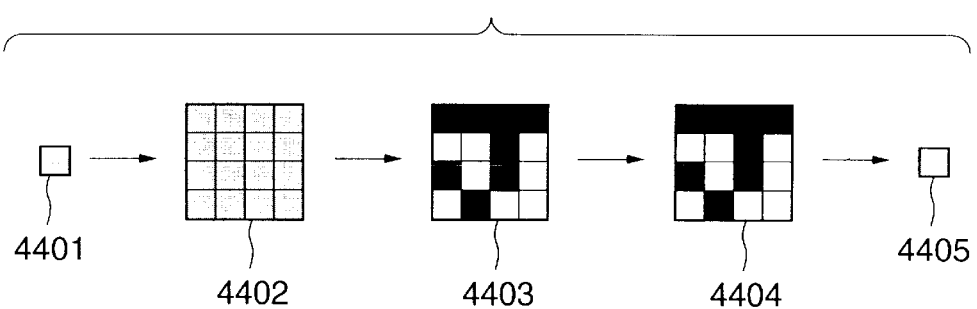
FIG. 44 shows a principle of gray scale information propagating before and after processing of conversion of gray scales of the preferred embodiment of the present invention.

This will be described using an example of FIG. 44. In FIG. 44, assume that a pixel 4403 is expressed by the gray-level gray scale having 0 to 16 dynamic ranges and its value is 8. Four pixels having the same value as that of this pixel are arranged vertically and laterally respectively to generate a block 4402 having a size of 4×4.

The generated block is subjected to halftone processing using an appropriate dither matrix having a size of 4×4 to generate binary data 4403. This binary-valued data is sent to the printer and outputted. Then, it is inputted again at same resolution as output resolution of the printer through an image inputting unit such as the scanner. At this time, assuming that the ratio between the output resolution of dots of the printer and the input resolution at which the scanner reads the pixel is 1:1, the pixel outputted by the printer and inputted by the scanner equals the binary data 4403.

The image data generated in this way is binary data 4404. By a method using interpolation processing appropriate to the binary data 4404, the binary data is scaled down through scaling to 1/(4×4) of its original, and multivalued data 4405 is generated. The value of this multivalued data is 8. Furthermore, in the case where the scanner does not have such a high resolution that the binary data 4403 can be determined as the binary data 4404, the binary data 4403 is optically transformed into the multivalued data 4405.

Up to this point, the state in which gray scale information expressed by the gray-level gray scale is transformed into the area gray scale, and after that, when it is expressed by the gray-level gray scale again, the gray scale information is correctly propagated has been described using FIG. 44. Generally, halftone processing is performed using the area gray scale in which one pixel expressed by m×n pixels, and interpolation processing where binary data of these m×n pixels is rendered as one pixel, whereby gray scale information is propagated.

For this embodiment, in order to provide resistance to attacks including print and scanning, the size and depth of the patch for use in embedment of added information Inf is designed considering the aforesaid relationship between the area gray scale and the gray-level gray scale. Furthermore, for this embodiment, cases where images of various sizes are outputted in a predetermined size by the printer are discussed.

Figure 45A:
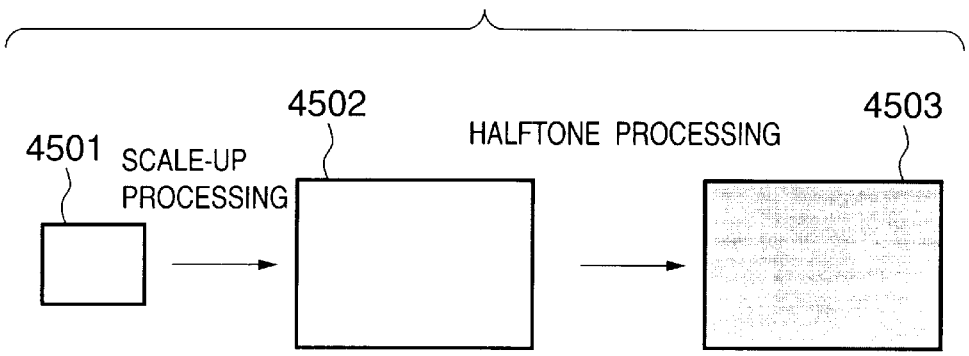
FIGS. 45A and 45B illustrate a difference in halftone processing of a printer depending on resolutions of images.
Figure 45B:
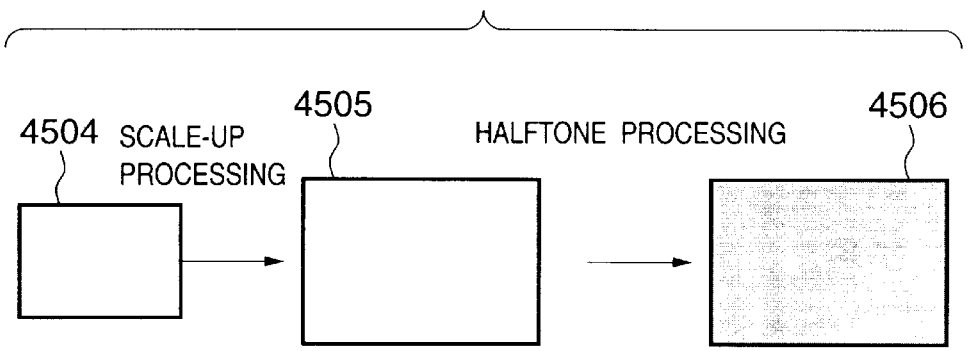

FIGS. 45A and 45B show a case where two images 4501 and 4504 different in resolution from each other are outputted in dimensions 4503 and 4506 identical in size to each other by the printer. FIGS. 45A and B show a series of processing where the resolution of the image is low and where the resolution of the image is high, respectively.

First, the images 4501 and 4505 are subjected to scale-up processing so that one pixel corresponds to one dot. For a scale-up method at this time, interpolation such as a nearest neighbor method is used. Furthermore, the nearest neighbor method is a method in which scale-up is performed by copying the same pixel values to neighboring pixels (In the case where the image has very high resolution, scale-down (thinning-out) can be also considered). As a result thereof, the images 4501 and 4504 are scaled up to the images 4502 and 4505, respectively. Thereafter, they are expressed by dots as printed matters such as 4503 and 4506 (image data for printing) through halftone processing.

For actual processing in the printer, CMYK conversion processing, color matching and the like are performed, but they are omitted here to simplify description.

From FIGS. 45A and 45B, that can be understood that as the resolution of the image decreased, one image can be expressed by an increased number of dots, and as the resolution of the image is increased, one image must be expressed by a decreased number of dots.

Now, it will be shown that influence of embedment by the patch is transmitted also in the case of conversion from the gray-level gray scale to the area gray scale. Furthermore, influence by the resolution of the image is not taken into consideration here for making description easily understood.

Figure 46:
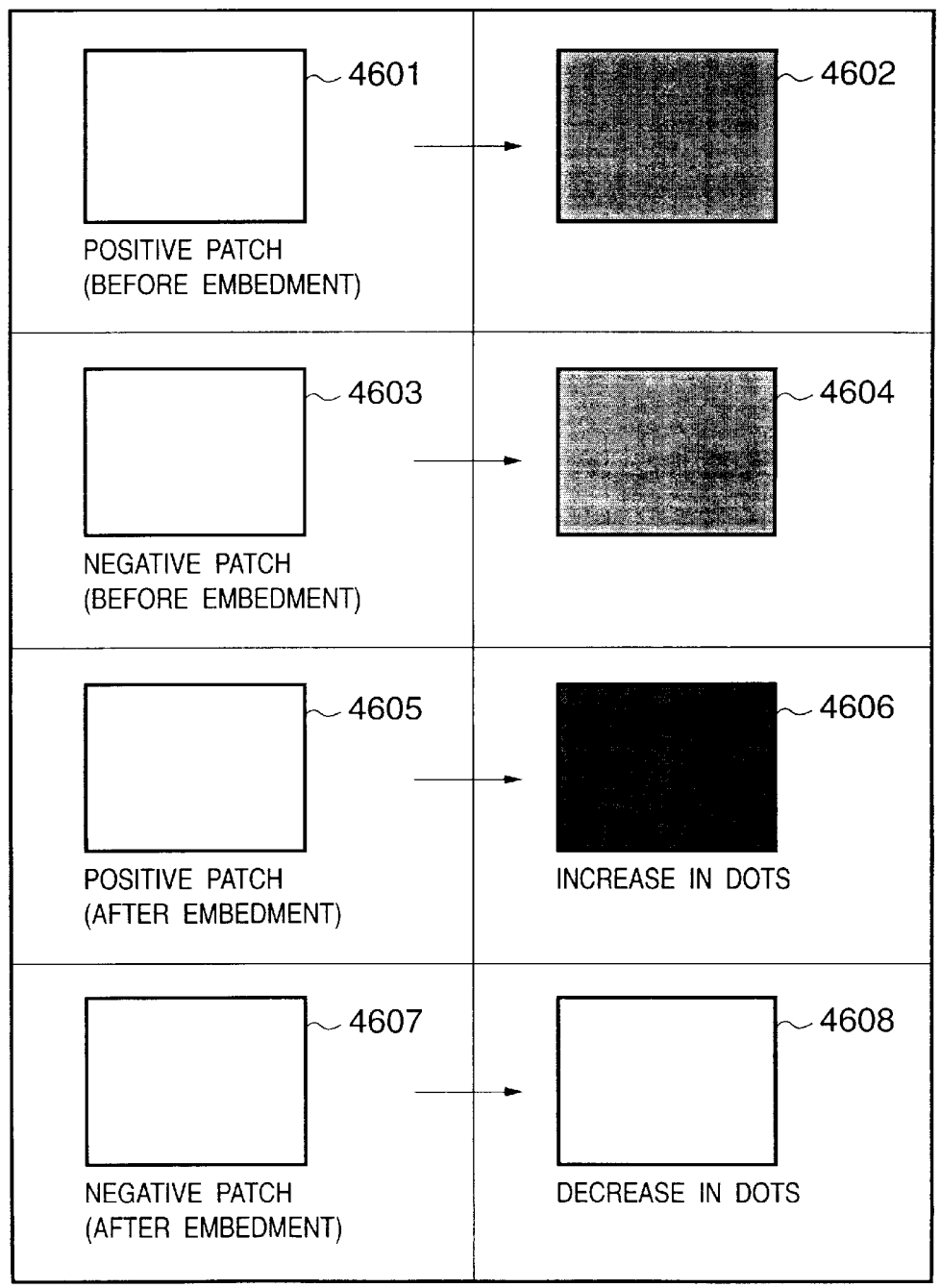
FIG. 46 illustrates changes in ink dots depending on the embedment of the patch.

4601 and 4605 of FIG. 46 are image areas (subset A) operating with the positive patch in the case of embedding added information Inf in an image, and represent states before halftone processing. 4603 and 4606 of FIG. 46 are image areas (subset B) operating with the negative patch in the case of embedding added information Inf in an image, and represent states before halftone processing.

4601 and 4603 of FIG. 46 show cases where embedment of added information Inf by the patch has not been performed, and 4605 and 4607 show cases where embedment of added information Inf by the patch has been performed.

Also, at this time, 4601, 4603, 4605 and 4607 all correspond to one pixel and one dot just before halftone processing is applied.

Through halftone processing, images shown by 4601, 4603, 4605 and 4607 of FIG. 46 are expressed by dots as area gray scales, as in the case of 4602, 4604, 4606 and 4608.

It can be said that in the case where embedment of added information Inf has not been performed, a difference in the number of ink dots between 4602 and 4604 is generally small. In the case where the image is large and an averaged difference in ink dots is calculated for each patch, it is almost 0.

On the other hand, it can be considered that in the case where embedment of added information Inf has been performed, a difference in the number of ink dots between 4606 and 4608 comes to appear.

Also in the case where added information Inf is expressed by the area gray scale, increase and decrease in ink dots can be controlled through the design of the patch. It can be said that the patchwork method is capable of giving resistance to attacks from print and scanning.

Also, from FIG. 46, it can be intuitively imagined that the number of ink dots increases if the area in which the patch is embedded is increased, and the number of ink dots increases if the depth of the patch is increased.

Figure 47:
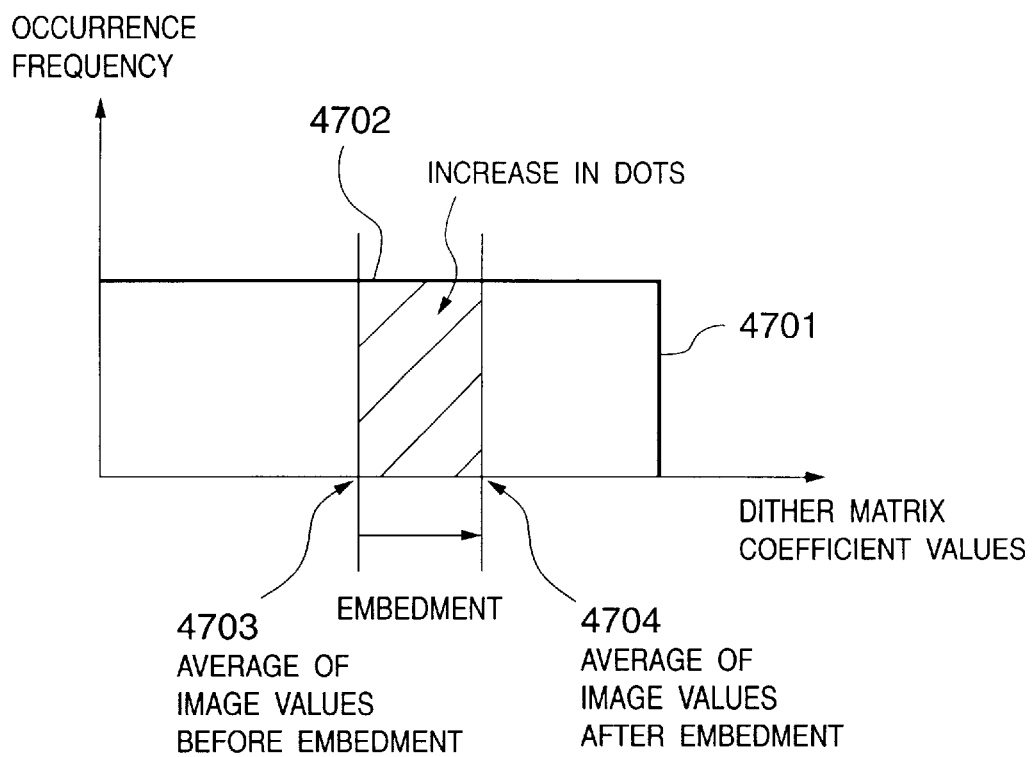
FIG. 47 illustrates an increase in ink dots depending on the size and depth of the patch according to a preferred embodiment of the present invention.

Relationship between the patch and increase in ink dots will be described using FIG. 47. FIG. 47 is a drawing showing variation in ink dots depending on the size and depth of the patch. In FIG. 47, the lateral axis represents coefficient values of the dither matrix for subjecting to halftone processing the subset A or the subset B with one pixel scaled up to one dot, and the vertical axis represents the occurrence frequency of coefficient values of the dither matrix. At the same time, to make description easily understood, the averaged pixel vales of the subset A or the subset B with one pixel scaled up to one dot, which is subjected to halftone processing are shown in the lateral axis.

As shown in FIG. 47, it may be thought that generally coefficient values of the dither matrix have almost no biased values and the occurrence frequencies are almost the same for a large subset A or subset B.

It can be understood that assuming that the averaged pixel value 4703 before embedment is changed to the averaged pixel value 4704 after embedment through the embedment of added information Inf, only the slanted-line portion 4702 has the number of ink dots increased with binary formation processing of the dither matrix.

That is, it can be understood that there is proportionality between the depth of the patch and an increase in ink dots. Also, in the case where the size of the patch is increased, the area of the sloped-line portion 4702 increases in the direction of occurrence frequency because the occurrence frequency of coefficient values of the dither matrix is further increased, and thus it can be understood that there is also proportionality between the depth of the patch and an increase in ink dots.

Considering the properties described above, for a entire image, (1) the depth of embedment is proportional to the number of dots on a printed matter. (2) The size of the patch is proportional to the number of dots on a printed matter.

That is, assuming that a difference in the number of dots for the entire image between the area in which positive patches for the entire image are embedded and the area in which negative patches are embedded for the entire image, which is varied through embedment of the patch, is $\Delta\beta$, $\Delta\beta$ is expressed by:

$$\Delta\beta = 2 \times \alpha \times PA \times C + \gamma \quad \text{(Equation 47-1)}$$

$\alpha$ is a proportionality constant, $\gamma$ is a margin, C is a depth of embedment, and PA is an area corresponding to one pixel and one image of the positive or negative patch for the entire image. Where, $\alpha$, and $\gamma$ are numbers determined by experiments.

Furthermore, the principle of this (Equation 47-1) is applicable because the aforesaid (1) and (2) hold not only in halftone processing by the dither matrix but also in an error spreading method.

In the (Equation 47-1), the resolution of the image, the output resolution of the printer and the input resolution of the scanner are not considered. Cases where the resolution of the image, the output resolution of the printer and the input resolution of the scanner are different will be discussed below.

In this embodiment, the input resolution of the scanner is fixed at 600 ppi, which is enough resolution for a flat bed scanner, in order to retain a maximum amount of information.

Now, the output resolution of the printer and the resolution of the image will be considered.

As already described with FIG. 45, in the case where the image is printed, the number of dots expressing one pixel is determined by the resolution of the image. One example will be presented below.

Assume that in FIG. 45A, the image 4501 is an image that has 1000×800 pixels, for example. If this image is printed with a printer having output resolution of 1200 dpi in both the main scanning direction and the sub scanning direction so that the length of the long side is not more than 5 inches, scale-up processing is performed just before halftone processing so that one pixel is rendered as one dot, and the number of output dots of the long side is made to be 1200 dpi×5=6000 dot.

Thus, the image 4501 is scaled up to the image 4502 having 6000×4800 pixels. In the case where the gray scale of 4501 is reproduced from the image 4503 subjected to halftone processing, one pixel is expressed by 6×6 dots.

On the other hand, assume that the image 4504 in FIG. 45B is an image having 3000×2400 pixels. If this image is outputted in a same way with a printer having resolution of 1200 dpi such that the length of the longer edge is no more than 5 inch, it is scaled up to the image 4505 having 6000×4800 pixels in a similar way so that one pixel equals one dot, and then becomes the image 4506 subjected to halftone processing. One pixel of the image 4504 is expressed by 2×2 dots.

Because it can be considered that the gray level of the ink dot is already fixed, the dynamic range of the gray-level gray scale that can be expressed with one pixel is large in the case where one pixel is expressed by 5×5 dots. On the other hand, in the case where one pixel is expressed by 2×2 dots, the dynamic range of the gray-level gray scale that can be expressed with one pixel is small.

As will be described in detail in added information extraction processing, for the patchwork method, (sum of pixel values of the area in which positive patches are embedded)−(sum of pixel values of the area in which negative patches are embedded) is calculated in each pattern arrangement unit when detection is performed, and an average value for each pattern arrangement is determined for the whole image. This average value is called a confidence distance d, and the larger this confidence distance, the more reliably added information can be extracted.

Figure 48A:
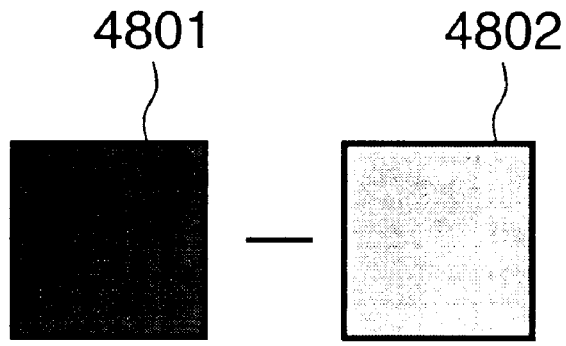
FIGS. 48A and 48B show a difference in pattern arrangement units between the positive patch and the negative patch, depending on the difference in resolutions of images.
Figure 48B:
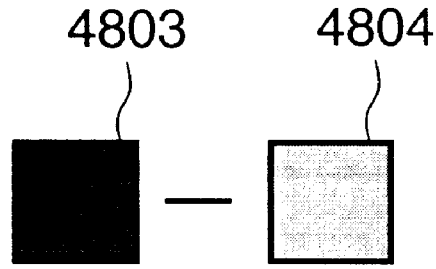

FIG. 48 graphically shows a difference between positive and negative patch areas in a pattern arrangement. FIG. 48A shows the case of low resolution, in which a reference numeral 4801 denotes a positive patch area and a reference numeral 4802 denotes a negative patch are, and FIG. 48B shows the case of high resolution, in which a reference numeral 4803 denotes a positive patch area and a reference numeral 4804 denotes a negative patch area.

Furthermore, since the ink dot has a fixed gray level per dot, the confidence distance d has a dynamic range including large values in the case of 4801 and 4802 because one pixel is constituted by a large number of ink dots. On the other hand, in the case of 4803 and 4804, the confidence distance d does not have a dynamic range including large values because one pixel is expressed by a small number of ink dots.

Generally, in the case where one pixel is constituted by a small number of dots (the resolution of the image is high), there may be cases where a large confidence distance d can not be obtained, thus making it impossible to extract added information Inf, because the dynamic range of the gray scale which one pixel has is small.

Therefore, in the case where the resolution of the image is high, it is necessary to enlarge the area of the patch or increase the depth of embedment (±c). Generally, it is preferable that the area of the patch is enlarged, because positional displacements rise a problem during high-resolution output.

Assuming that the number of dots required for detecting added information per pattern arrangement is $\Delta\beta p$ and the number of pixels of the positive or negative patch is P, from (Equation 47-1), the relationship between a depth of embedment of the patch C and the number of dots expressing one pixel, m×n is expressed by:

$$\Delta\beta p = 2 \times \alpha \times P \times (m \times n) \times (C/255) + \gamma \qquad \text{(Equation 47-2)}$$

Here, (m×n)×(C/255) shows that the number of dots increases by only m×n for one dot at the maximum even when the depth of embedment C is changed through up to maximum 255 gray scales. Also, $\alpha$ and $\gamma$ denote a proportionality constant and a margin respectively.

Furthermore, the number of dots m×n for reproducing one pixel can be determined by m×n=(output resolution of printer in main scanning direction/resolution of image)× (output resolution of printer in sub scanning direction/ resolution of image), and m×n decreases as the resolution of the image is increased.

Thus, $\alpha$ and $\gamma$ are determined by experiments, and then the depth of embedment per pattern arrangement, and the size (size of pattern arrangement) and embedment depth of the patch that are required for detecting added information Inf can be determined from the output resolution of the printer and the resolution of the image.

Based upon the aforesaid considerations, a method of changing embedment depth (±c) and the size of the patch in accordance with the resolution of the image will be proposed.

An unit using this method will be specifically described below.

The output resolution of the printer and the resolution of the image are inputted in the pattern arrangement determining unit 0110 in FIG. 1, and a pattern arrangement suitable for extraction of added information is outputted.

As one example, the case is considered where the output resolution of the printer is 1200 dpi, and the image is outputted by printing in such a way that the length of the longer edge is about 6 inches. Assume that there are images with resolution in the range of 300 ppi to 600 ppi (with the longer edge having 1800 to 3600 pixels) for the image.

Assume that with the pattern arrangement for use in embedment of added information Inf being dependent on the resolution of the image, the pattern arrangement 4901 in FIG. 49A is used in the case where the resolution of the image is less than 500 ppi, and the pattern arrangement 4903 in FIG. 49B is used in the case where the resolution of the image is 500 ppi or greater. Assume also that the embedment depth can be appropriately determined using (Equation 47-2).

The pattern arrangement is appropriately determined by the pattern arrangement determining unit 0110 in this way, and the embodiment position determining unit 0103 on the next stage determines the position of embedment, based on the size of the pattern arrangement inputted from the pattern arrangement determining unit 0110. Furthermore, the added information embedding unit 0104 performs embedment of added information Inf in the image in accordance with the position of embedment of the pattern arrangement inputted from the embedment position determining unit 0103.

On the other hand, extraction of added information Inf cannot be performed unless the pattern arrangement used for embedment is known. Hence, the resolution of the image is determined from the scaling rate outputted by the registration unit 0203, using a pattern arrangement determining unit 2001.

In the case where the output resolution of the printer is fixed, the pattern arrangement used for embedment can be determined by the pattern arrangement determining unit 2001 if the resolution of the image is known from the scaling rate.

Thus, even in the case where the patch and pattern arrangement can be varied depending on the resolution of the image, information obtained from the registration signal is used, thereby enabling added information Inf to be extracted.

3-3. Embedment Position Determination Processing

FIG. 11 is a block diagram showing a detailed configuration of the embedment position determining unit 0103 of this embodiment. The mask creating unit 1101 shown in FIG. 11 creates a mask for defining the position of embedment of each bit information constituting added information Inf. The mask is a matrix comprising of position information defining a method of relative placement of the pattern arrangement corresponding to each bit information (See FIG. 9).

Figures 17A, 17B:
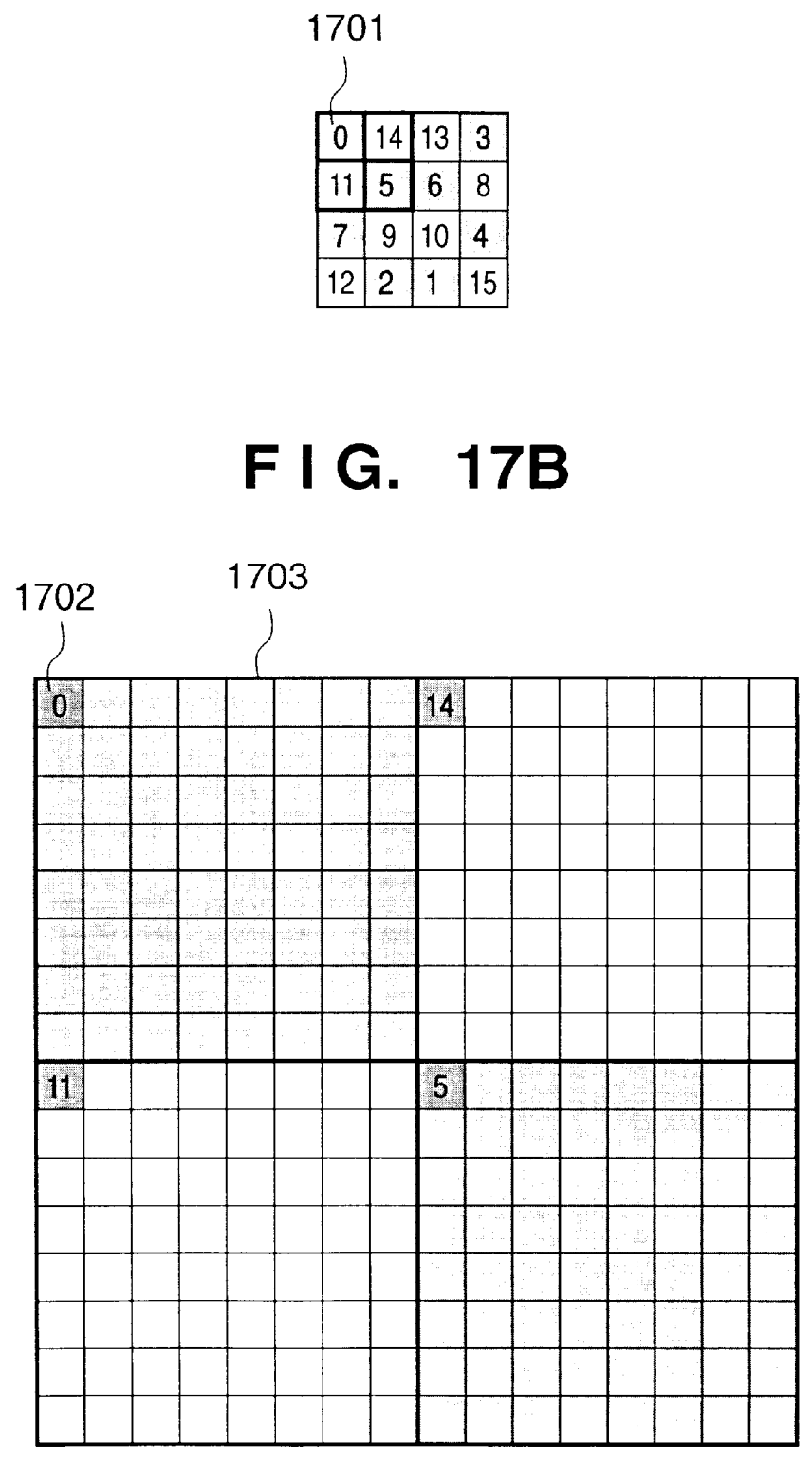

One example of the mask is shown by 1701 in FIG. 17A. A coefficient is assigned in the mask on each-by-each basis, and each coefficient has equal occurrence frequency in the mask. In the case where this mask is used, added information Inf of up to 16 bits can be embedded.

Then, the mask referencing unit 1102 reads the mask created by the mask creating unit 1101, and corresponds each coefficient of the mask to how-manieth bit information is each information to determine a method of placing the pattern arrangement for embedment of each bit information.

Furthermore, a mask/pattern arrangement corresponding unit 1103 deploys in the position of each coefficient in the mask the arrangement element of each pattern arrangement (for example, 8×8 size) inputted from 0110 in the previous stage. That is, each coefficient of the mask shown by 1701 in FIG. 17A (one square) is increased in scale by a factor of 8×8 as shown by 1703 in FIG. 17B, so that it can be referred to as the position of embedment of each pattern arrangement.

The added information embedding unit 0104 described later embeds each bit information using the pattern size, referring to an embedment front-end coordinate 1702 shown in FIG. 17B.

Furthermore, in this embodiment, the aforesaid mask is created each time image data (blue color component) is inputted in the mask creating unit 1101. Thus, in the case where image data of large size is inputted, same added information Inf is repeatedly embedded several times.

In the aforesaid method, the configuration of the aforesaid mask (arrangement of the coefficient) serves as a key when added information Inf is extracted from the image. That is, there is an advantage that only a possessor of the key can extract information.

Furthermore, in this embodiment, cases where a mask created in advance is stored in an internal storing unit of the mask creating unit 1101 or the like and it is called as necessary, without creating the mask in real time, are included in the category. In this case, quick shift toward following processing is possible.

Details of each processing performed in the embedment position determining unit 0103 will be now described.

3-3-1. Mask Creating Unit

First, the mask creating unit 1101 will be described.

In the case where in embedment of added information Inf using the patchwork method, information is embedded with a significant process applied to the pixel value in order to enhance resistance to attacks (for example, in the case where the value of c of the pattern arrangement is defined to be large), degradation of image quality is less noticeable for a so called edge portion with a rapid change in pixel values in the image expressed by original image data, but for the plane portion with less change in pixel values, the portion in which the pixel value is processed is noticeable as noise.

Figure 13:
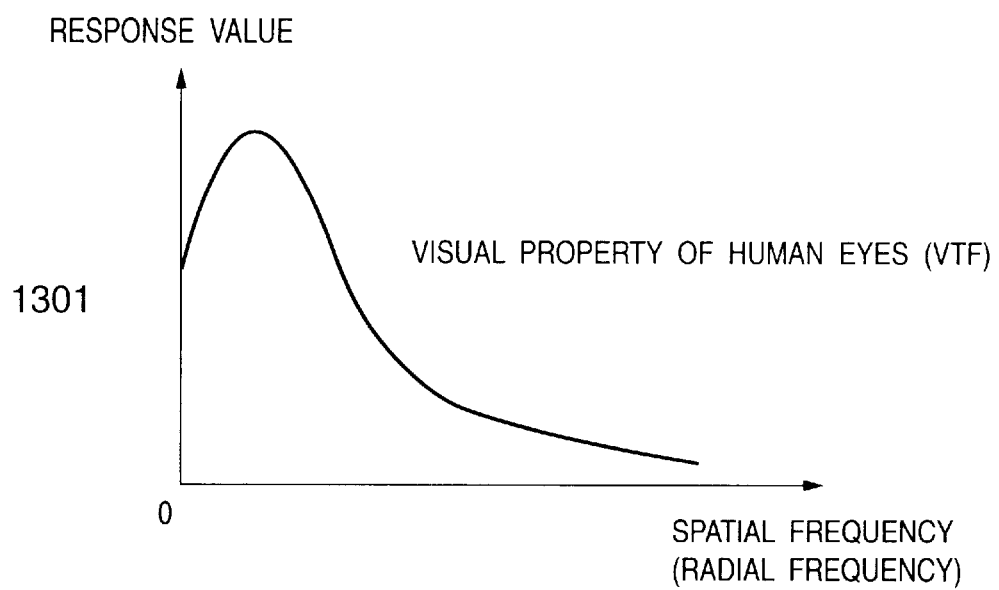
FIG. 13 is an illustration of spatial frequency properties of the visual sense of human beings.

Spatial frequency properties perceived by human eyes are shown in FIG. 13. The lateral axis represents the spatial frequency (Radial frequency), and the vertical axis represents the response value of visual senses. It is understood from FIG. 13 that when information is embedded with pixel values manipulated, degradation of image quality is noticeable in the low frequency domain that can be sensitively perceived by human eyes.

Thus, in this embodiment, considering properties of blue noise masks and cone masks that are usually used in processing of making multi-valued images to be binary ones, arrangement of the pattern corresponding to each bit is performed.

Now, properties of blue noise masks and cone masks will be briefly described. First, the property of the blue noise mask will be described. The blue noise mask has the property of developing into a blue noise pattern irrespective of the threshold value with which binary formation is performed. This blue noise pattern is a pattern having a frequency property of the spatial frequency being heavily distributed in the high frequency domain.

Part of a blue noise mask is shown in FIG. 37. Also, a schematic diagram of the spatial frequency property of the blue noise mask made to be binary with a threshold of 10 is shown in 1401 of FIG. 14.

The lateral axis of 1401 represents the radial frequency, which shows a distance from a origin (direct-flow component) when the blue noise mask is subjected to Fourier transformation. The vertical axis represents a power spectrum, which is a value determined by calculating the sum of the square of an amplitude component positioned at the distance indicated by the lateral axis (radial frequency) and then obtaining the average value thereof. Furthermore, this figure shows a two-dimensional frequency property of an image with one-dimensional graphical representation to aid in visual understandings.

Making a comparison with FIG. 13, it is understood that the blue noise mask has high frequency components heavily distributed, and thus is less perceptive to human eyes. Therefore, for an inkjet printer and the like, blue noise is used when a gray scale of a multi-valued image is expressed by an area gray scale using dots, whereby spatial frequency components can be heavily distributed in the high frequency domain to express the area gray scale without being perceived prominently by human eyes.

One example of processes of generating the blue noise mask will be shown below.
1. A white noise is generated.
2. A binary image $P_{gl}$ of a gray scale g (the initial value is a white noise mask) is subjected to low pass filtering to generate a multi-valued image $P_{gl}$.
3. The image of the gray scale g (initial value: 127) is compared with the low pass filtering image $P_{gl}$ (multi-valued), and the black-and-white image of the binary image $P_g$ is reversed in decreasing order of error to obtain a binary image $P_{gl+1}$.
4. The processes 2 and 3 are repeated until the error reaches a minimum, the binary image $P_{gl}$ (the initial value is a white noise mask) is gradually changed to the binary image $P_g$ (blue noise mask) of the gray scale g (initial value: 127).
5. Binary black (white) points of the gray scale g+1(g−1) are given to the Pg image on random positions. The aforesaid processes 2, 3 are repeated to obtain $P_{g+1}$ ($P_{g-1}$).

The aforesaid processes are repeated, whereby blue noise masks at all gray scales are created to generate a dither matrix.

For example, for 32×32 blue noise masks, four points are increased (decreased) for each gray scale. At this time, however, since the black (white) bit determined at the previous gray scale g cannot be reverted so as to give 256 gray scales, limiting conditions are stricter in low or high gray scales, thus rising a disadvantage that only random patterns of poor uniformity can be obtained.

Figure 12:
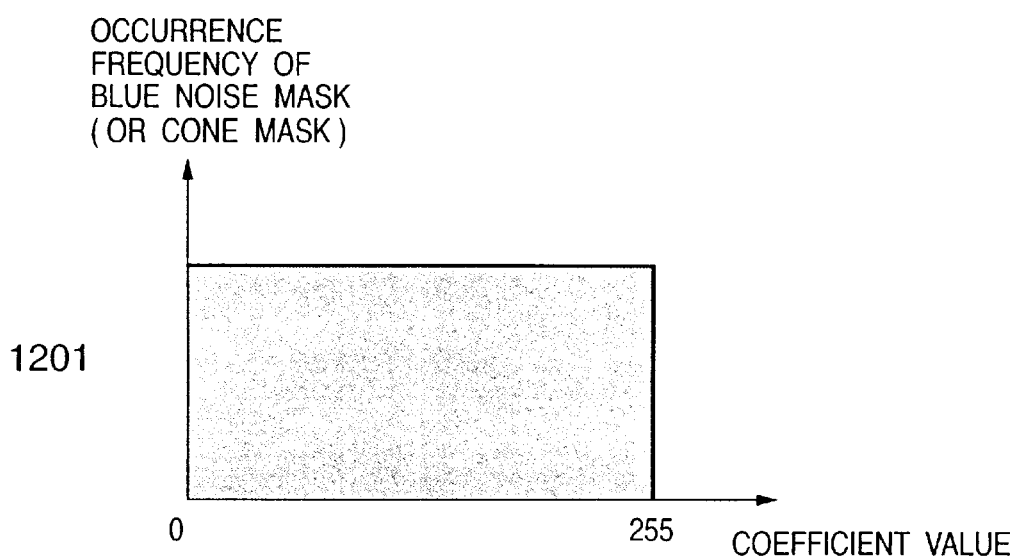
FIG. 12 shows occurrence frequency distribution of a blue noise mask (a cone mask)

The occurrence frequency distribution (histogram) 1201 of each coefficient constituting the blue noise mask is shown in FIG. 12. In FIG. 12, all values (coefficients) of 0 to 255 exist in the mask in equal numbers.

The aforesaid techniques of using the blue noise mask for making multi-valued images to be binary are well known, and is disclosed in detail in, for example, "J. Opt. Soc. Am A/Vol. 9, No. 11/November 1992 Digital halftoning technique using a blue-noise mask Tehophano Mitsa, Kevin J. Parker".

Properties of cone masks will be now described. For one thing, the cone mask is characterized in that when each coefficient included in this mask is made to be binary, periodic or pseudo periodic peaks are produced on the spatial frequency domain expressing binary information obtained at this time, as shown by 1402 in FIG. 14. However, it is designed so as not to produce peaks in the low frequency domain.

Part of the coefficient arrangement of a cone mask is shown in FIG. 38. No peaks are produced in the low frequency domain irrespective of the threshold with which the cone mask is made to be binary, because appropriate distances are maintained among dots.

Figure 14A:
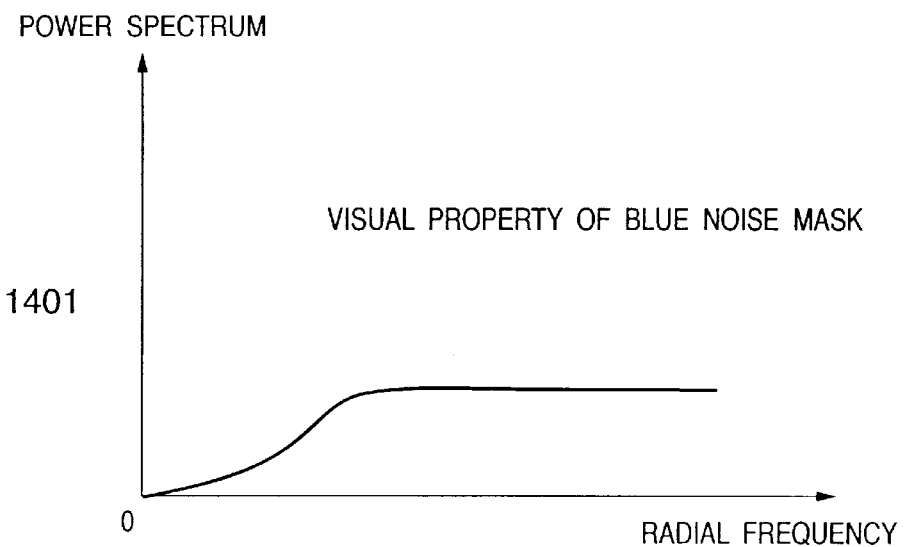
FIGS. 14A and 14B show spatial frequency properties of the blue noise mask and the cone mask.
Figure 14B:
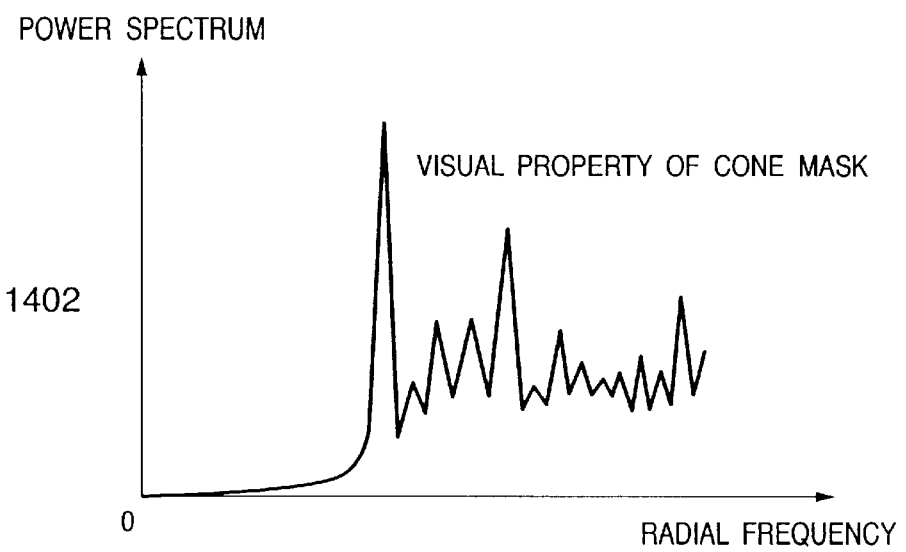

The outline of the spatial frequency property when the cone mask is made to binary with the threshold of 10 of the cone mask is shown by 1402 in FIG. 14. It is understood that for the property of 1402, low frequency components are few as in the case of the spatial frequency property of the blue noise mask.

In the case of the cone mask, high-density areas in the embedment position are few compared to the blue noise mask because peaks are produced at frequencies higher than low frequencies that the blue noise mask has, whether the threshold value is low or high. Thus, there is an advantage in that embedment noise occurring when added information Inf is embedded is further less noticeable compared to the blue noise.

Also, the frequency with which coefficients constituting the cone mask takes on the occurrence frequency (histogram) shown by 1201 of FIG. 12, as in the case of the blue noise mask.

Thus, if the pattern corresponding to each bit information constituting added information Inf is embedded in image data in correspondence with the coefficient of this mask, the pattern corresponding to each bit information can be placed in this image data in equal numbers, resulting in balanced embedment of added information Inf.

In this embodiment, the cone mask is used for embedment reference masks because of the advantages described above.

3-3-2. Mask Referencing Unit

The mask (cone mask) created by the mask creating unit 1101 is inputted by the mask referencing unit 1102. The mask referencing unit 1102 corresponds the position of embedding N bit information to be embedded in the image to the mask number (pixel value) to determine the embedment position.

A method of determination of embedment positions performed by the mask referencing unit 1102 in this embodiment will be described below. Although the above described mask is used in this embodiment, explanation is presented here using a 4×4 mask shown by 1501 in FIG. 15 for making the explanation understood easily.

Figure 15:
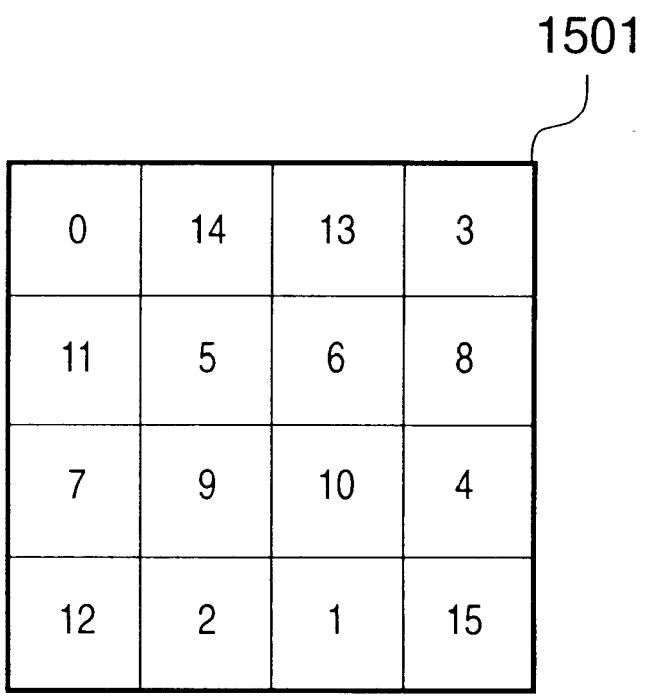
FIG. 15 is a simple illustrative view of a position reference mask of the preferred embodiment of the present invention.

The mask in FIG. 15 has 4×4 coefficients, and has coefficient values of 0 to 15 placed on an one-by-one basis. The position of embedment of added information Inf is referred to using this 4×4 mask. In the case of the mask for use in this explanation, added information Inf of up to 16 bits can be embedded, but the case where added information Inf of 8 bits is embedded will be described below.

Figure 36:
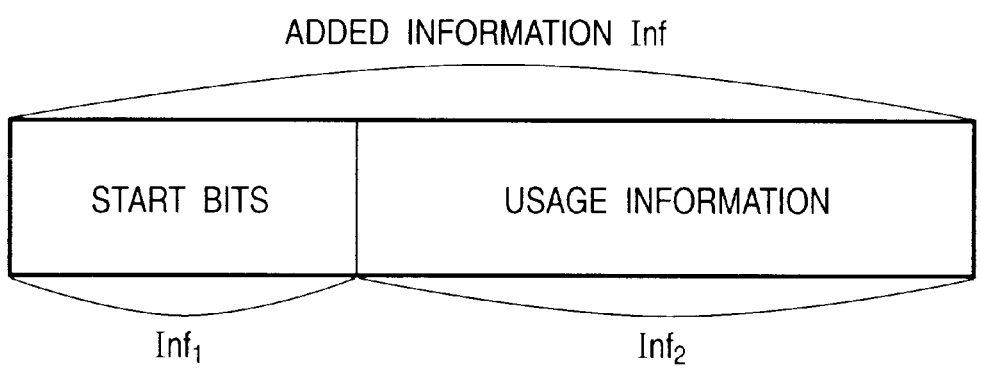
FIG. 36 shows a configuration of added information Inf of the preferred embodiment of the present invention.

First, the configuration of added information Inf will be described using FIG. 36. As shown in this figure, added information Inf is comprised of a start bit $Inf_1$ and usage information $Inf_2$. This start bit $Inf_1$ is used by an offset matching unit 2003 included in the watermark embedding apparatus for recognizing that the position where actual added information Inf is embedded is displaced from the ideal position and correcting in accordance therewith the position of start of embedment of the watermark (added information Inf). Details thereof will be described later.

Also, the usage information $Inf_2$ is original added information, namely information that is actually used as additional information of image data I. If the purpose is to track causes when image data wI is illegally accessed, for example, the ID of the apparatus shown in FIG. 1, the ID of the user or the like is included in this information. Also, if the purpose is to impose a ban on the copy of printed image data wI, control information showing that copy is prohibited is included.

In this embodiment, the start bit is of 5 bits, and a bit string of "11111" is used. However, the present invention is not limited thereto, and bit numbers other than 5 bits of added information Inf can be used as the start bit, and in a similar way, bit strings other than the bit string of "11111" can be used. However, the number of bits of the start bit and the bit string are necessarily shared by the digital watermark embedding apparatus and the digital watermark extracting apparatus.

A simple example in which a cone mask constituted by 4×4 coefficients as described above is used to embed total 8 bits of added information Inf constituted by 5 bits of start bit and 3 bits of usage information will be described.

However, the present invention is not limited thereto. It can also be applied, for example, to the case where a 32×32 cone mask is used to embed total 69 bits of added information Inf constituted by 5 bits of start bit and 64 bits of usage information.

Assume that added information Inf has 5 bits "11111" of start bit and 3 bits "010" of usage information. Each has bit information in which the first, second, third, fourth, fifth, sixth, seventh and eighth bits are 1, 1, 1, 1, 1, 0, 1 and 0, respectively.

Each of patterns corresponding to these respective bits (See FIG. 9) is assigned to a position corresponding to each of coefficients of the cone mask, and each pixel value of original image data is changed by ±c in accordance with this positional relationship. By this, one added information Inf is embedded in the original image data that is the equivalent in size of one cone mask.

In this embodiment, a threshold value is determined on the basis of the number of minimum bits required for embedding added information Inf, and each corresponding bit information is embedded in the position where a coefficient smaller than or equal to this threshold value is placed. By this, one added information Inf is embedded in one cone mask, irrespective of the number of bits of added information Inf.

Furthermore, the present invention is not limited to the aforesaid method, and arrangements may be made such that each corresponding bit information is embedded in the position where a coefficient larger than or equal to a certain threshold value is placed, and based on this, a threshold value is determined.

Then, in this embodiment, the ratio of the number of coefficients smaller than or equal to a threshold value for use in embedment to the number of coefficients of the entire mask is called a fill factor.

For correctly embedding 8 bits added information Inf over an integer number of times, a threshold value for determining which coefficient is used for the embedment reference position in the mask 1501 shown in FIG. 15 should be 8 or 16. For this threshold value, an optimal value is determined, considering influence on resistance and image quality.

At this time, in the case where the threshold value of the mask is defined as 8, the fill factor equals 50%. That is, 50% of the original image data referred to the aforesaid mask are object for processing using the pattern arrangement in FIG. 9.

One example of correspondence relationship between each bit and the coefficient in the mask is shown in Correspondence Table 1.

CORRESPONDENCE TABLE 1

| Order of bit information to be embedded | S1 | S2 | S3 | S4 | S5 | 1 | 2 | 3 |
|---|---|---|---|---|---|---|---|---|
| Coefficients in the mask | 0 | 1 | 2 | 3 | 4 | 5 | 6 | 7 |

Here, S1 to S5 denote bit information (start bit) for registration that is used by an offset matching processor. Three bits of 1 to 3 denote usage information.

Figure 16:
FIG. 16 is a conceptual view showing the embedment position in the position reference mask.

According to the correspondence in Correspondence Table 1, each bit information is embedded in the position of input image data corresponding to the position of the coefficient (0 to 7) expressed by 1601 in FIG. 16, using the pattern (See FIG. 9). The correspondence relationship between the order of bit information to be embedded and the coefficient in the mask is part of key information, and each bit information cannot be extracted unless this correspondence relationship is known. In this embodiment, to simplify explanation, S1 to S5 and 3 bits of information correspond to coefficients of 0 to the threshold value, one by one, as shown in Correspondence Table 1.

Now, the fill factor when a cone mask of 32×32 size is actually used to perform embedment will be somewhat described. Furthermore, the processing procedure is same as that in the case where the mask 1501 is used.

First, a threshold value required for embedding correctly added information Inf over an integer number of times is determined, considering degradation of image quality during embedment. Furthermore, the number of coefficients smaller than or equal to the threshold value is divided by the number of bits constituting added information Inf N to determine how many times each bit can be embedded with one mask size, so that each bit constituting the added information Inf is embedded repeatedly over equal numbers of times.

For example, in the case where 69 bits of added information Inf constituted by 5 bits of start bit and 64 bits of usage information in one example described above is embedded in original image data corresponding to coefficient values of 0 to 255, the threshold value is defined as, for example, 137.

In this case, the number of effective coefficient values in the mask equals 138. Since the number of dots required for expressing one added information Inf is 69, each bit information can be embedded two times (138/69=2) for one mask size.

Furthermore, the reason for performing embedment for all the points having coefficients smaller than or equal to a certain threshold value when the embedment position is determined using the cone mask lies in taking advantage of the property of the cone mask producing no peaks in low frequency components of the spatial frequency.

In the case where the embedment position is determined as described above, and as a consequence, the embedment fill factor and the amount of embedment information are defined as 50% and 69 bits, respectively, the relationship between each bit information constituting added information Inf and each coefficient value constituting the cone mask is as shown in Correspondence Table 2.

When the information is expressed by:

Arrangement S[bit][num]=(x, y), the bit denotes start bits S1 to S5 and 1 to 3 bits of usage information, in the case of Correspondence Table 1. Also, the num represents the order assigned to each coefficient appearing repeatedly in the cone mask. The relative coordinate in the mask is given to the (x, y).

The above described operations are performed by the mask referencing unit 1102.

3-3-3. Mask/Pattern Arrangement Corresponding Unit

The position of embedment in the cone mask of each bit information obtained by the mask referencing unit 1102 is inputted in the mask/pattern arrangement corresponding unit 1103.

Because the embedment position determined by the mask referencing unit 1102 is the position of a pattern of each bit information (equal to 8×8 pixels), addition areas (+c), subtraction areas (−c) and others (0) shown in FIG. 9 should be further assigned in the case of the patchwork method. Hence, the mask/pattern arrangement corresponding unit 1103 performs operations of deploying the pattern arrangement of 8×8 size corresponding to FIG. 9 in all the positions of the cone mask referred to by the mask referencing unit 1102.

Specifically, the arrangement S[bit][num] =(x, y) obtained by the mask referencing unit 1102 is multiplied by the size in the lateral direction of pattern arrangement for the x coordinate, and is multiplied by the size in the vertical direction of pattern arrangement for the y coordinate. As a consequence thereof, the coordinate 1701 in the mask of FIG. 17A becomes a front coordinate 1702 of FIG. 17B with one pixel in the mask scaled up to one pattern arrangement.

CORRESPONDENCE TABLE 2

| The order of each bit information | S1 | S2 | S3 | S4 | S5 | 1 | 2 | ... | 64 |
|---|---|---|---|---|---|---|---|---|---|
| | — | — | — | — | — | — | — | | — |
| Coefficient values in the cone mask | 0,1 | 2,3 | 4,5 | 6,7 | 8,9 | 10,11 | 12,13 | ... | 136,137 |

Here, S1 to S5 denote start bits, which are bit information for registration that is used by the offset matching processing unit. 1 to 64 denote usage information.

However, the present invention is not limited thereto, and other correspondence relationship between each bit information and each coefficient value may adopted as long as the pattern shown in FIG. 9 is used to embed each bit information one after another in all the positions of coefficients of 0 to the threshold (or from the threshold to 255).

In the case of the 32×32 cone mask, there are four positions having the same coefficients in one mask, respectively.

In the case where each bit information is embedded in original image data based on the above described Correspondence Table 2 for all coefficients, each bit information constituting added information Inf is embedded over almost equal numbers of times if a cone mask of large size such as 32×32 or 64×64 is used. Also, single bit information is spread and embedded in original image data.

In the patchwork method, the embedment position is conventionally selected at random, but in this embodiment, a similar effect can be obtained by referring to the aforesaid cone mask and degradation of image quality is reduced.

As a consequence, the mask referencing unit 1102 obtains the coordinate (x, y) of a position corresponding to each bit information.

Figure 19:
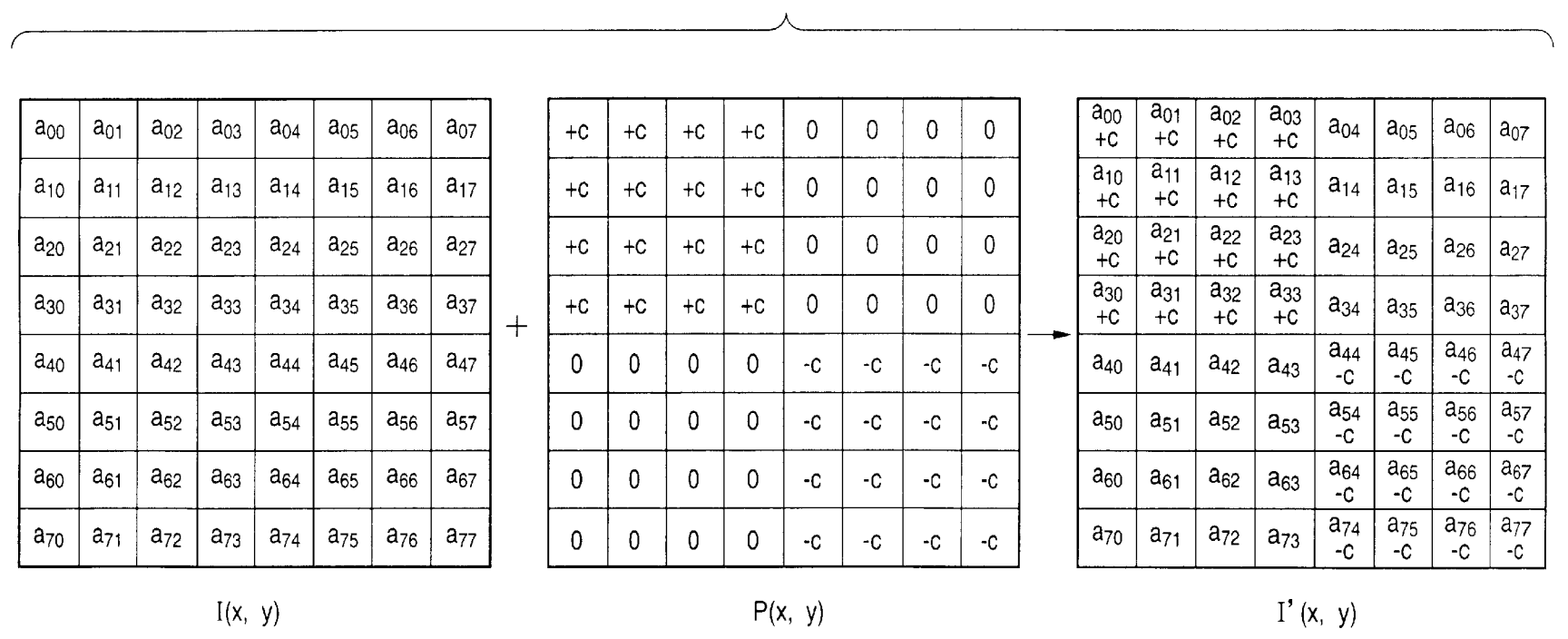

When the pattern arrangement shown in FIG. 19 is used from this front coordinate, embedment can be performed without causing superimposition over the area 1703 having a size of pattern arrangement.

The coordinate (x, y) changes to a coordinate (x', y'), but the bit and num of the arrangement S[bit][num] does not change. Therefore, it is possible to define the (x', y') as a front position in which the pattern arrangement and embed a plurality of bit information as added information Inf corresponding the bit of the arrangement S[bit][num].

Furthermore, a large mask in which each coefficient of the cone mask is developed to (scaled up to) a 8×8 pattern arrangement by the mask/pattern arrangement corresponding unit 1103 is called scale-up mask.

The size of the aforesaid scale-up mask equals a size of (32×8)×(32×8), this size is the equivalent of a minimum image unit (referred to as a macro block) required for embedding at least one added information Inf.

Furthermore, in this embodiment, the size of the pattern arrangement is not limited to 8×8 as described for the pattern arrangement determining unit 0110. In the present invention, the sizes of the pattern arrangement and the patch are selected and determined (optimized) by the pattern arrangement determining unit 0103, in accordance with the resolution of the image or the output resolution of the printer. Even when the size of the pattern arrangement does not equal 8×8, the mask/pattern arrangement corresponding unit 1103 can use a similar unit to determine the position of embedment of added information Inf.

Operations performed by the mask/pattern arrangement corresponding unit 1103 have been described above.

In the case of small masks, there is less degree of freedom in the position of placement of dots during creation and it is more difficult to create masks having desired properties such as cone masks, compared to the case of large masks. For example, in the case where a small mask is repeatedly assigned to all image data to embed added information Inf, the spatial frequency that the small mask has appears on the all image data.

On the other hand, since completed added information Inf is extracted from one mask, the size of the mask is set to be large, resulting in reduced resistance to clipping (possibility that added information Inf can be extracted from partial image data wI'). Hence, it is necessary that the size of the mask should be determined, considering the balance between the aforesaid resistance to clipping and degradation of image quality.

Operations performed by the embedment position determining unit 0103 in FIG. 1 have been described above.

3-4. Added Information Embedment Processing

The added information embedding unit 0104 in FIG. 1 actually embeds added information Inf, referring to the position of embedment of each bit information in image data, which is determined as described above. An operational flow of processing of embedding repeatedly added information Inf in this embodiment is shown in FIG. 10.

Figure 10:
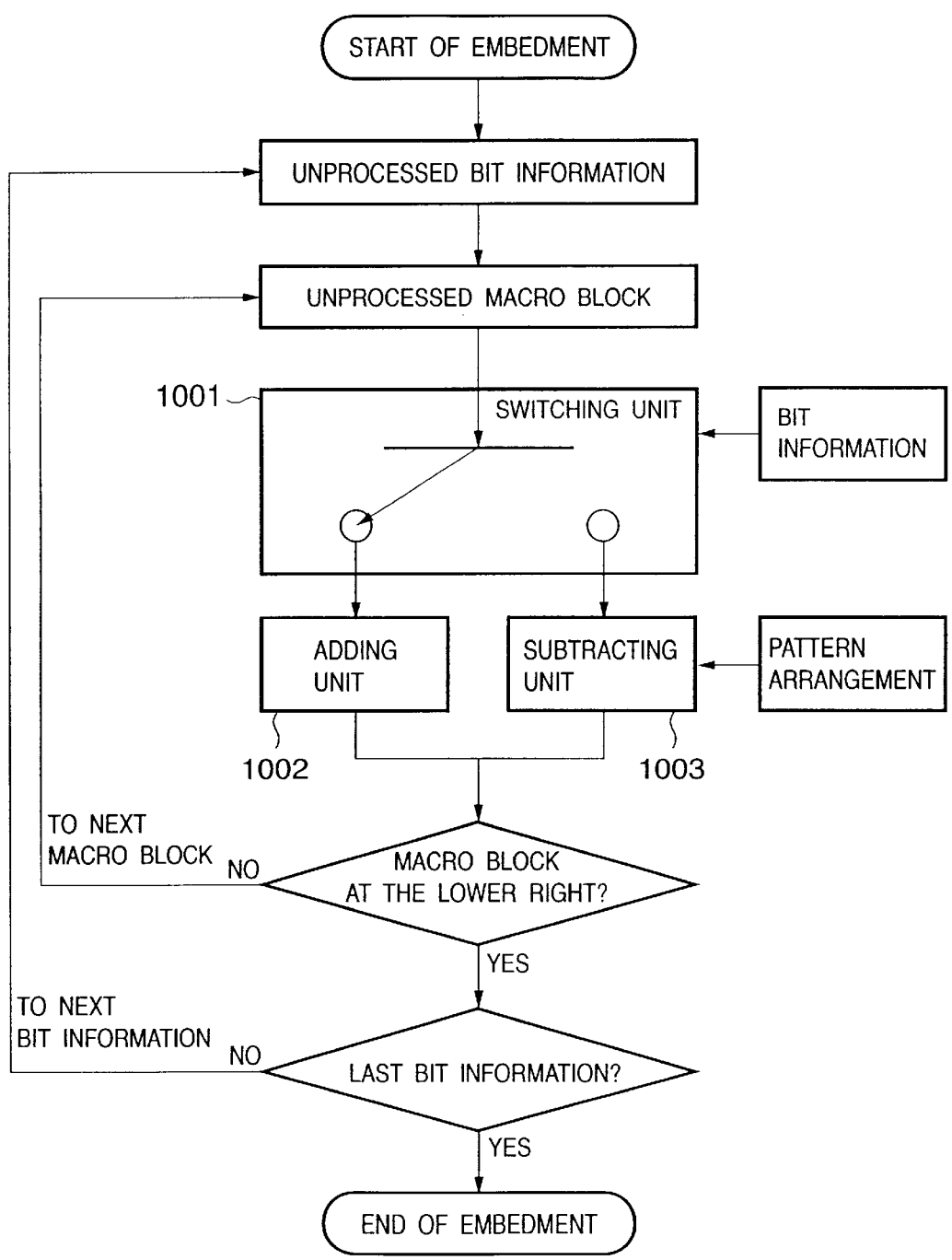
FIG. 10 is a block diagram showing details of an added information embedding unit of the preferred embodiment of the present invention.

In a system shown in FIG. 10, a plurality of assignable macro blocks is assigned to the whole image, and bit information of the first bit is first embedded repeatedly in these macro blocks, followed by embedding repeatedly the second bit, third bit . . . , one after another. This is comprised of procedures of subjecting all unprocessed macro blocks to embedment processing of 1001 to 1003 if there is bit information that is not yet subjected to embedment processing.

However, this embodiment in this embodiment is not limited this order, and internal-external relationship of two loops may be inverted. That is, if there are unprocessed macro blocks, a change may be made to a procedure of embedding in those macro blocks all the bit information that is not yet embedded.

Specifically, embedment of added information Inf adds the pattern arrangement in FIG. 9 if each bit information to be embedded is "1". Also, if the bit to be embedded is "0", the pattern arrangement in FIG. 9 is subtracted, namely those in FIG. 9 with positive and negative symbols reverted are added.

The aforesaid addition and subtraction processing is achieved by switching and controlling the switching unit 1001 in FIG. 10 in accordance with bit information to be embedded. That is, it is connected to the adding unit 1002 when bit information is "1", and it is connected to the subtracting unit 1003 when the aforesaid bit information is "0". The processing of 1001 to 1003 is performed referring to bit information and information of pattern arrangement.

Now, one of the aforesaid bit information being embedded is shown in FIG. 19. This figure shows an example in which the bit information to be embedded is "1", namely the pattern arrangement is added.

In the example shown in FIG. 19, I(x, y) denotes the original image, and P(x, y) denotes the 8×8 pattern arrangement. Each coefficient constituting the 8×8 pattern arrangement is superimposed over the original image data (blue color component) identical in size to this pattern arrangement, and values in the same position are subjected to addition and subtraction with each other. As a consequence thereof, I'(x, y) is calculated, and is outputted to the color component synthesizing unit 0105 in FIG. 1 as image data of the blue color component in which bit information is embedded.

The aforesaid addition-and-subtraction processing using the 8×8 pattern arrangement is performed repeatedly for all the embedment positions (positions to which the pattern arrangement for embedding each bit information is assigned) determined with the above described Correspondence Table 2.

Furthermore, in this embodiment, the size of the pattern arrangement is not limited to 8×8, as described in the explanation for the pattern arrangement determining unit 0110. In the present invention, the sizes of the pattern arrangement and the patch are selected and determined (optimized) by the pattern arrangement determining unit 0110, in accordance with the resolution of the image or the output resolution of the printer. Even when the size of the pattern arrangement does not equal 8×8, the added information embedding unit 0104 can use a similar unit to embed added information Inf.

Figure 18A:
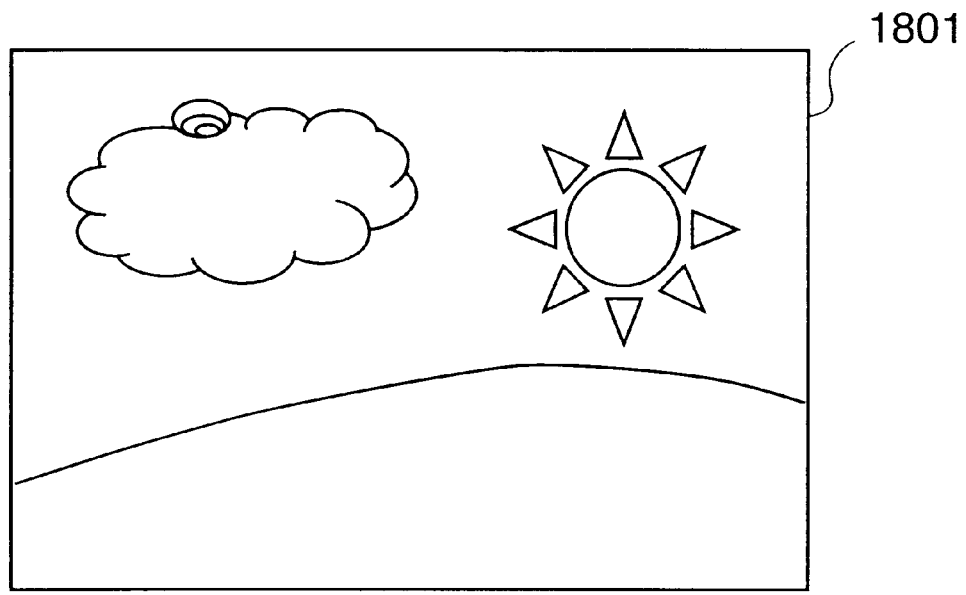
FIGS. 18A and 18B show operations of embedding repeatedly the minimum embedment unit of added information Inf in the entire image of the preferred embodiment of the present invention.

Now, loop processing in FIG. 10 being performed is shown in FIG. 18A and B.

Figure 18B:
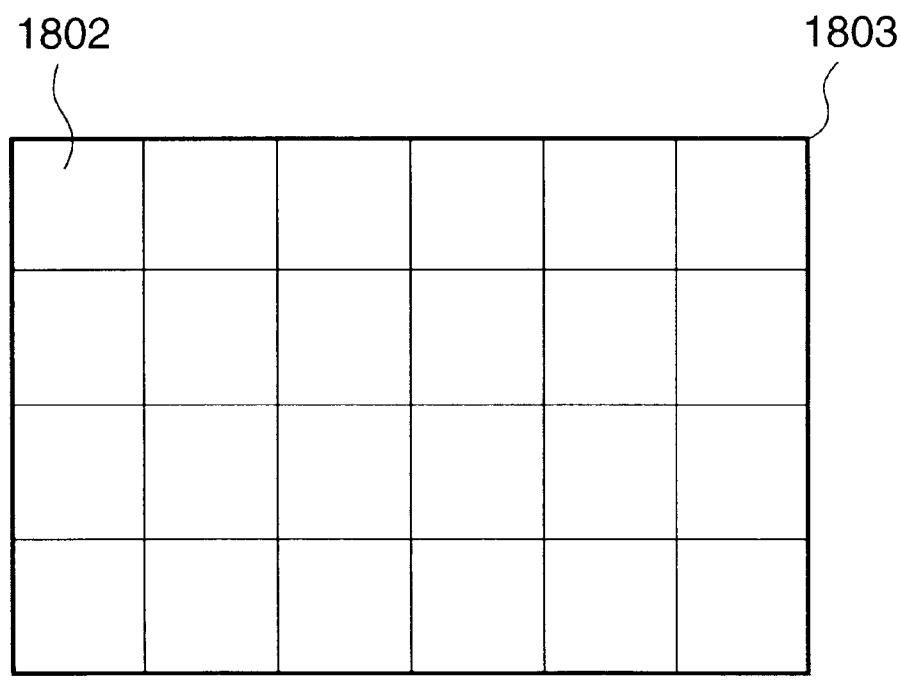

In FIG. 18A, for embedding each bit information repeatedly, the macro block 1802 is assigned repeatedly to the entire image 1801 (1803) in the raster order from top left to bottom right to perform embedment (1001 to 1003 in FIG. 10), as shown in FIG. 18B.

The above operations are performed by the added information embedding unit 0104, and added information Inf is embedded in the whole image.

By the aforesaid processing, added information Inf is embedded in image data. If each pixel of the image data in which this added information Inf is embedded is expressed by a sufficiently small number of dots, the size of the pattern arrangement is sufficiently small, and thus each of these pattern arrangements is perceived as very small points by human eyes. Thus, the spatial frequency property of the cone mask is maintained, thus making it difficult to be seen by human eyes.

3-5. Compression and Expansion of Files

In this embodiment, added information is embedded by the added information embedding unit 0104, followed by performing compression of files/storage in memory/expansion of files.

Here, a method of designing embedment of digital watermarks in which compression of images in which digital watermarks are embedded is considered.

3-5-1. JPEG Compression and Coding

Figure 39:
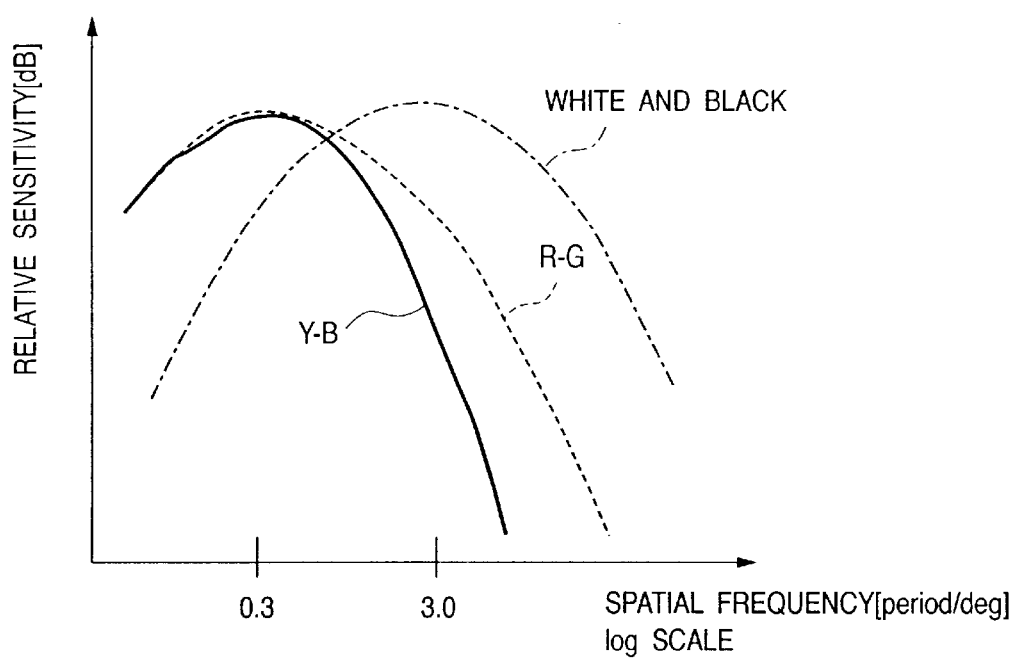
FIG. 39 shows chromaticity spatial number properties of the visual sense of human beings.

FIG. 39 shows chromaticity spatial frequency properties of the visual sense. Each curve is obtained by using a spatial sine wave pattern white-black color (monochrome) and red-green colors or yellow-blue colors that are a pair of opposite colors equal in intensity to each other to measure a limit within which the spatial sine wave pattern can be recognized by human eyes when the period and contrast of the aforesaid pattern are changed.

In FIG. 39, sensitivity reaches the maximum at about 3 [period/deg] for white-black color (light-and-dark information), but sensitivity reaches the maximum at about 0.3 [period/deg] for chromaticity (red-green colors and yellow-blue colors).

It can be understood therefrom that light-and-dark information is sensitive for identification of minute areas such as resolution of images and chromaticity has influence on how spatially wide areas (in which the spatial frequency is low) are viewed. Also, it can be understood that the yellow-blue pattern is not involved in identification of such minute spatial information as the red-green pattern is involved in.

From the above, it can be understood that the method in which gray scale images having only brightness components are directly modulated to embed digital watermark information leads to more noticeable degradation of image quality than the method in which digital watermark information is embedded in color components of color image data. Also, it can be said that for color image data composed of RGB, the method in which digital watermark information is embedded in blue color components (B) leads to degradation of image quality least perceptible by human eyes.

Furthermore, when the color component is changed for embedding digital watermark information in the color component, it is noticeable as color inconsistencies if a person make a visual observation in a spatially broad area (conditions of low spatial frequencies), but it is less noticeable than cases where digital watermark information is embedded in brightness, if a person makes a visual observation in a spatially narrow area (conditions of high spatial frequencies).

In this embodiment, for a gray scale image having only one element in one pixel, the image is subjected to conversion to color image data having a plurality of elements in one pixel before embedment of digital watermark information (such as added information Inf) is performed, thus bringing about the increased effect of preventing degradation of image quality, compared to cases where digital watermark information is directly embedded in a normal gray scale image.

If cases where digital watermark information is embedded in gray scale image data and cases where digital watermark information is embedded in only one kind of elements of two or more kinds of elements constituting color image data are compared to each other, the later is more capable of maintaining desirable image quality when the image is outputted at high resolution (when the value of one pixel is expressed in gray scale with a small number of dots).

However, there is also a disadvantage in that if simple considerations are given, outputted color image data (file size) is three times as large as original image data.

Thus, in this embodiment, for reducing the file size to a minimum, image data in which digital watermark information is embedded is further subjected to JPEG compression and coding in the JPEG compressing and coding unit 0106.

Generally, JPEG compression and coding is a technique of removing components to which the visual sense of human beings is not sensitive to reduce the amount of data, taking advantage of properties of human visual sense. The digital watermark technique, on the other hand, is a technique of embedding information in components to which the visual sense of human beings is not sensitive. Therefore, coexistence of the JPEG compression and coding technique and the digital watermark technique is difficult, and it is believed that the JPEG compression and coding is a type of attacks to digital watermark information.

A method of giving resistance to JPEG compression and coding will be briefly described below. A pattern arrangement as shown in FIG. 9 that is used in this embodiment is defined so that added information already embedded in color image data is not lost through sub-sampling and quantization processing of the color difference component.

First, the JPEG compression and coding system will be briefly described. Color image data that is inputted in the JPEG compressing and coding unit 0106 is transformed into brightness (Y) and color difference (Cr, Cb). When color image data constituted by original red color components (R), green color components (G) and blue color components (B) is inputted, equations of:

$$Y = 0.29900 \times R + 0.58700 \times G + 0.11400 \times B$$

$$Cr = 0.50000 \times R - 0.41869 \times G - 0.08131 \times B$$

$$Cb = -0.16874 \times R - 0.33126 \times G + 0.50000 \times B$$

are used to subject the original color image data to format conversion into different color image data constituted by brightness (Y) and color difference (Cr, Cb).

Figure 40:
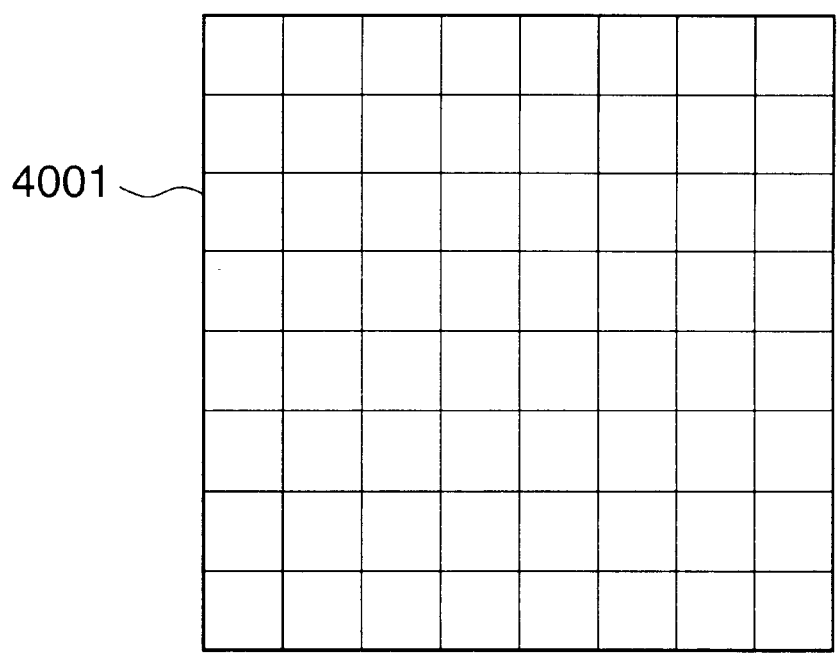
FIG. 40 shows a minimum coding unit in a JPEG mode.

The image data decomposed into the brightness components and color-difference component is divided into blocks of 8×8 pixels shown in FIG. 40 in the raster order from top left of the image. In JPEG compression and coding, processing of compression and coding is performed in repetition for these 8×8 blocks.

Processing of sampling of color components in JPEG compression and coding will be now described. In JPEG compression and coding, sampling of color-difference components is performed for every 8×8 pixels in accordance with the sampling rate of the sampling option.

FIG. 41 shows sampling of image data. A procedure of sampling with the rate of 4:2:2 in JPEG compression and coding will be presented below. In FIG. 41, reference numeral 4101 denotes the brightness component of 4×4 pixels. For the brightness component, because it has a large amount of visually important information, 4×4 pixels are directly outputted without performing scale-down processing.

Reference numeral 4103 denotes the color difference component (Cr, Cb) of 4×4 pixels. For the chromaticity component, because of less visual sensitivity, it is subjected to scaling-down to reduce two pixels to one pixel in the lateral or vertical direction. As a consequence thereof, the color-difference component (Cr, Cb) of 4×4 pixels is transformed into that of 4×2 pixels 4104. The sampling described above reduces color-difference component of 8×8 pixels to 8×4 pixels.

Thus, as a consequence of sampling with the ratio of 4:2:2, the brightness component Y, color-difference component Cr and color-difference component Cb of 8×8 pixels become those of 8×8 pixels, 8×4 pixels and 8×4 pixels, respectively. Each of the aforesaid pixels subjected to sampling is then subjected to DCT (discrete cosine transformation) computation, quantization, zigzag scanning, Huffman coding, and so on in accordance with known procedures.

Also, taking advantage of the fact that the property of visual sense of human beings is not so much sensitive to high frequency components, the number of steps of quantizing DCT coefficients to high frequency components is reduced, thereby enabling effective compression. Also, quantization is performed so that generally, the brightness component undergoes less steps of quantization than the color-difference component.

Pattern arrangements having resistance to the above described compression and coding processing will be now discussed. The pattern arrangement in FIG. 9 described above is shown again in FIG. 42. In FIG. 42, an area 4201 having positive elements of +c is called a positive patch, and an area 4202 having negative elements of −c is called a negative patch. At this time, each patch has information heavily distributed to the low frequency component in the minimum coding unit 4001 constituted by 8×8 pixels shown in FIG. 40, thereby making it possible to enhance resistance to JPEG compression. However, this embodiment is limited thereto, and various kinds of definitions may be made with the minimum coding unit as 16×16 pixels.

Also, in the case where sampling with the rate of 4:1:1 (reducing the color-difference component by every other pixel in vertical and lateral directions) or 4:2:2 (reducing the color-difference component by every other pixel in the vertical or lateral direction) is performed, resistance to sampling can be enhanced if each patch is given a size having a width of 2 pixels multiplied by an integer number in the vertical and/or lateral direction depending on sampling.

That is, (b 1) for each patch, one heavily distributed to the low frequency in the minimum coding unit (8×8 pixels) is used. (2) Each patch is given a size with 2×N (N denotes an integer number) pixels in the vertical and/or lateral direction depending on sampling methods.

Furthermore, in order that each patch has low frequency components in each area (8×8 pixels) that is subjected to JPEG compression and coding, the position on the image to which the pattern arrangement is assigned and each size of the pattern arrangement (8×8 pixels in FIG. 9) are preferably synchronized with each area that is subjected to coding.

That is, (3) the size and embedment position of the pattern arrangement are synchronized with the unit size for which JPEG compression and coding is performed.

If added information Inf is embedded using, for example, a pattern as shown in FIG. 9, considering the above conditions, digital watermark information (added information Inf) can remain in image data even after JPEG compression and coding, resulting in possible resistance to JPEG compression and coding.

Furthermore, this embodiment includes in its category the case where in the color component extracting unit 0101, the gray scale (monochrome) image is transformed directly into Y (brightness) and Cr and Cb (color-difference) components, and modulation of embedding added information Inf and the like in only the Cb component of those components as an digital watermark is performed. In this case, no conversion into brightness and color-difference components should be performed in the JPEG compressing and coding unit, resulting in reduced processing steps.

Also, the case where in color component extracting unit 0101, the gray scale (monochrome) image is transformed directly into Y (yellow), M (magenta), C (cyan) and K (black) components suitable for printing that is performed in the subsequent stage, and added information Inf and the like are embedded in only the Y component of those components as an digital watermark is included in the category. In this case, a step of transforming color components just before a printing unit can be omitted.

That is, in this embodiment, the component for performing the aforesaid embedment is not limited to the blue, Cb and Y components, and the case where added information Inf and the like are embedded in the part of all components constituting one pixel is also included in the category.

3-5-2. Storage in Memory

The encoded data obtained from the aforesaid JPEG compression and coding is stored in a memory on a temporary basis. This encoded data is read out from the aforesaid memory to the JPEG expansion and decoding unit 0108 in timing of transmission to an external unit or printing by a printer connected to the subsequent stage of the apparatus in FIG. 1.

Furthermore, encoded data in the case where gray scale image data is transformed into color image data on a temporary basis, is modulated to the blue color component, and is transformed into color image data constituted by brightness and color-difference components to perform JPEG compression as in the case of this embodiment causes a more or less increase in data in the color difference component, but does not lead to a significant increase in memory capacity, compared to the amount of encoded data in the case where original gray scale image data is transformed directly into color image data constituted by brightness and color difference components to perform JPEG compression and coding.

That is, provided that digital watermark information is embedded in the original image data, and is then subjected to JPEG compression and coding, a method of embedding digital watermark information (such as added information Inf) in gray scale image data as in the case of this embodiment has an advantage that image quality can be improved without significant increase in general data amounts, compared to methods in which normal gray scale image data is directly modulated to embed digital watermark information.

3-5-3. JPEG Expansion and Decoding

The JPEG expanding and decoding unit 0108 reads encoded data from the memory 0107 in timing of transmission to an external unit or printing by the printer 0109, and uses an inverse procedure to the aforesaid compression system to decode color image data.

3-6. Registration Processing

The registration unit 0203 in FIG. 2 that is provided for the digital watermark extracting apparatus will be now described in detail. The registration unit 0203 is a unit positioned at a stage before the added information extracting unit 0204, which is involved in pre-processing for processing of extraction of added information Inf. The image of blue color components extracted by the color component extracting unit 0202 by the previous stage is inputted by the registration unit 0203.

The registration unit 0203 corrects a difference in scale between the image data wI outputted from the digital watermark embedding apparatus and the image data wI' inputted by the digital watermark extracting apparatus.

Figure 7:
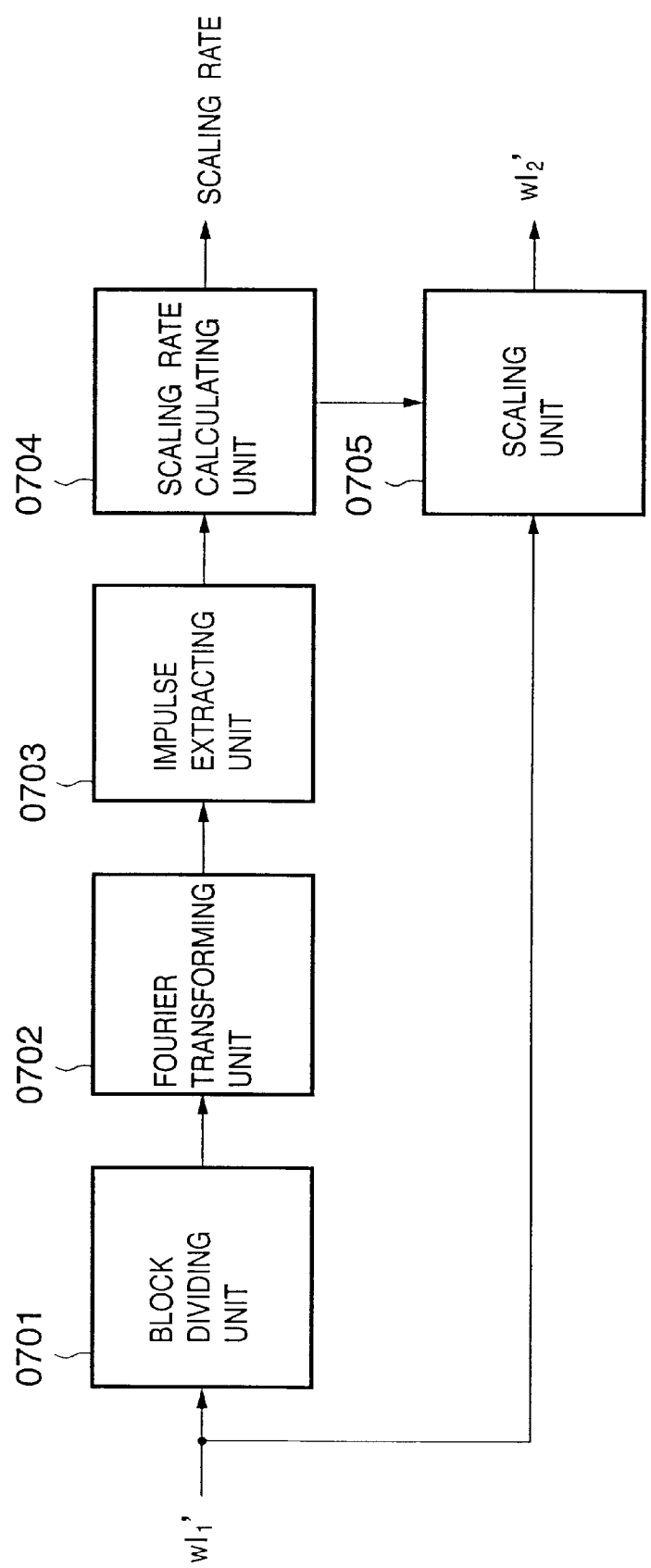
FIG. 7 is a block diagram showing details of a scale matching unit of the preferred embodiment of the present invention.

Details of the registration unit 0203 in this embodiment are shown in FIG. 7. As shown in FIG. 7, the registration unit 0203 is comprised of a block dividing unit 0701, a Fourier transforming unit 0702, an impulse extracting unit 0703, a scaling rate calculating unit 0704 and a scaling unit 0705.

In the block dividing unit 0701, block divide processing as in the case of the registration signal embedding unit 0102 (block dividing unit 0401) described above is performed. It is usually difficult to extract blocks, as in the case of the registration signal embedding unit 0102 (block dividing unit 0401), by this processing. This is because image data wI in which digital watermark information is embedded is subjected to processing of print systems, whereby the size is changed and displacement occurs.

However, there arises no problem even if this extraction of blocks is somewhat incorrect. This is because in the digital watermark embedding apparatus, the registration signal is embedded in amplitude spectra of image data. The amplitude spectrum has a property of not being influenced by displacement in the spatial domain of image data. Therefore, there arises no problem even if, in each of the digital watermark embedding apparatus and the electronic water marl extracting unit, some amount of displacement is found in blocks divided by each block dividing unit in the spatial domain.

The block dividing unit 0701 outputs to the Fourier transforming unit 0702 the image data subjected to block dividing. The Fourier transforming unit 0702 transforms image data in the spatial domain into image data in the frequency domain as in the case of the above described registration signal embedding unit 0102. The image data in the frequency domain subjected to Fourier transformation is expressed by amplitude and phase spectra. Only the amplitude spectrum of these spectra is inputted by the impulse extracting unit 0703. On the other hand, the phase spectrum is discarded.

The image data transformed to the frequency domain is inputted by the impulse extracting unit 0703. The impulse extracting unit 0703 extracts only impulsive signals from the image data transformed into the frequency domain. That is, it extracts 0502, 0503, 0504 and 0505 in FIG. 5 that are already embedded in image data.

Figure 8A:
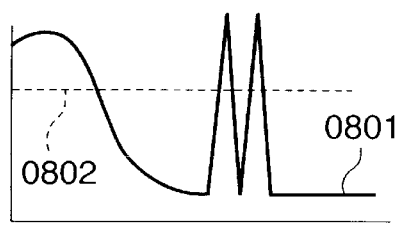
FIGS. 8A and 8B illustrate the extraction of the registration signal of the preferred embodiment of the present invention.

This can be performed using commonly known image processing techniques. For example, it can be achieved by subjecting to threshold value processing the image data transformed to the frequency domain. An example thereof is shown in FIG. 8(a). A state in which the amplitude spectrum 0801 inputted by the impulse extracting unit 0703 is subjected to threshold value processing with a threshold value 0802 is shown in FIG. 8(a). Furthermore, the transformed image data in FIG. 8 is expressed by one-dimensional representation for explanation. An appropriate threshold value 0802 is selected, thereby enabling impulse signals to be extracted. However, original image data similar in size to impulse signals existing in the low area is extracted at the same time.

Figure 8B:
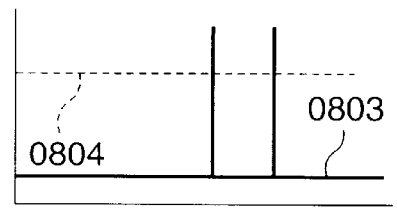

A system of this embodiment to solve this problem is shown in FIG. 8(b). The image data 0801 transformed to the frequency domain is subjected to secondary differential processing. This is the equivalent of applying Laplacian filters and the like. Image data obtained by subjecting to secondary differential processing for the image data 0801 transformed to the frequency domain is shown by 0803. An appropriate threshold value 0804 is selected to perform threshold value processing for this data 0803, whereby the impulse signal can be extracted.

A little more detailed principles will be described as to extraction of this impulse signal, using FIG. 26. Furthermore, in this figure, processing in the registration signal embedment described above is also described.

In the registration signal embedding unit 0102, image data 2601 in the spatial domain is transformed into image data 2602 in the frequency domain, and an impulse signal 2603 is added in the frequency domain.

The image data in the frequency domain in which the impulse signal (registration signal) 2603 is added is turned back to a signal 2601' in the spatial domain by being subjected to inverse frequency conversion. The image data 2601' turned back to the spatial domain should be influenced by addition of the impulse signal, but it is hardly perceptible by human eyes, and substantially, the image data 2601 and image data 2601' looks as if they are same matters. This is because the impulse signal 2603 added in the frequency domain is distributed in small amplitudes over entire image data, by inverse Fourier transformation.

Figure 26:
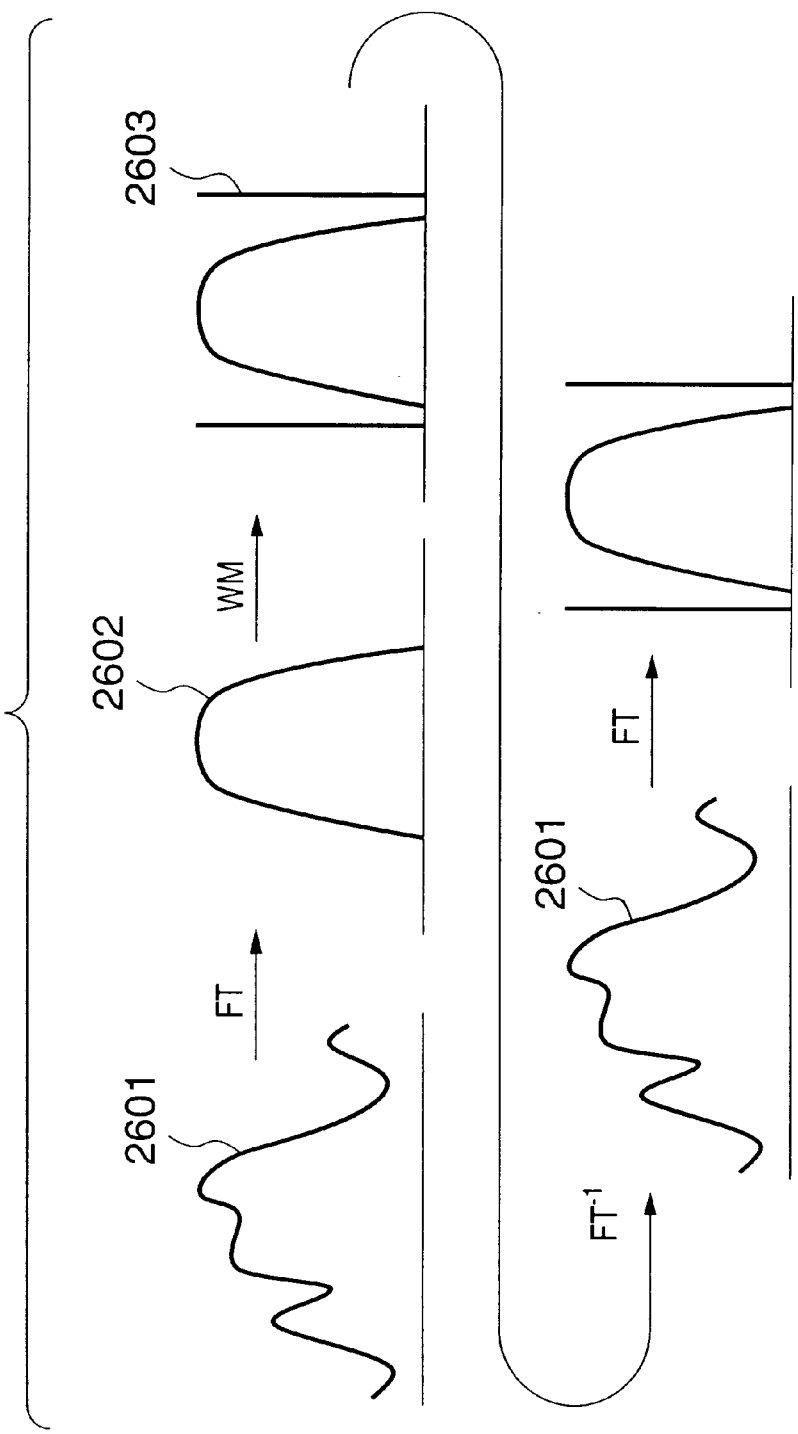
FIG. 26 illustrates the principle of the embedment and extraction of the registration signal of the preferred embodiment of the present invention.

If an impulse signal like 2603 in FIG. 26, it means that image data having certain frequency components is added in the spatial domain. If this added impulse signal is higher than the frequency that can be perceived by human beings and the amplitude is below the limit for enabling perception by human beings, the added impulse signal cannot be seen by human eyes. Thus, it can be said that the above described embedment of registration signals is itself a type of digital watermark processing.

Furthermore, in this embodiment, the registration signal 2603 is embedded in image data 2601, and added information Inf that should be actually embedded is embedded, followed by reconstructing the signal 2601' in the spatial domain.

The registration signal embedded as shown in FIG. 26 is subjected to Fourier transformation again at the time of extraction. By this, in the spatial domain, the registration signal 2603 once spread over the whole image data is transformed to the frequency domain and reappears as the impulse signal.

There is a high possibility that the amplitude of this impulse is reduced when the image in which digital watermark information is embedded is subjected to attacks such as irreversible compression such as JPEG compression. On the other hand, when the image is subjected to geometric attacks such as scaling, the position of this impulse is shifted. In any case, appropriate impulse extraction processing as described above is performed, whereby it is possible to extract the impulse signal, and a change from the original image data can be predicted. This change is corrected, thereby making it possible to create a state where added information Inf that is embedded in this embodiment can be reliably extracted.

By the above described processing, the aforesaid impulse signal is outputted from the impulse extracting unit 0703 in FIG. 7 and is inputted by the scaling rate calculating unit 0704. The scaling rate calculating unit 0704 determines what scaling has been performed, using the coordinate of the inputted impulse signal.

Assume that the digital watermark extracting apparatus of this embodiment knows which frequency component the impulse signal has embedded in, in advance. In this case, the scaling rate can be calculated from the ratio of this frequency of the impulse signal embedded in advance to the frequency of the impulse detected. For example, assuming that the frequency of the impulse signal embedded in advance is a, and the frequency of the impulse signal detected is b, it can be understood that scaling with the ratio of a/b is performed.

This is a well known property of Fourier transformation. By the above described processing, the scaling rate is outputted from the scaling rate calculating unit 0704.

However, this embodiment is not limited thereto, and information of the position (frequency) in which the registration signal is embedded may be received from the digital watermark embedding apparatus, as necessary.

For example, cases where this position information is received as an encoded signal to perform the aforesaid scaling rate calculation processing are also included in the category of this embodiment. By so doing, only those who know the registration signal can correctly extract added information Inf. In this case, the registration signal can be used as a key for extracting added information Inf.

The scaling rate outputted from the scaling rate calculating unit 0704 is inputted by the scaling unit 0705. Image data wI$_1$' is also inputted by the scaling unit 0705, and scaling processing is carried out for image data wI$_1$' using the inputted scaling rate. Bilinear interpolation and bicubic interpolation among other things are applicable to scaling processing. And, image data WI$_2$' that has been subjected to scaling processing is outputted by the scaling unit 0705.

Furthermore, in this embodiment, the scaling rate calculating unit 0704 outputs the scaling rate to the pattern arrangement calculating unit 0204 in FIG. 1, for another purpose.

One purpose is to scale up or down the image data $wI_1'$ to the image data $wI_2'$ through scaling processing, but another purpose is to determine a pattern arrangement used for embedment on the basis of this outputted scaling rate in the pattern arrangement calculating unit 0204 in FIG. 2.

Now, extraction of the registration signal embedded using a configuration as shown in FIG. 50 will be described, using FIG. 53.

FIG. 53 shows a configuration shown in FIG. 7, to which a frequency property determining unit 5303 is further added. Because elements other than this are same as those shown in FIG. 7, same symbols are given to same elements, and description thereof will be omitted.

The amplitude spectrum calculated by the Fourier transforming unit 0702 is inputted not only by the impulse extracting unit 0703 but also by the frequency property determining unit 5303. Processing by the frequency property determining unit 5303 is identical to that by the frequency property determining unit 5003 in FIG. 50. That is, whether the image signal is an image signal with "smaller quantity of high frequency components" or an image signal with "larger quantity of high frequent components" is determined.

The determination result is inputted by a scaling rate calculating unit 5305 in the subsequent stage. The scaling rate calculating unit 5305 can calculate the scaling rate by the ratio of the frequency at which embedment is performed to the frequency at which the impulse is detected, as described previously. At this time, output from the frequency property determining unit 5303 by the previous stage is used to determine the frequency at which embedment is performed in advance.

That is, it is determined that the first registration signal $r_1$ is used for the image signal determined as an image signal with "smaller quantity of high frequency components", while the second registration signal $r_2$ is used for the image signal determined as an image signal with "larger quantity of high frequency components", and the registration signal for which determination has been made is used to calculate the scaling rate.

By the above described processing, only the image $WI_1'$ inputted by the registration unit is used to identify the registration signal used at the time of embedment, and calculate the scaling rate.

However, the present invention is not limited thereto, and information of the position (frequency) in which the registration signal is embedded may be received from the digital watermark embedding apparatus, as necessary. For example, cases where this position information is received as an encoded signal to perform the aforesaid scaling rate calculation processing are also included in the category of this embodiment. By so doing, only those who know the registration signal can correctly extract added information Inf. In this case, the registration signal is used as a key for extracting added information Inf.

3-7. Added Information Extraction Processing

Operations of the added information extracting unit 0204 in FIG. 2 for extracting added information Inf from the blue color component of image data wI' in which this added information Inf is embedded by the added information embedding unit 0103 in FIG. 1 will be now described. A flow of processing of extracting added information in this embodiment are shown in FIG. 20.

Figure 20:
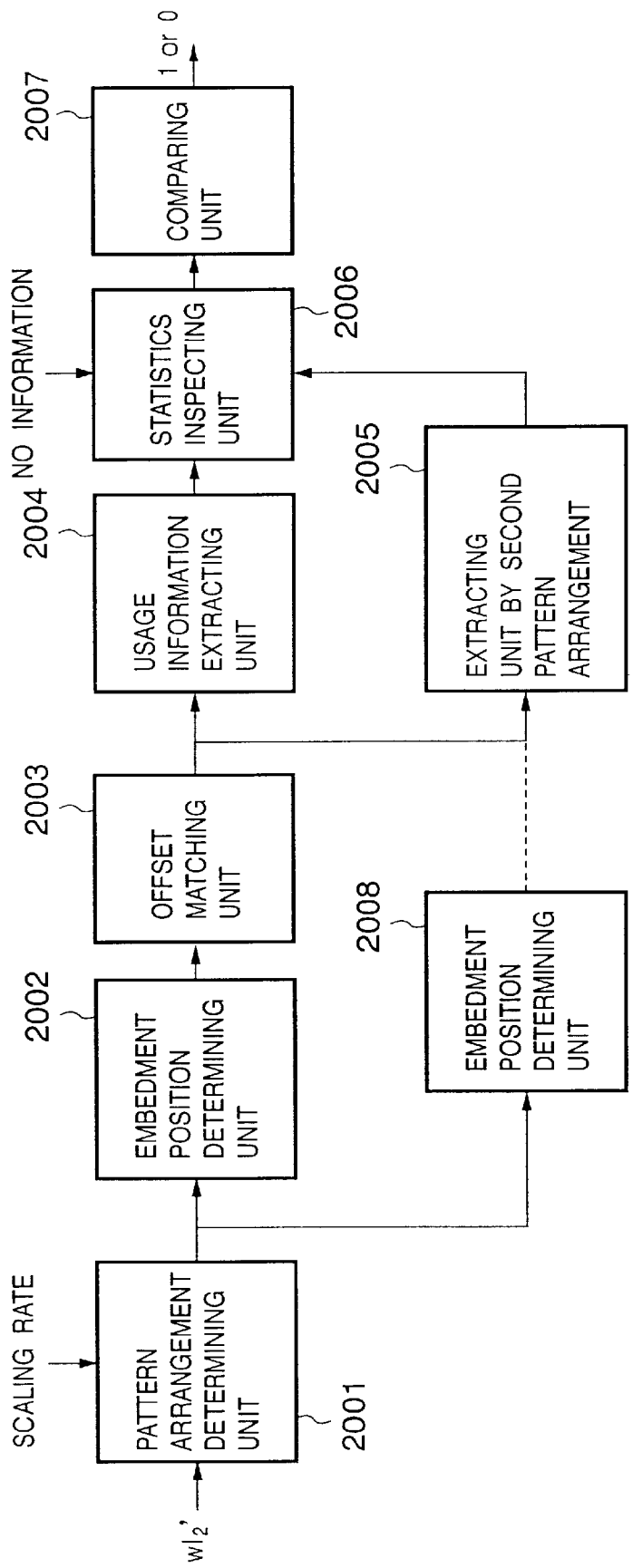
FIG. 20 illustrates an added information extracting unit of the preferred embodiment of the present invention.

As shown in FIG. 20, in this embodiment, the scaling rate is inputted by the pattern arrangement determining unit 2001 from the registration processing 0202 in FIG. 2, and the pattern arrangement used for embedment is determined.

3-7-1. Pattern Arrangement Determining Unit

Image data $wI_2$ subjected to scaling processing is inputted by the added information extracting unit 0204. At this time, if the pattern arrangement has been determined in accordance with the resolution of the image and the output resolution of the printer by the pattern arrangement determining unit 0110 in FIG. 1, the pattern arrangement used for embedment cannot be determined unless the resolution of the image and the output resolution of the printer are known. Extraction of added information cannot be performed unless the pattern arrangement used for embedment is known.

In this embodiment, a pattern arrangement in case of embedding added information Inf is determined from the scaling rate inputted from the registration unit 0202, by the pattern arrangement determining unit 2001.

Assuming that the input resolution of the scanner at the time of scanning a printed matter pwI' is fixed, and the output resolution of the printer is known, a unit for determining a pattern arrangement from the scaling rate will be described.

A printed matter pwI is scanned at input resolution of 600 ppi by the scanner 0201 in FIG. 2, and image data wI is obtained. Assume that the output resolution of the printer is 1200 dpi, and the input resolution of the scanner is 600 ppi, at this time.

The image data wI is inputted in the color component extracting unit 0202, which extracts the color component and outputs image data $wI_1$. This image data $wI_1$ is inputted by the registration unit 0203, and the scaling rate and the image $wI_2$ already subjected to scaling are outputted to the added information extracting unit 0204 from the scaling rate calculating unit 0704 by the registration unit 0202.

The scaling rate inputted by the added information extracting unit 0204 is inputted by the pattern arrangement determining unit 2001. As an example, an image wI in which an digital watermark having a scaling rate of 0.80 is embedded will be considered.

From the scaling rate and the input resolution of the scanner, it can be understood that the image has been outputted from the printer at image resolution of 600 ppi× 0.80=480 ppi.

Now, assuming that the resolution of the image of 500 ppi is a threshold, embedment is performed using 4901 in FIG. 49A (pattern arrangement of 8×8) for a pattern arrangement, in the case resolution lower than 500 ppi. In the case of resolution higher than 500 ppi, on the other hand, if the correspondence relationship where embedment is performed using 4903 in FIG. 49B (pattern arrangement of 12×12 ) for a pattern arrangement is specified considering gray scale conversion, it can be understood that for the image wI in which the digital watermark having a scaling rate of 0.80, embedment is performed using the pattern arrangement 4901 in FIG. 49A (pattern arrangement of 8×8).

As described above, the pattern arrangement determining unit 2001 determines the pattern arrangement used for embedment of added information Inf based on the scaling rate, and outputs the embedment position determining unit 2002 by the subsequent stage.

Furthermore, the orthogonal pattern arrangement 4902 in FIG. 49C corresponding to the pattern arrangement 4901 in FIG. 49A, and the orthogonal pattern arrangement 4904 in FIG. 49D corresponding to the pattern arrangement 4903 in FIG. 49B are used in an extracting unit 2005 according to the second pattern arrangement in FIG. 20. Orthogonal pattern arrangements will be described later in detail.

3-7-2. Embedment Position Determination Processing

In the embedment position determining unit 2002, which area of image data $wI_2'$(blue color component) added information Inf is extracted from is determined. Operations carried out by this embedment position determining unit 2002 are same as those by the embedment position determining unit 0103, and for this reason, areas determined by 0103 and 2002 are the same.

The aforesaid Correspondence Table 2 and further the pattern arrangement shown in FIG. 9 are used to extract added information Inf from a determined area. Here, embedment of added information Inf is achieved by convoluting the pattern arrangement against the determined area.

Furthermore, in the case where the pattern arrangement is variable in response to the output resolution of the image, the pattern arrangement inputted from the pattern arrangement determining unit 2001 in FIG. 20 shall be used. Hereinafter, explanation will be presented only on the case where the pattern arrangement inputted from the pattern arrangement determining unit 2001 in FIG. 20 is 8×8, but even in the case of other pattern arrangements, similar operations will be carried out.

3-7-3. Confidence Distance Computing Unit

Figure 6:
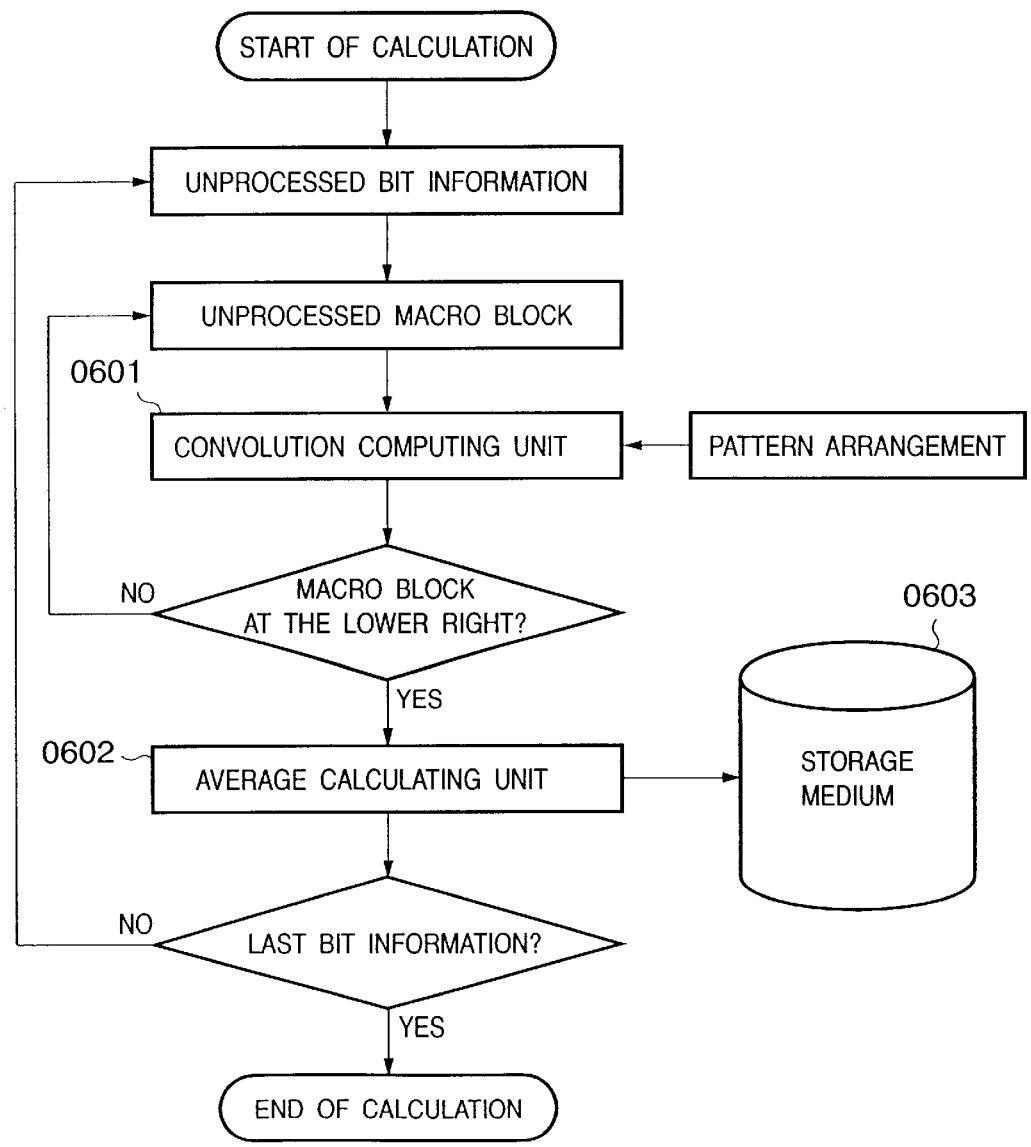
FIG. 6 shows a detailed configuration of a confidence distance computing unit.

The confidence distance d is a calculated value required when embedded information is extracted. A method of determining the confidence distance d corresponding to each bit information is shown in FIG. 6.

First, processing performed by a convolution computing unit 0601 will be described using FIG. 21 and FIG. 22. Examples of embedment of one bit of information constituting added information Inf are shown in FIGS. 21 and 22.

Figure 21:
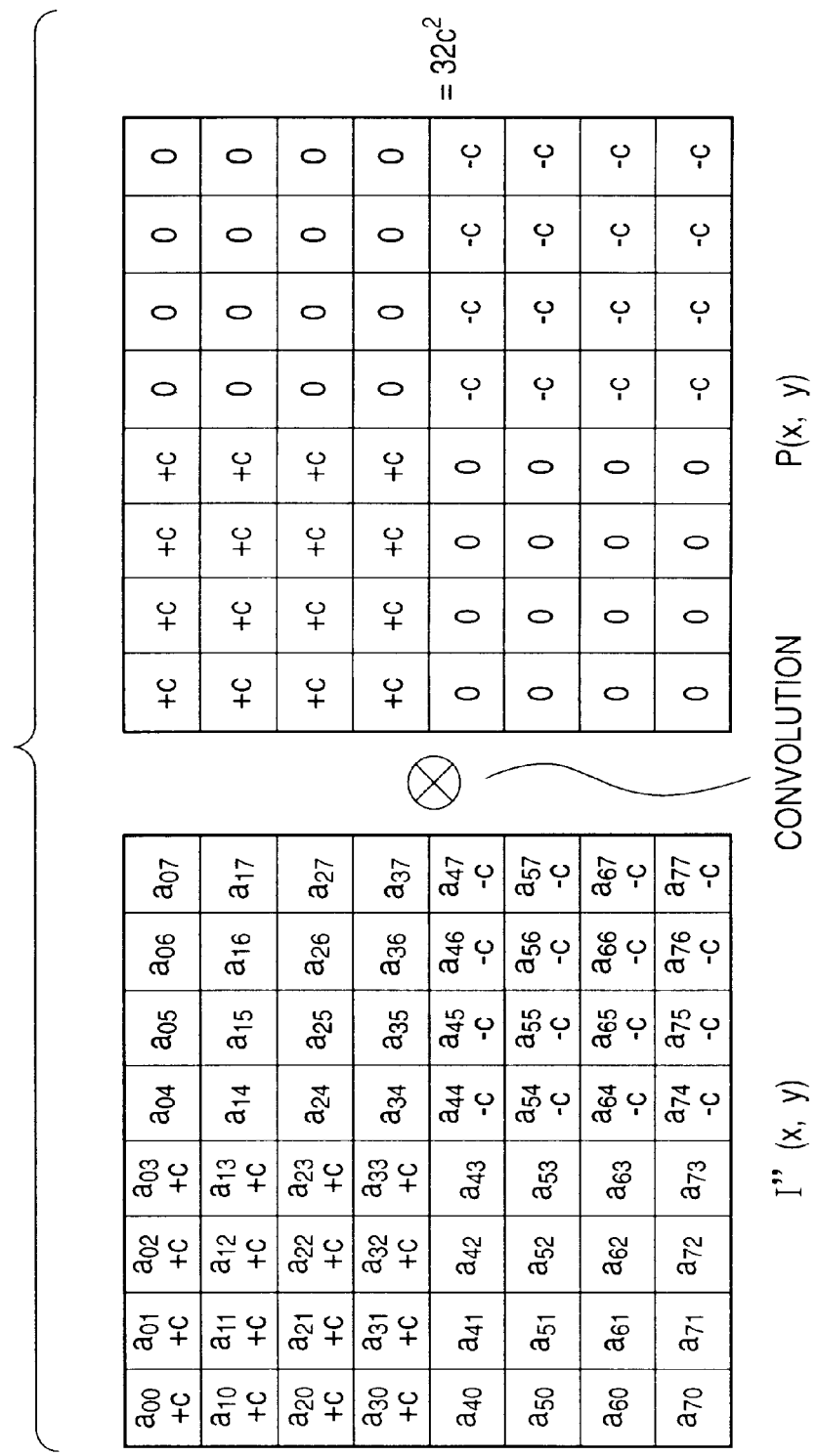
FIG. 21 illustrates added information Inf being extracted by the preferred embodiment of the present invention.
Figure 22:
FIG. 22 shows extraction being performed despite absence of added information Inf of the preferred embodiment of the present invention.

FIG. 21 shows an example of performing processing of extracting 1 bit information for image data (blue color component) I"(x, y) in which this 1 bit information constituting added information Inf is embedded, and FIG. 22 shows an example of trying to perform processing of extracting 1 bit information for image data I"(x, y) in which the above described 1 bit information is not embedded.

In FIG. 21, I"(x, y) is image data in which 1 bit information is embedded, and P(x, y) is a 8×8 pattern arrangement (pattern arrangement for extracting added information Inf) for use in convolution processing. Each element (0, ±c) constituting this pattern arrangement is multiplied by a pixel value placed in the same position in input image data I"(x, y), and the sum of each multiplied value is calculated. In other words, P(x, y) is convoluted against I"(x, y).

Here, I"(x, y) is a representation including the image in the case of the image data I'(x, y) attacked. If it is not attacked, I"(x, y)=I'(x, y) holds. In the case of the image in which 1 bit information is embedded in I"(x, y), there is a very high possibility that a non-zero value is obtained as a result of convolution, as shown in FIG. 21. Especially when I"(x, y)=I'(x, y) holds, 32 $C^2$ is obtained as a result of convolution.

Furthermore, in this embodiment, the pattern arrangement for use in embedment is same as the pattern arrangement for use in extraction. However, this embodiment should not be limited to the above described example. Generally, in the case where the pattern arrangement for use in embedment is defined as P(x, y), and the pattern arrangement for use in extraction is defined as P(x, y), alteration to relationship of P(x, y)=a*P(x, y) can be made. Here, a represents any real number, and in this embodiment, the case of a=1 will be described for simplification.

In the example shown in FIG. 22, on the other hand, computation similar to that described above is performed for the image data I"(x, y) in which 1 bit information is not embedded. A zero value is obtained as a result of convolution computation from the original image (corresponding to image data I), as shown in FIG. 22.

A method of extracting 1 bit information has been described above, using FIGS. 21 and 22. However, the above description refers to the case where a zero value is obtained as a result of convolution computation in image data I in which added information Inf is to be embedded, which is an ideal case. On the other hand, for an area corresponding to the 8×8 pattern arrangement in actual image data I, a zero value is hardly obtained as a result of convolution computation.

In other words, if for the area corresponding to the 8×8 pattern arrangement in the original image (image data I), convolution computation is performed using the pattern arrangement in FIG. 9 (See also the cone mask as placement information), a non-zero value may be obtained unlike an ideal case.

In a different way, there may be cases where convolution computation is performed in a same manner for the area corresponding to the 8×8 pattern arrangement in the image (image data wI) in which added information Inf is embedded, which results in not "$32c^2$" but "0". However, each of bit information constituting added information Inf is usually embedded in the original image several times. That is, added information Inf is embedded in the image several times.

Thus, the convolution computing unit 0601 calculates two or more of sums of results of convolution computation, for each bit information constituting added information Inf. For example, if added information is of 8 bits, eight sums are obtained.

These sums, corresponding to each bit information are inputted by an average calculating unit 0602, and each thereof is divided to be averaged by the number n of repetitions of the pattern arrangement corresponding to each bit information in the whole macro block. This averaged value is the confidence distance d. That is, this confidence distance d is a value generated by determining which of "$32c^2$" and "0" it is more similar to.

However, in the previous explanation for the patchwork method, since the confidence distance d is defined as d=(1/N)×($a_i$−$b_i$), the confidence distance d is in the strict sense an average value obtained as a result of performing convolution computation using P' (x, y)−1/c P(x, y). However, even if convolution computation is performed using P' (x, y)=aP(x, y), the average value obtained as a result of convolution computation is merely a value of the above described confidence distance d multiplied by a real number, and thus a similar effect can be obtained in essence.

Therefore, in this embodiment, it is utterly possible to use for the confidence distance d the average value obtained as a result of convolution computation using P' (x, y)=aP(x, y).

The confidence value d obtained in this way is accumulated in the storage medium of 0603.

The convolution computing unit 0601 generates the above described confidence distance d in repetition for each bit constituting added information Inf, and stores the confidence distance d in the storage medium 0603 in succession.

A little more detailed explanation will be presented as to this computed value. The confidence distance d calculated using the pattern arrangement in FIG. 9 (See also the cone mask as placement information) for the original image data I ideally equals 0. However, as is often the case with actual image data I, this value is a non-zero value although it is very close to zero. Examination of the frequency distribution of the confidence distance d produced for each bit information results in distribution as shown in FIG. 23.

Figure 23:
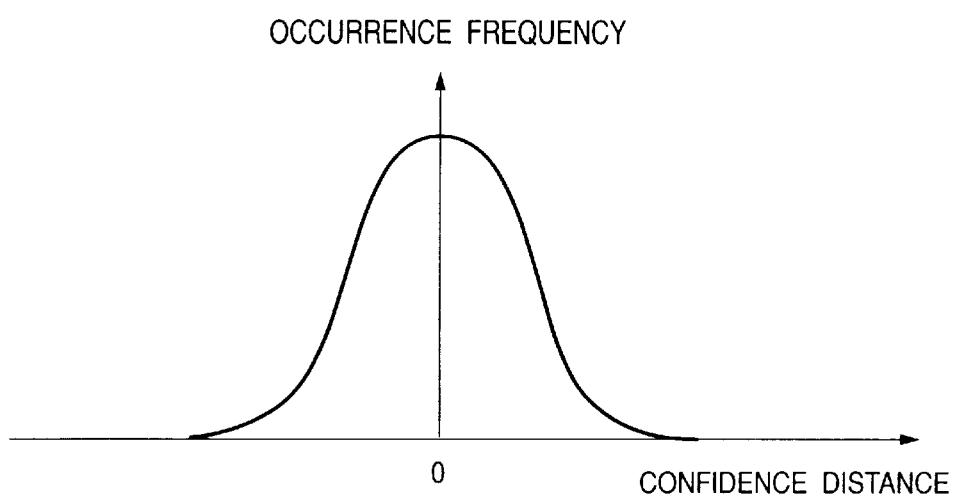
FIG. 23 shows ideal occurrence frequency distribution when a confidence distance d is extracted from an original image.

In FIG. 23, the lateral axis represents the value of confidence distance d produced for each bit information, and the vertical axis represents the number of bit information for which convolution producing the confidence distance d has been performed (occurrence frequency of the confidence distance d). As is apparent from the figure, it is similar to normal distribution. Also, in the original image data I, the confidence distance d does not necessarily equal 0, but the average thereof equals 0 (or a value that is very close to 0).

Figure 24:
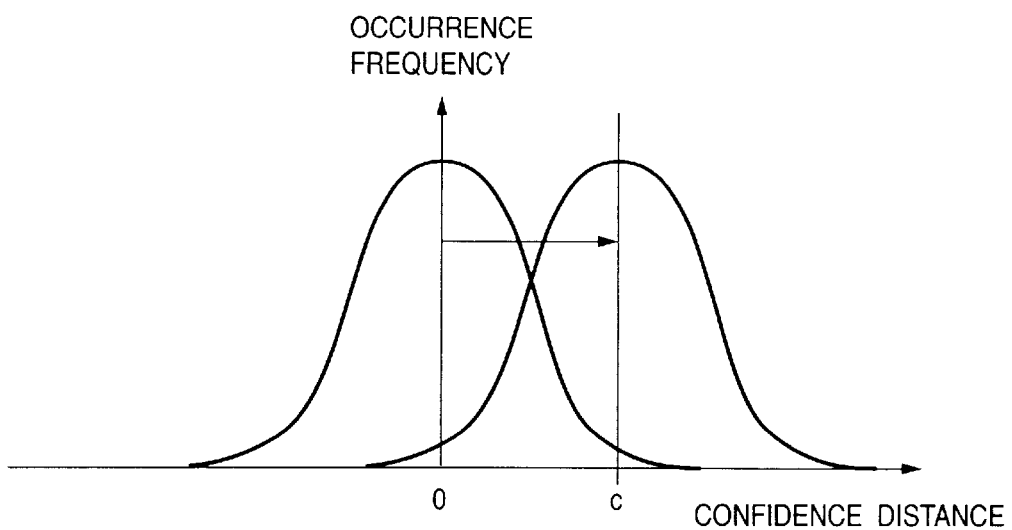
FIG. 24 shows the case where the confidence distance d is extracted from the image in which a digital watermark is embedded.

On the other hand, if the above described convolution of not the original image data I but image data (blue color component) after bit information "1" is embedded therein is performed against I'(x, y) as shown in FIG. 19, the confidence distance d takes on frequency distribution as shown in FIG. 24. That is, it is shifted in the right direction while keeping a distribution pattern in FIG. 23 as shown in the figure. In this way, for image data after certain 1 bit information constituting added information Inf, the confidence distance d does not necessarily equal c, but the average thereof equals c (or a value that is very close to c).

Furthermore, in FIG. 24, an example of embedding bit information "1" is shown, but in the case of embedding bit information "0", the frequency distribution shown in FIG. 23 is shifted in the left direction.

As described above, in the case where added information Inf (each bit information) is embedded using the patchwork method, larger the number of bits to be embedded (the number of times the pattern arrangement is used), the more likely the statistical distribution as shown in FIGS. 23 and 24 is correctly produced. In other words, accuracy with which whether or not each bit information constituting added information Inf is embedded, or whether embedded bit information is "1" or "0" can be detected is enhanced.

3-7-4. Offset Matching Processing

The offset matching unit 2003 will be now illustrated. Image data $wI_2'$ after being subjected to appropriate scaling is inputted in the offset matching unit 2003. After that, start bits are detected using the computation of confidence distance in FIG. 6.

The offset matching unit 2003 generates only five confidence distances corresponding to 5 bits of start bits $Inf_1$. As shown in FIG. 36, the start bit $Inf_1$ is part of added information Inf embedded in advance by the added information embedding unit 0104, and is the equivalent of 5 bits in the case of this embodiment.

These start bits $Inf_1$ are the equivalent of initial 5 bits conceptually, but exist not contiguously and densely but rather scatteringly in the image in which added information Inf is embedded. This is because they are corresponded to respective coefficient values constituting the cone mask of the Correspondence Table 2, and are embedded one after another.

Figure 28:
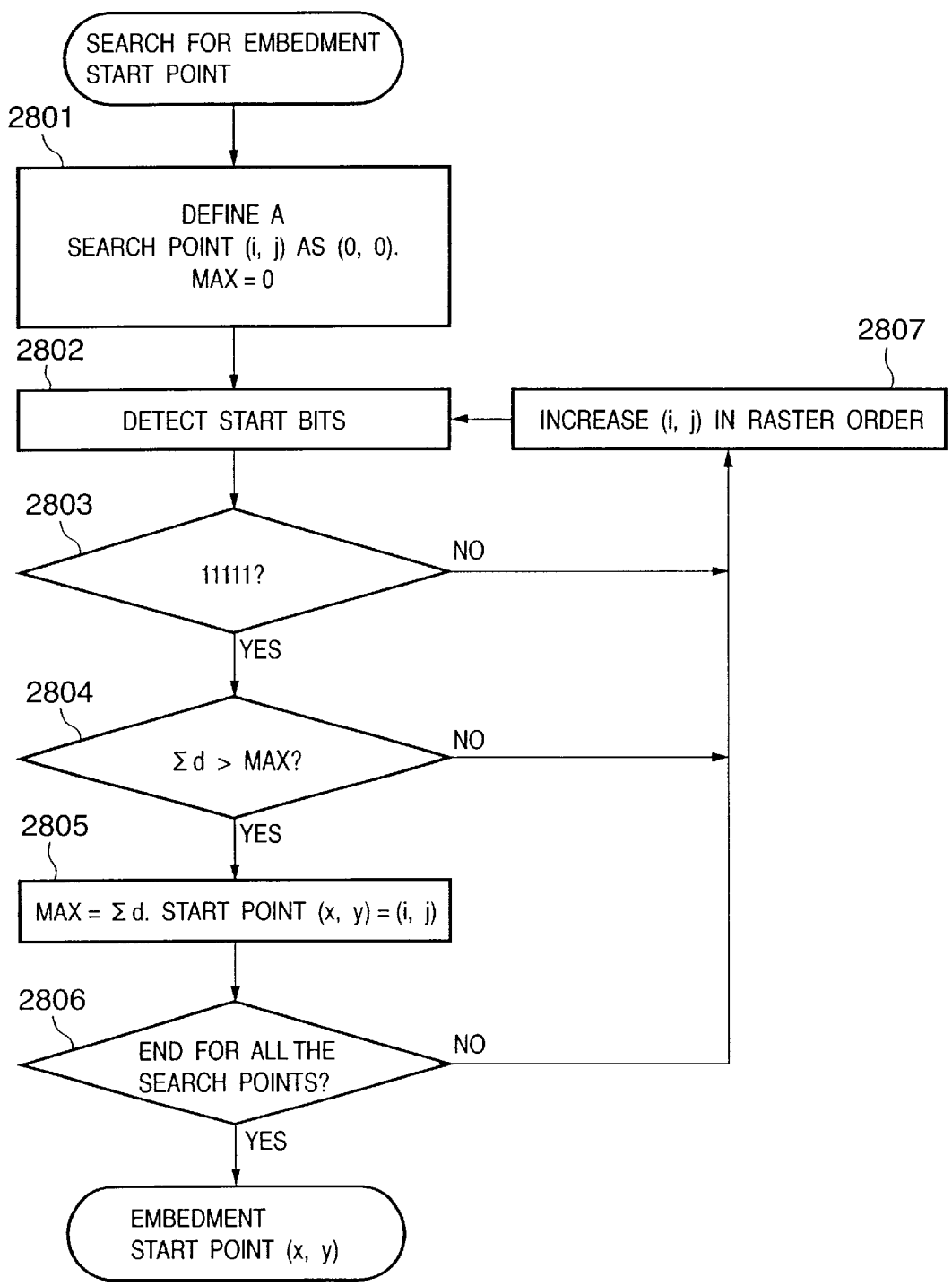
FIG. 28 is a flowchart illustrating registration processing of the preferred embodiment of the present invention.

Processing by the offset matching unit 2003 in this embodiment will be described below, referring to FIG. 28. FIG. 28 is a flowchart for illustrating processing by the offset matching unit 2003 in this embodiment. The following explanation will be presented in accordance with the flowchart in FIG. 28.

In the offset matching unit 2003, first the coordinate of the leftmost position is assumed to be a starting embedment coordinate for the inputted image data $wI_2'$, by Step 2801. At the same time, the maximum value MAX is defined set to 0. Then, by Step 2802, detection of start bits is tried using the confidence distance computing unit in FIG. 6.

Whether or not first to fifth bit information obtained here is correct start bits "11111" is determined by Step 2803. If this point is a correct coordinate for starting embedment, five continuous positive confidence distances d are detected as detection results, but if not so, there are many cases where those five positive confidence distances d are not continuous. The above described determination may be performed in succession to determine as a coordinate for starting embedment the position allowing correct start bits $Inf_1$ to be detected.

Actually, however, there may be cases where correct start bits $Inf_1$ are detected even with a point other than a coordinate for starting embedment. The cause for it will be described using FIGS. 27A to C.

Figure 27:
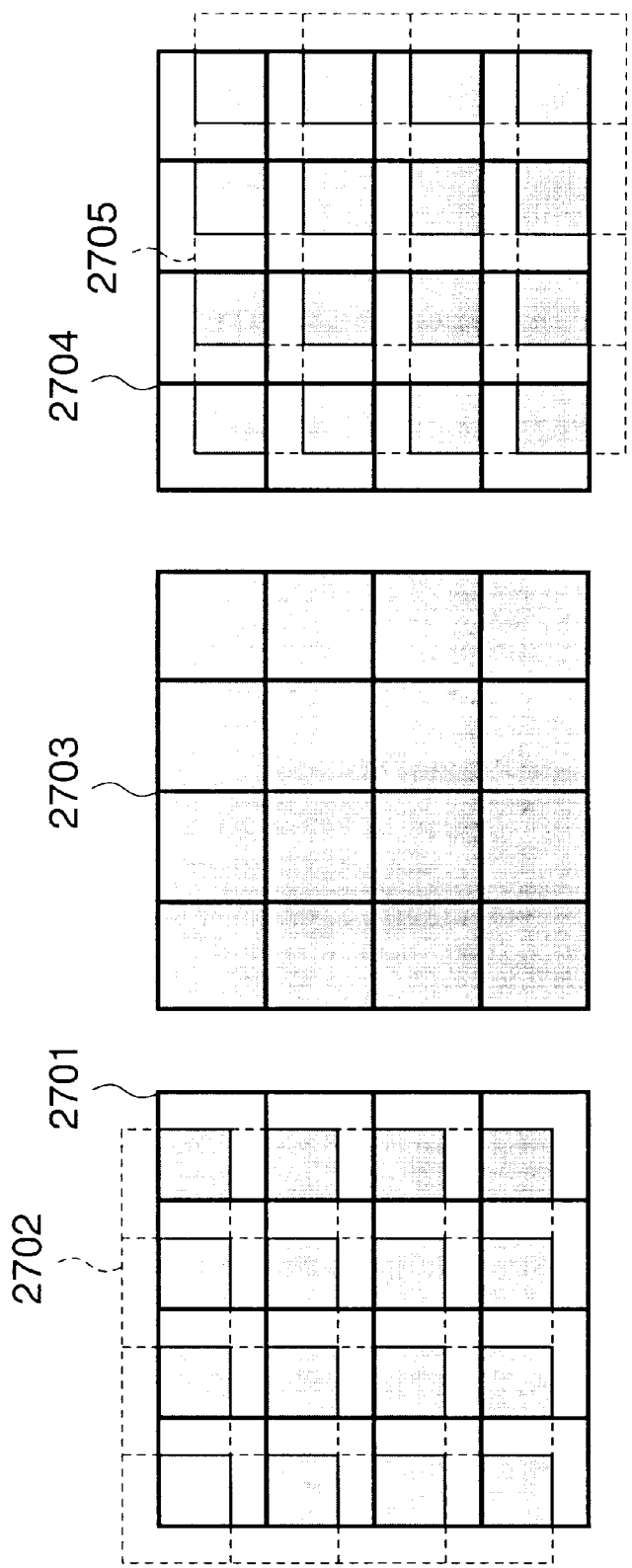
FIGS. 27A to 27C show a concept for retrieval of a leading position of embedment of the preferred embodiment of the present invention.

FIGS. 27A to C show the situation in which for extracting added information Inf embedded through the patchwork method for use in this embodiment, the pattern arrangement (2702, 2705) (See also the cone mask as placement information) identical to the pattern arrangement used at the time of embedment of added information Inf is used to perform convolution while making a search for the positions of original mask blocks (2701, 2703, 2704). Searches are continuously made from the left figure toward the right figure.

In FIGS. 27A to C, attention is given to one macro block (a minimum unit allowing added information Inf to be extracted) being part of image data $wI_2'$, for simplification. One square in this figure shows a concept of the size of the pattern arrangement for embedding 1 bit information.

If 2701 and 2702 have relationship with each other, in FIG. 27A, that is if the macro block 2702 is positioned at the upper-left compared to the actual macro block 2701, the positions of the original image and the pattern arrangement for embedding added information Inf overlap one another only in the shaded area.

Also, in FIG. 27B, the case where searches are further made, and the position, for which searches are being made, perfectly matches the position of the actual macro block is shown. In this status, the pattern arrangement targeted for convolution and the macro block overlap one another in a maximum area.

Furthermore, in FIG. 27C, the position, for which searches are being made, is placed at the lower right compared to the position of the macro block in which added information Inf is actually embedded. In this status, the pattern arrangement targeted for convolution and the macro block overlap one another only in the shaded area.

In all cases of FIGS. 27A to C, if the pattern arrangement targeted for convolution and the macro block adequately overlap one another, correct start bits $Inf_1$ can be extracted. However, for these three cases, confidence distances d are different because areas of overlap are different.

Consideration can be made with the above described area of overlap being in place of the aforesaid confidence distance d. Namely, if the pattern arrangement targeted for convolution and the macro block perfectly match each other in terms of positional relationship, the confidence distance d is very close to $\pm 32c^2$ described above, for each bit information.

Thus in this embodiment, as in the case of FIG. 28, if it is determined in Step 2803 that start bits $Inf_1$ are not correct ones, movement to a next search point is made by Step 2804 according to the raster order.

On the other hand, it is determined that start bits $Inf_1$ are correct ones, whether or not the sum of confidence distances d corresponding to five bits regarded as start bits $Inf_1$ is larger than the maximum value MAX is determined by Step 2804.

If the sum is smaller than the maximum value MAX, movement to a next search point is made by Step 2807 according to the raster order. On the other hand, if the sum of confidence distances d corresponding to five bits regarded as start bits Inf1 is larger than the maximum value MAX, the maximum value MAX is updated, and the current search point is stored as a starting point at the same time. Then, in Step 2806, whether or not searches have been made for all the search points is determined.

If it is determined in Step 2806 that searches have not been made yet for all the search points, movement to a next search point is made by Step 2807 according to the raster order. On the other hand, in the case where all searches for all the search points have been completed, the point for starting embedment stored at that time is outputted to end processing.

Through the processing described above, the offset matching unit 2003 in this embodiment detects the start bits $Inf_1$, determines as a point for starting embedment of added information Inf the information of the coordinate for which the sum of confidence distances d corresponding to five bits regarded as start bits $Inf_1$ is the largest in coordinates for which correct start bits $Inf_1$ have been obtained, and outputs the information to the subsequent stage as the coordinate for starting embedment.

3-7-5. Usage Information Extracting Unit

The usage information extracting unit 2004 inputs a coordinate for starting embedment and image data in which added information Inf is embedded from the offset matching unit 2003 in the previous stage, calculates the confidence distance d only for each bit information constituting usage information $Inf_2$ in this case using in a same way the operations described with FIG. 6, and outputs the confidence distance d1 for these bit information to a statistics inspecting unit 2006 in the subsequent stage.

Furthermore, obtaining the confidence distance d1 corresponding to each bit information constituting usage information $Inf_2$ substantially means extracting each bit of embedded usage information $Inf_2$. Description thereof will be presented later.

Here, each confidence distance d is only calculated on the basis of the coordinate for starting embedment for which determination has been made through the above described search, and five bits of start bits $Inf_1$ are not extracted.

3-8. Statistics Inspection Processing

The statistics inspecting unit 2006 determines the reliability of the confidence distance d1 obtained by the usage information extracting unit 2004 in FIG. 20. This determination is carried out by generating the confidence distance d2 using a second pattern arrangement different from the first pattern arrangement used for embedding added information Inf (usage information $Inf_2$), and generating a confidence index D referring to the occurrence frequency distribution of this confidence distance d2.

Here, the confidence distance d1 is a confidence distance that is obtained by using the first pattern arrangement (See also the cone mask as placement information) to extract usage information $Inf_2$ in the usage information extracting unit 2004, and the second confidence distance d2 is a confidence distance that is obtained by using the second pattern arrangement described later, which is different form the first pattern arrangement.

The first pattern arrangement is usually the pattern arrangement in FIG. 9 used at the time of embedding added information Inf (start bits $Inf_1$, usage information $Inf_2$). Furthermore, details about the second pattern arrangement, the confidence index D and the like will be described later.

3-8-1. Extraction Processing with the Second Pattern Arrangement

Central Limit Theorem

Subsets A and B are sets constituted by N elements expressed by $A=\{a_1, a_2, \ldots a_n\}$ and $B=\{b_1, b_2, \ldots b_n\}$, respectively, each of which is a pixel value held by each element of subsets A and B as shown in FIG. 30.

If for the confidence distance d, i.e. $(\Sigma(a_i-b_i)/N)$, N takes on an adequately large value, and there is no correlation between $a_i$ and $b_i$, the expected value of the confidence distance d equals 0. The distribution of the confidence distance d takes on an independent normal distribution by the central limit theorem.

Now, the central limit theorem will be briefly described. It is a theorem stating that when an optional sampling with the size of $n_c$ is extracted from a population with the average value of mc and the standard deviation of $\sigma_c$ (not necessarily a normal distribution), the distribution of the sampling average value $S_c$ approaches a normal distribution $N(m_c, (\sigma_c/\sqrt{n_c})^2)$ as $n_c$ increases.

Generally the standard deviation $\sigma_c$ of the population is often unknown, but it is almost all right, in practice, to use the standard deviation $s_c$ of the sampling in place of $\sigma_c$ when the number of samples $n_c$ is adequately large and further the number of populations $N_c$ is large compared to the number of samples $n_c$.

Explanation is now returned to this embodiment. First, the occurrence frequency distribution of the confidence distance d1 determined by the usage information extracting unit 2004 is largely varied depending on whether or not usage information $Inf_2$ could be correctly extracted.

Figure 25:
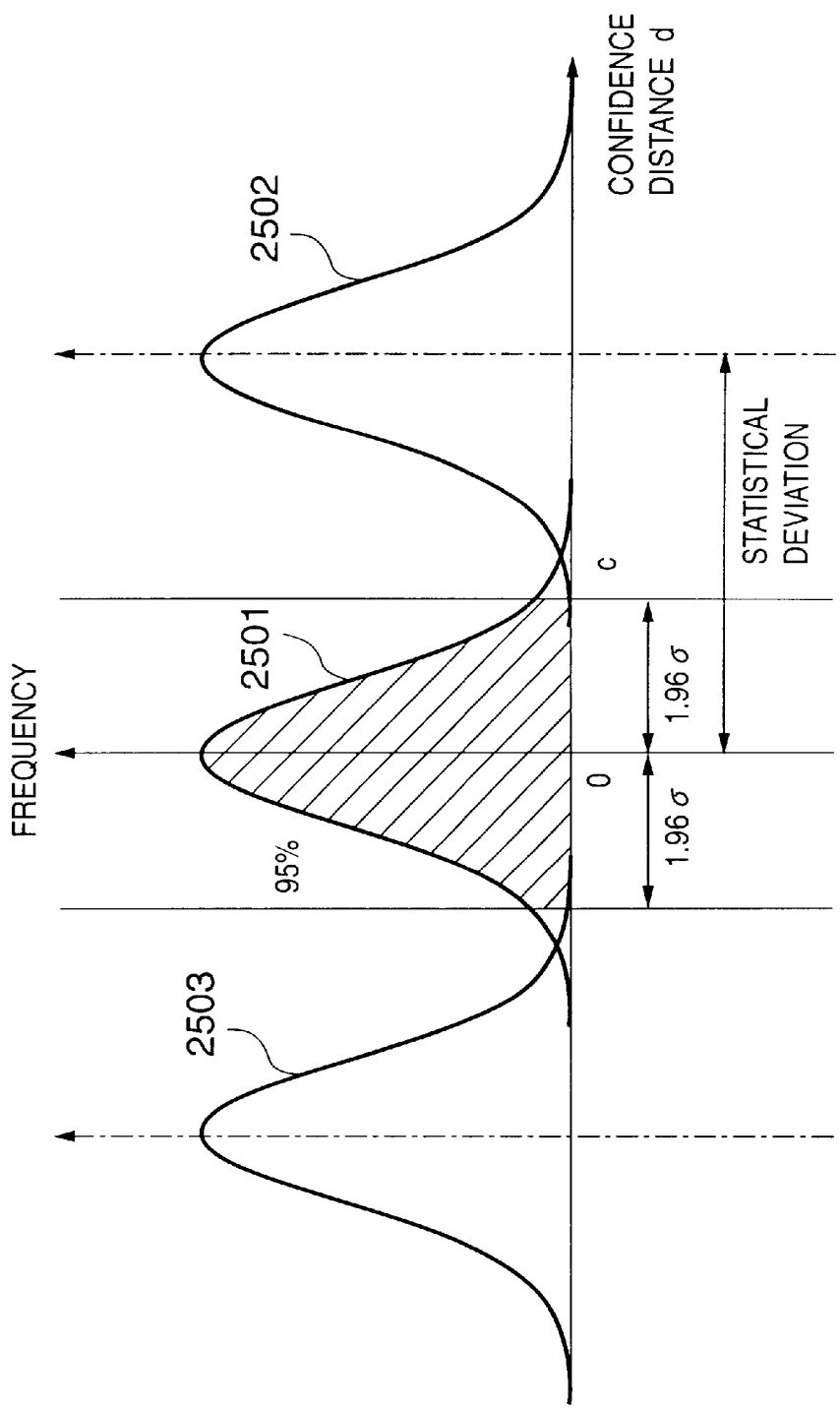
FIG. 25 illustrates an example of the occurrence frequency distribution of the confidence distances d1, d2 of the preferred embodiment of the present invention.

For example, if start bits $Inf_1$ are erroneously detected (if offset matching is failed, and so on), the occurrence frequency distribution of the confidence distance d1 takes on a normal distribution similar to the normal distribution 2501 shown in FIG. 25 because bit information is not actually embedded in the position in which usage information $Inf_2$ should have been embedded.

On the other hand, if start bits are correctly extracted, each confidence distance d1 corresponding to bit information "1" constituting usage information $Inf_2$ is accumulated one after another in the position of the normal distribution 2502, and each confidence distance d1 corresponding to bit information "0" constituting usage information $Inf_2$ is accumulated one after another in the position of the normal distribution 2503. Hence, two "peaks" appear in this case. The ratio between sizes of these two "peaks" almost equals the ratio between bit information "1" and "0" constituting usage information $Inf_2$.

However, this is based on the premise that the confidence distance d1 obtained by performing convolution processing according to the first pattern arrangement for the original image in which added information is not embedded takes on a normal distribution similar to the normal distribution 2501.

Therefore, in actuality, whether or not extraction has been correctly performed can not be determined unless the state of the original image is known.

Thus, in this embodiment, the normal distribution of the confidence distance d2 is generated using so called a second pattern arrangement allowing the state of the image to be determined adequately even though added information is embedded, and this normal distribution is considered as the normal distribution 2501, thereby determining whether or not usage information $Inf_2$ has been correctly extracted.

For example, if the occurrence frequency distribution of the confidence distance d1 exists outside a shaded area (constituent elements occupying the range from the center to the point of 95%) constituting the normal distribution 2501 generated with the confidence distance d2, it can be considered that a statistical deviation is caused in the targeted image and usage information $Inf_2$ is embedded therein, thus making it possible to determine the reliability of the usage information $Inf_2$ statistically. A detailed method thereof will be described later.

A method in which an occurrence frequency distribution similar to that of the confidence distance d1 before embedment of added information Inf (similar to the normal distribution 2501 shown in FIG. 25) is generated, using image data in which added information Inf (usage information $Inf_2$) is embedded, will be now described.

In this embodiment, the extracting unit 2005 according to the second pattern arrangement is used to determine the confidence distance d2 constituting a distribution similar to the normal distribution 2501.

The extracting unit 2005 is a unit that determines the confidence distance d2 using the second pattern arrangement "orthogonal to" the first pattern arrangement used with the usage information extracting unit 2004, and is almost identical to the usage information extracting unit 2004 in terms of operation itself, in that it performs convolution processing, and so on.

Furthermore, for the purpose of contrastive illustration, the pattern arrangement in FIG. 9 used with the usage information extracting unit 2004 and the mask (cone mask) for referring to the position in which this pattern arrangement is placed are called a "first pattern arrangement" and a "first position reference mask", respectively, and the pattern arrangement "orthogonal to" the first pattern arrangement and the mask for referring to the position in which this pattern arrangement is placed are called a "second pattern arrangement" and a "second position reference mask", respectively.

A coordinate for starting embedment is first inputted in the extracting unit 2005 according to the second pattern arrangement from the offset matching unit 2003, and the confidence distance d2 is calculated using confidence distance computation in FIG. 6 described above, as well.

At this time, the pattern arrangement that is used in confidence distance computation in FIG. 6 is not the pattern arrangement in FIG. 9 used in embedment 0901 but a pattern arrangement 3301 or 3302 "orthogonal to" this pattern arrangement 0901 as shown in FIGS. 33A and B.

This is because the confidence distance d2 that is calculated using the pattern arrangements 3301 and 3302 in FIGS. 33A and B is not affected at all by operations with the pattern arrangement 0901 in FIG. 9.

Figure 34:
FIG. 34 illustrates an "orthogonal" pattern arrangement.

As shown in FIG. 34, as a result of performing processing of convolution of the pattern arrangement 0901 in FIG. 9 and the above described pattern arrangement 3301 "orthogonal" thereto, 0 is obtained. The same goes for the pattern arrangement 3302. In other words, as a result of convolution of the first and second pattern arrangements, 0 is obtained. Thus, even though the gray scale of the original image is changed using the first pattern arrangement, the confidence distance d obtained by performing convolution processing using the second pattern arrangement is not affected at all.

Therefore, the occurrence frequency distribution of the confidence distance d2 obtained by performing convolution processing using the above described second pattern arrangement for the image in which added information Inf is embedded is almost same as the normal distribution 2501 in FIG. 25. Accordingly, the occurrence frequency distribution is regarded as the normal distribution 2501.

Figure 32:
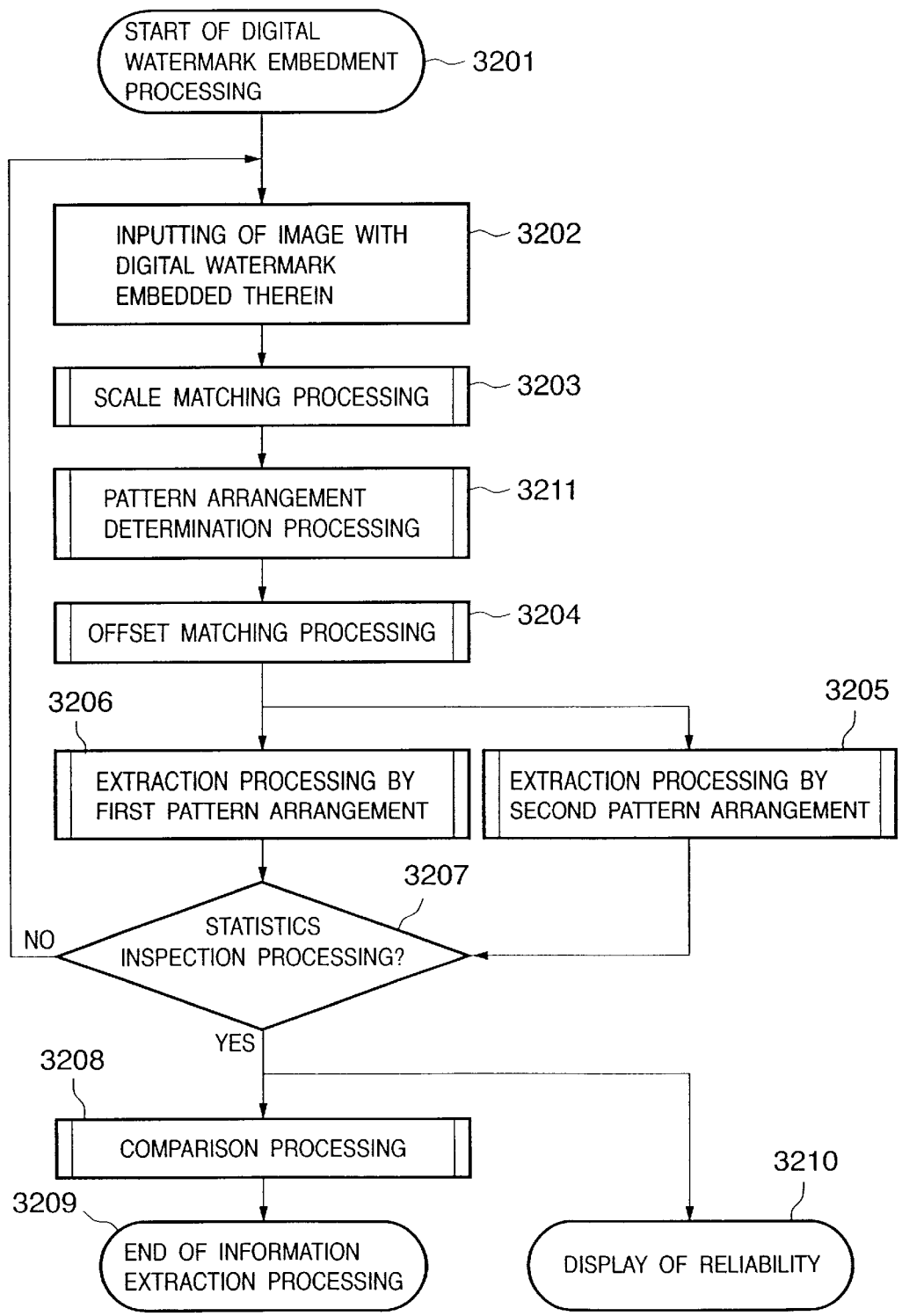
FIG. 32 is a flowchart for illustrating a total control of a digital watermark extracting apparatus of the preferred embodiment of the present invention.

The normal distribution 2501 obtained at this time provides a criterion of determination required for statistics inspection processing of 3207 in FIG. 32.

Figure 35A:
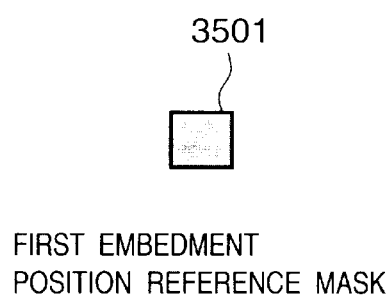
FIGS. 35A and 35B show first and second position reference masks of the preferred embodiment of the present invention.
Figure 35B:
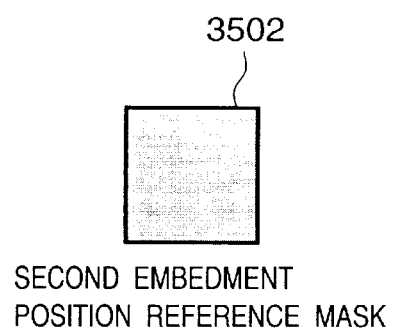

In extraction processing 2005 according to the second pattern arrangement, the normal distribution of the confidence distance d2 is generated, using "pattern arrangement "orthogonal to" the first pattern" as shown by 3301 and 3302 in FIGS. 33 A and B and the second position reference mask shown by 3502 in FIG. 35B.

Furthermore, the conditions of the above described "pattern arrangement "orthogonal to" the first pattern" are as follows: (1) it has the same size as that of 0901 in FIG. 9 as shown in FIGS. 33A and B, and (2) as a result of processing of convolution with the pattern arrangement in FIG. 9 used at the time of embedding added information Inf, 0 is obtained as in the case of the pattern arrangements 3301 and 3302.

Also, convolution processing shown in FIG. 34 is same as convolution processing shown in FIGS. 21 and 22.

In this embodiment, the case where 0 is obtained as a result of convolution is called a case where "pattern arrangements are" orthogonal to "each other", linking to the case where 0 is obtained when inner products of vectors are orthogonal with each other. Thus, 3301 and 3302 in FIGS. 33A and B represent "pattern arrangements" orthogonal to "the pattern arrangement 0901 in FIG. 9".

The reason for using the pattern arrangement "orthogonal to" the pattern arrangement used in embedment of added information to calculate the confidence distance d2 is to prevent a statistical deviation being caused in the distribution of the confidence distance d2, namely, to generate an occurrence of frequency distribution centered on 0.

Also, as a necessary condition of the "pattern arrangement "orthogonal to" the first pattern", (3) it has the same number of non-zero elements as non-zero elements of the pattern arrangement used for usage information extraction processing 2004, and the numbers of positive and negative elements are the same, respectively. This is necessary to extract the confidence distances d1 and d2 under the same computation condition. Then in this embodiment, for the "second position reference mask", the mask shown by 3502 in FIG. 35B that has a pattern different from that of 3501 in FIG. 35A used at the time of embedding added information Inf and is different in size from the mask 3501 is used.

As described above, if the above described first and second pattern arrangements are different from each other, the occurrence frequency distribution of the confidence distance d2 is almost same as the normal distribution 2501.

However, there is also a possibility that a statistical deviation is detected in spite of the fact that the second pattern arrangement has been used to perform convolution, if detecting start bits position is not perfect, and so on. In this embodiment, the sizes of the first and second position reference masks are made to be different from each other, considering this possibility, whereby periodic elements are canceled out. Alternatively, each pattern arrangement in the mask is placed in a different way, thereby preventing convolution in the same area.

Also, in this case, the "second position reference mask" only needs to have each coefficient constituting the mask distributed at random, and is not necessarily a cone mask.

If a setting is made so that the "second embedment position reference mask" is different from the "first embedment position reference mask", the "second embedment position reference mask" shall be created by the embedment position determining unit 2008 in FIG. 20.

Generally, considering the above described resistance to clipping, it is unlikely that the first position reference mask (cone mask) does not take on a large size relative to the entire image data targeted for embedment of added information. Thus, for the "second position reference mask", it is advisable to use a larger mask. In this embodiment, a setting is made so that the second mask that is used at the time of calculating the confidence distance d1 at the added information Inf side is larger in size that the first mask to which reference is made at the time of embedding added information Inf.

However, this embodiment is limited thereto, and even if the sizes of the both masks are the same, some degree of effect is provided. Therefore, the "second position reference mask" may be a mask created by the position determining unit 2002 in FIG. 20.

For a minimum condition of the mutual masks, it is necessary that the numbers of repetitions of respective bits constituting added information applied to the mutual masks are the same in image areas having same sizes.

Furthermore, if satisfactory results cannot be obtained with extraction processing according to the second pattern arrangement, there is also a possibility that an ideal occurrence frequency distribution that is 2501 in FIG. 25 can be generated by calculating the confidence distance d2 again using another pattern arrangement and second position reference mask satisfying the above described conditions.

Specific operations of the extracting unit 2005 according to the second pattern arrangement will be now presented.

In this embodiment, the first position reference mask is a 32×32 cone mask and the second position reference mask is a 64×64 cone mask, and the relative arrangement of each coefficient is entirely different for these two masks.

First, for the second pattern arrangement 2005, determination of extraction positions shall be made in accordance with the following Correspondence Table 3.

CORRESPONDENCE TABLE 3

| The order of each bit information | 1 | 2 | 3 | 4 | ... | 69 |
|---|---|---|---|---|---|---|
| Coefficient values in the second position reference mask | 0,1 | 2,3 | 4,5 | 6,7 | ... | 136,137 |

For the second position reference mask, there exist sixteen coefficients having the same values respectively in the mask. For the first position reference mask of 32×32, on the other hand, the number of repetitions of the same coefficient among 32×32 coefficients is 4, in the case where reference to the mask is made using the previous Correspondence Table 2. That is, for both the first and second position reference masks, coefficients having same values exist in equal numbers.

In this embodiment, the second pattern arrangement is assigned to the positional relation conforming to the rule of the above described Correspondence Table 3, and convolution processing is performed, one after another, to calculate 69 confidence distances d2 corresponding to respective bit information.

3-8-2. Confidence Index D

The confidence distance d2 generated by the extracting unit 2005 according to the second pattern arrangement 2005 occurs in distribution almost the same as the normal distribution 2501, but in the normal distribution, it is generally known that 95% of samples (confidence distances d2) in the range defined by the following equation (25.1) occur.

$$m-1.96\sigma < d2 < m+1.96\sigma \qquad \text{Equation (25.1)}$$

wherein $\sigma$ is a standard deviation for the above described confidence distance d2, and m is an average value. Furthermore, the range in the above described case is called a "95% confidence interval".

After the confidence distance d2 is obtained in the extraction unit 2005 according to the second pattern arrangement, $m-1.96\sigma$ and $m+1.96\sigma$ are calculated using the confidence distance d2.

Since the occurrence frequency distribution of the confidence distance d1 inputted in the statistics inspecting unit 2006 from the usage information extracting unit 2004 takes on the normal distribution 2502 in FIG. 25 in the case of bit information of 1", and takes on the normal distribution 2503 in the case of bit information of "0", the possibility is quite high that the confidence distance d1 corresponding to usage information $Inf_2$ exists outside the 95% confidence interval (a shaded area in FIG. 25) obtained by the extracting unit 2005 according to the second pattern arrangement.

By the way, if at the time of processing by the offset matching unit 2003, no added information $Inf_2$ exists in the image targeted for this processing, the occurrence frequency distribution of the confidence distance d1 also takes on a distribution similar to the normal distribution 2501.

The possibility that none of 64 confidence distances d1 corresponding to usage information $Inf_2$ is included in the confidence interval of the equation (25.1) in spite of the fact that added information $Inf_2$ is embedded in the image is $(1-0.95)$ raised to the 64th power, which is extremely low.

Therefore, as long as the normal distribution 2501 has been determined based on the confidence distance d2, whether or not the occurrence frequency distribution determined based on the confidence distance d1 is included in the range occupying most part of this normal distribution is considered, thereby making it possible to determine almost reliably whether or not added information Inf (usage information $Inf_2$) is embedded.

The statistics inspecting unit 2006 determines a confidence degree as to whether added information (usage information $Inf_2$) is embedded, using properties as described above.

In this embodiment, the confidence degree as to whether usage information-Inf is embedded is considered as a confidence index D.

This confidence index D is defined as the ratio of the number of confidence distances d1 existing outside the range of the equation (25.1) to the number of all the confidence distances d1 generated by the usage information extracting unit 2004.

If this confidence index D is larger than a threshold value Th, the statistics inspecting unit 2006 determines that the general occurrence frequency distribution of the confidence distance d1 is artificially biased so that confidence distances d1 are distributed heavily in positions like 2502 and 2503, namely it is an image in which usage information $Inf_2$ is surely embedded. Thus, it is considered that the confidence distance d1 used for determination is in itself reliable information, and it is permitted that this confidence distance d1 is further transferred to a comparing unit 2007 in the subsequent stage.

Furthermore, for the confidence index D, the confidence index D of usage information $Inf_2$ or a massage based on the index D may be displayed on a monitor, as shown by a confidence displaying step 3210 in FIG. 32.

For example, if the confidence index D is not larger than the threshold value Th, a massage like "Usage information $Inf_2$ is not correctly extracted", followed by returning from a statistics inspecting step 3207 to a step of inputting an image again 3202 in FIG. 32.

3-9. Comparison Processing

The comparing unit 2007 in FIG. 20 inputs the confidence distance d1 outputted via the usage information extracting unit 2004 and the statistics inspecting unit 2006. Because the confidence distance d1 that is inputted therein is highly reliable information, all that should be done here is to simply determine whether respective bit information corresponding to confidence distances d1 is of "1" or "0."

Specifically, if the confidence distance d1 of certain bit information constituting usage information $Inf_2$ is positive, then it is determined that this bit information is of "1", and if the confidence distance d1 is negative, then it is determined that this bit information is of "0".

The usage information $Inf_2$ obtained through the above described determination is outputted as final data for providing user's reference information or the control signal.

3-10. Considerations for Quick Processing

Extraction of added information can be carried out as described above. In this embodiment, on the other hand, all processing of embedment of added information Inf is not necessarily carried out. In the embodiment described above, it is assumed that digital watermark information is embedded in the input pwI in the digital watermark extracting apparatus shown in FIG. 2.

On the other hand, there may be cases where no digital watermark information is embedded in the input pwI in the digital watermark extracting apparatus. Furthermore, there are applications requiring that processing should be ended as speedily as possible for digital watermark extraction information.

From the above, it is desirable that in the digital watermark extracting apparatus, watermark extraction processing is ended just when it is determined that no digital watermark information is embedded in the input pwI in the watermark extracting apparatus, in terms of ending processing speedily.

Figure 60:
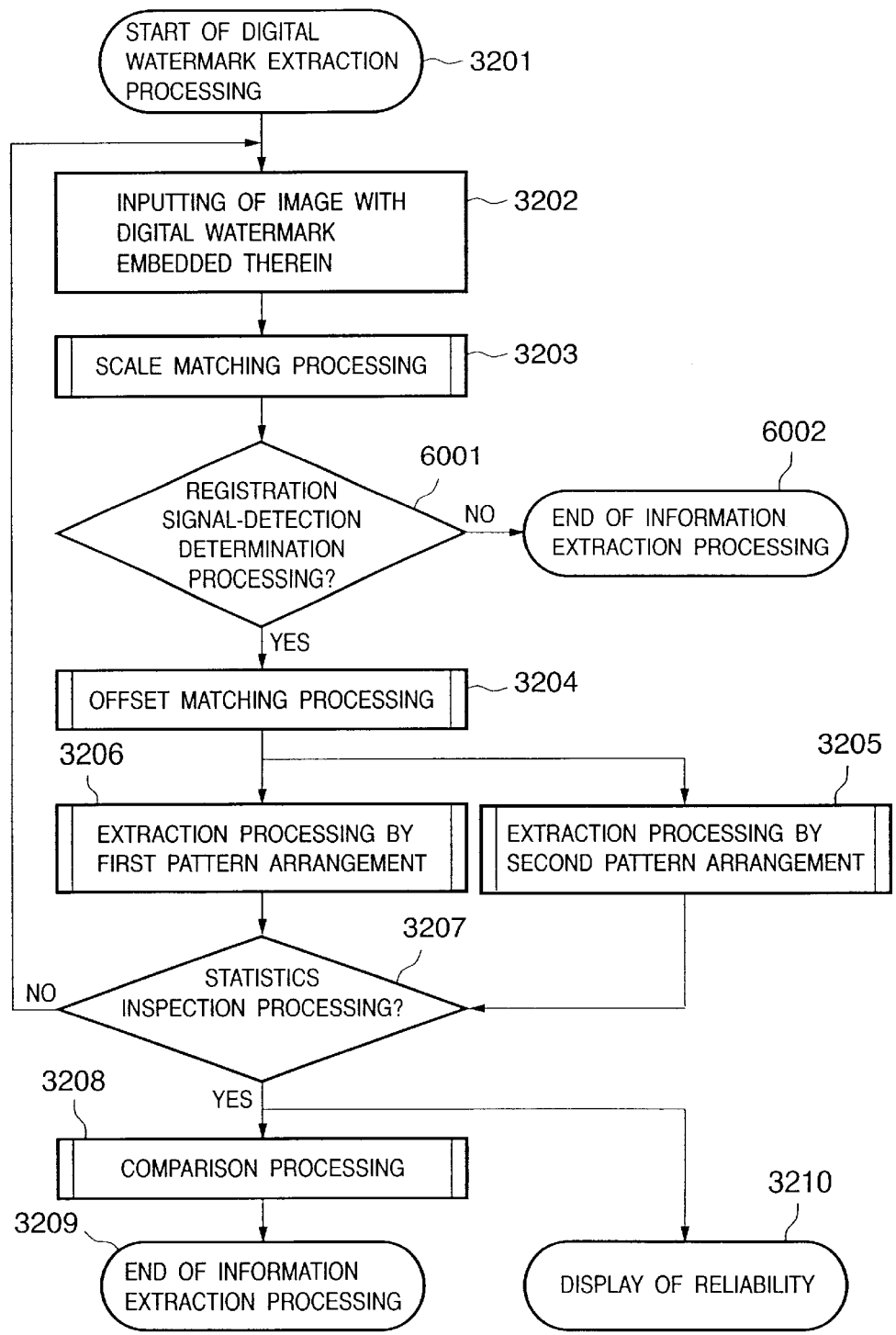
FIG. 60 is a flowchart showing digital watermark extraction processing as a modification of the preferred embodiment of the present invention.

In this way, digital watermark extraction processing with high speed will be described, using a flowchart shown in FIG. 60. FIG. 60 shows an alteration of the flowchart of the digital watermark extraction processing shown in FIG. 32. This FIG. 60 is a flowchart in which the pattern arrangement determination processing 3211 in the flowchart of FIG. 32 is replaced by registration signal-detection determination processing 6002. For processing steps similar to those in FIG. 32, the same symbols are assigned, and description thereof is omitted.

In registration signal-detection determination processing 6001 shown in FIG. 60, whether or not the registration signal r has been detected by scale matching processing 3203 that is preprocessing thereof is determined. If the registration signal has not been detected, advancement to 6003 is made, and at this time, information extraction processing is ended.

The registration signal r should be definitely detected from an image with digital watermark information embedded therein. The fact that the registration signal r is not detected from the image means that no digital watermark information is embedded therein. Therefore, it is not necessary to continue digital watermark extraction processing thereafter, and thus the digital watermark extraction processing can be ended at this time.

Explanation of a series of processing from embedment of added information to extraction thereof has been presented above.

As described above, according to this embodiment, in registration processing of correcting geometric transformation, the registration is selected adaptively for the image signal compared to conventional cases, thereby making it possible to embed the registration signal so as to make it easy to detect the registration signal.

Other Embodiments

For added information Inf (usage information $Inf_2$) in one embodiment described above, error correction-coded information can also be used. Thus, error correction-coded information is used for added information Inf (usage information $Inf_2$), thereby further enhancing reliability of usage information $Inf_2$ already extracted.

Also, in the first embodiment described above, the case where a pattern arrangement most suitable for the resolution of input image data or the output (print) resolution of the printer is selected from two pattern arrangements shown in FIGS. 49A and B, but the present invention is not limited the above described example, and for example, the case where two or more pattern arrangements different in size from one another, constituted by m×n elements (m, n are integer numbers) are held and one pattern arrangement most suitable for the resolution of input image data or the output (print) resolution of the printer is selected therefrom and is used is also included in the category of the present invention.

Furthermore, the present invention may be applied as part of a system constituted by a plurality of apparatuses (for example, host computer, interface device, printer, etc.) or may be applied as part of a system constituted by one apparatus (for example, copier, facsimile machine).

Also, the present invention is not limited to devices and methods for achieving the above embodiments, and the case is also included in the category of the present invention where the program code of software for achieving the above described embodiment is provided to the computer in the above described system or apparatus (CPU or MPU), and the computer in the above described system or apparatus operates a various kinds of devices described above, there by achieving the above described embodiment.

Also, in this case, the program code of the above described software itself achieves the feature of the above described embodiment, and the program code itself and a device for supplying the program code to the computer, specifically a storage medium storing the above described program code is included in the category of the present invention.

As for a storage medium like this, for example a floppy disk, hard disk, optical disk, magneto-optic disk, CD-ROM, magnetic tape, nonvolatile memory and ROM may be used.

Also, the program code is included in not only the case where the above described computer controls a various kinds of devices in accordance with only the supplied program code, thereby achieving the feature of the above described embodiment, but also the case where the above described program code works in association with the OS (operating system) operating on the computer, other application software or the like to achieve the above described embodiment.

Furthermore, the case is also included in the category of the present invention where after this supplied program code is stored in a memory included in the feature expansion board of the computer and the feature expansion unit connected to the computer, a CPU and the like included in the feature expansion board and the feature storage unit performs all or part of practical processing based on instructions of the program code, and the above described embodiment is achieved through the processing.

Furthermore, for the above described embodiment, the case where digital watermark information is embedded using the cone mask is described, but the present invention is not limited thereto. Particularly, cases where digital watermark information is embedded using the blue noise mask are also included in the category of the present invention.

Also, any configuration comprising at least one of variety of characteristics described above is included in the category of the present invention.

As described above, according to this embodiment, in registration processing of correcting geometric transformation, the registration is selected adaptively for the image signal compared to conventional cases, thereby making it possible to embed the registration signal so as to make it easy to detect the registration signal. Also, in registration processing of correcting geometric transformation, it is made easy to detect the registration signal and the registration signal can be embedded so that it is less perceptible by human eyes, compared to conventional cases.

As many apparently widely different embodiments of the present invention can be made without departing from the sprit and scope thereof, it is to be understood that the invention is not limited to the specific embodiments thereof except as defined in the appended claims.

What is claimed is:

1. An image processing method of embedding registration signals in image data, comprising:
    a feature component detecting step of detecting a feature component of said image data;
    a registration signal selecting step of selecting one registration signal from a plurality of registration signals, in accordance with said feature component; and
    an adding step of adding to said image data the registration signal selected by said registration signal selecting step.

2. The image processing method according to claim 1, wherein said feature component detecting step further comprises a frequency property determining step of determining frequency properties of said image data.

3. The image processing method according to claim 1, further comprising:
    a frequency transforming step of transforming said image data into frequency components; and
    an inverse frequency transforming step of transforming said frequency components into spatial components.

4. The image processing method according to claim 3, wherein in said frequency transforming step, Fourier transformation is performed to transform said image data into amplitude spectra.

5. The image processing method according to claim 1, wherein in said frequency property determining step, determination is made using frequency components of said image data.

6. The image processing method according to claim 1, further comprising:
    a block dividing step of dividing said image data into at least one blocks; and
    a block synthesizing step of combining blocks divided by said block dividing step to reconstruct the image.

7. The image processing method according to claim 1, wherein said plurality of registration signals has impulses in frequency components different from one another.

8. The image processing method according to claim 1, wherein in said registration signal selecting step, a registration signal having impulses in low frequency components is selected from said plurality of registration signals for image data with a smaller number of high frequency components, and a registration signal having impulses in high frequency components is selected from said plurality of registration signals for image data with a larger number of high frequency components.

9. The image processing method according to claim 1, wherein said feature component is an edge component.

10. The image processing method according to claim 1, wherein said plurality of registration signals have one period.

11. The image processing method according to claim 1, wherein said plurality of registration signals include first and second registration signals, and in said registration signal selecting step, the first registration signal is selected in said edge component and the second registration signal is selected in components other than said edge component.

12. The image processing method according to claim 11, wherein said second registration signal is smaller in amplitude than said first registration signal.

13. An image processing method of inputting image data with registration signals embedded therein, subjected to geometric transformation, and extracting registration signals from said inputted image data to perform registration processing, comprising:
    a registration signal extracting step of extracting registration signals from said image data;
    a frequency property determining step of determining frequency properties of said image data;
    a geometric transformation identifying step of identifying geometric transformation to which said image data is subjected, using said extracted registration signals and determination results of said determination in the frequency property determining step; and
    a geometric transforming step of performing inverse transformation of said identified geometric transformation.

14. The image processing according to claim 13, further comprising:
    a frequency transforming step of transforming said image data into frequency components; and
    an inverse frequency transforming step of transforming said frequency components into spatial components.

15. The image processing method according to claim 13, wherein in said frequency property determining step, determination is made using frequency components of said image data.

16. The image processing method according to claim 13, wherein in said frequency transforming step, Fourier transformation is performed, and conversion into amplitude spectra as said frequency components is made.

17. The image processing method according to claim 13, further comprising:
    a block dividing step of dividing said image data into at least one blocks; and
    a block synthesizing step of combining blocks divided by said block dividing step to reconstruct the image.

18. The image processing method according to claim 13, wherein said geometric transformation is scaling.

19. An image processor for embedding registration signals in image data, comprising:
    feature component detecting means for detecting a feature component of said image data;
    registration signal selecting means for selecting one registration signal from a plurality of registration signals, in accordance with said feature component; and
    adding means for adding to said image data the registration signal selected by said registration signal selecting means.

20. An image processor for inputting image data with registration signals embedded therein, subjected to geometric transformation, and extracting registration signals from said inputted image data to perform registration processing, comprising:
    registration signal extracting means for extracting registration signals from said image data;

frequency property determining means for determining frequency properties of said image data;

geometric transformation identifying means for identifying geometric transformation to which said image data is subjected, using said extracted registration signals and determination results of said determination by the frequency property determining means; and geometric transforming means for performing inverse transformation of said identified geometric transformation.

21. A computer program product embodying a program for implementing an image processing method of embedding registration signals in image data, the program comprising:

program codes for the feature component detecting step of detecting a feature component of said image data;

program codes for a registration signal selecting step of selecting one registration signal from a plurality of registration signals, in accordance with said feature component; and program codes for an adding step of adding to said image data the registration signal selected by said registration signal selecting step.

22. A computer data signal embodied in a propagating wave and used for implementing an image processing method of embedding registration signals in image data, comprising:

code signals for use in a feature component detecting step of detecting a feature component of said image data;

code signals for use in a registration signal selecting step of selecting one registration signal from a plurality of registration signals, in accordance with said feature component; and code signals for use in an adding step of adding to said image data the registration signal selected by said registration signal selecting step.

23. A computer program product embodying a program for implementing an image processing method of inputting image data with registration signals embedded therein, subjected to geometric transformation, and extracting registration signals from said inputted image data to perform registration processing, the program comprising:

program codes for a registration signal extracting step of extracting registration signals from said image data;

program codes for a frequency property determining step of determining frequency properties of said image data;

program codes for a geometric transformation identifying step of identifying geometric transformation to which said image data is subjected, using said extracted registration signals and determination results of said determination in the frequency property determining step; and program codes for a geometric transforming step of performing inverse transformation of said identified geometric transformation.

24. A computer data signal embodied in a propagating wave and used for implementing an image processing method of inputting image data with registration signals embedded therein, subjected to geometric transformation, and extracting registration signals from said inputted image data to perform registration processing, comprising:

code signals for use in a registration signal extracting step of extracting registration signals from said image data;

code signals for use in a frequency property determining step of determining frequency properties of said image data;

code signals for use in a geometric transformation identifying step of identifying geometric transformation to which said image data is subjected, using said extracted registration signals and determination results of said determination in the frequency property determining step; and code signals for use in a geometric transforming step of performing inverse transformation of said identified geometric transformation.

* * * * *

UNITED STATES PATENT AND TRADEMARK OFFICE
CERTIFICATE OF CORRECTION

PATENT NO. : 6,741,758 B2
DATED : May 25, 2004
INVENTOR(S) : Junichi Hayashi et al.

It is certified that error appears in the above-identified patent and that said Letters Patent is hereby corrected as shown below:

Column 1,
Line 25, "to" should read -- to a --.

Column 3,
Line 5, "image-data," should read -- image data, --.
Line 66, "registration" should read -- a registration --.

Column 5,
Line 66, "unit-of" should read -- unit of --.

Column 9,
Line 32, "inf" should read -- Inf --.

Column 10,
Line 41, "form" should read -- from --.

Column 13,
Line 28, "domain" should read -- domain. --.

Column 17,
Line 18, "Here" should begin a new paragraph.

Column 19,
Line 60, "$a_2$ while" should read -- $a_1$ while --.

Column 20,
Line 49, "detect" should read -- detected --.

Column 21,
Line 41, "d-" should read -- d= --.

Column 22,
Line 30, "B40," should read -- B' --.
Line 31, "form" should read -- from --.

Column 26,
Line 14, "(In" should read -- (in --.

Column 28,
Line 15, "dot." should read -- dots. --.
Line 24, "inch," should read -- inches, --.

UNITED STATES PATENT AND TRADEMARK OFFICE
CERTIFICATE OF CORRECTION

PATENT NO. : 6,741,758 B2
DATED : May 25, 2004
INVENTOR(S) : Junichi Hayashi et al.

It is certified that error appears in the above-identified patent and that said Letters Patent is hereby corrected as shown below:

Column 29,
Line 4, "rise" should read -- raise --.

Column 31,
Line 14, "rising" should read -- raising --.

Column 35,
Line 48, "may" should read -- may be --.

Column 37,
Line 44, "embodiment (first occurrence) should read -- embedment --.
Line 45, "limited" should read -- limited to --.

Column 39,
Line 23, "make" should read -- makes --.
Line 40, "elements of" should read -- element of --.
Line 42, "later" should read -- latter --.
Line 62, "attacks" should read -- attack --.

Column 41,
Line 19, "(b1)" should read -- (1) --.

Column 45,
Line 22, "frequent" should read -- frequency --.

Column 46,
Line 35, "an digital" should read -- a digital --.
Line 44, "case" (first occurrence) should read -- case of --.

Column 47,
Line 50, "32 $C^2$" should read -- 32 $c^2$ --.

Column 48,
Line 40, "$\times(a_i-b_i)$" should read -- $\Sigma(a_i-b_i)$ --.
Line 42, "-1/c" should read -- =1/c --.

Column 49,
Line 25, "larger" should read -- the larger --.

UNITED STATES PATENT AND TRADEMARK OFFICE
CERTIFICATE OF CORRECTION

PATENT NO. : 6,741,758 B2
DATED : May 25, 2004
INVENTOR(S) : Junichi Hayashi et al.

It is certified that error appears in the above-identified patent and that said Letters Patent is hereby corrected as shown below:

Column 51,
Line 56, "form" should read -- from --.

Column 55,
Line 2, "that" should read -- than --.

Column 56,
Line 33, "information-Inf" should read -- information Inf --.
Lines 52 and 56, "massage" should read -- message --.

Column 58,
Line 5, "limited" should read -- limited to --.
Line 25, "there by" should read -- thereby --.

Column 59,
Line 9, "sprit" should read -- spirit --.

Signed and Sealed this

Third Day of May, 2005

JON W. DUDAS
*Director of the United States Patent and Trademark Office*